(12) United States Patent
Williams

(10) Patent No.: US 10,108,600 B2
(45) Date of Patent: Oct. 23, 2018

(54) SYSTEM AND METHOD OF ATTRIBUTE, ENTITY, AND ACTION ORGANIZATION OF A DATA CORPORA

(71) Applicant: entigenlogic LLC, Huntington Beach, CA (US)

(72) Inventor: Frank John Williams, Los Alamitos, CA (US)

(73) Assignee: ENTIGENLOGIC LLC, Schaumburg, IL (US)

( * ) Notice: Subject to any disclaimer, the term of this patent is extended or adjusted under 35 U.S.C. 154(b) by 0 days.

(21) Appl. No.: 15/268,304

(22) Filed: Sep. 16, 2016

(65) Prior Publication Data

US 2018/0081871 A1  Mar. 22, 2018

(51) Int. Cl.
*G06F 17/27* (2006.01)
*G06F 17/30* (2006.01)

(52) U.S. Cl.
CPC ...... *G06F 17/2735* (2013.01); *G06F 17/2765* (2013.01); *G06F 17/30613* (2013.01); *G06F 17/30657* (2013.01)

(58) Field of Classification Search
USPC ...................................................... 704/1–10
See application file for complete search history.

(56) References Cited

U.S. PATENT DOCUMENTS

| | | | |
|---|---|---|---|
| 6,175,834 B1 * | 1/2001 | Cai | G06F 17/273 434/156 |
| 2003/0097251 A1 * | 5/2003 | Yamada | G06F 17/2836 704/7 |
| 2008/0208569 A1 * | 8/2008 | Simpson | G06F 17/30864 704/9 |
| 2016/0147979 A1 * | 5/2016 | Kato | G06F 21/10 713/171 |

* cited by examiner

*Primary Examiner* — Abul Azad
(74) *Attorney, Agent, or Firm* — Garlick & Markison; Gary W. Grube

(57) ABSTRACT

A system for annotating words of a data corpus based upon attributes, items, and actions with Identigens (IDNs) from a Descriptive Dictionary, pairing the word's or their IDNs based on logical forming rules (CETLO Rules); determining if a selected plurality of paired words or IDNs (CETs) are grammatically and syntactically correct by matching IDNs from each pair of words. Optionally, identifying and annotating the individual entities (Entigens) that words are identifying.

20 Claims, 70 Drawing Sheets

| | Observables | Word | Word Type (AIA) | Identigen (IDN) | Entigen (ENI) |
|---|---|---|---|---|---|
| 1 | (Item) (physical or abstract) | Person | Itenym | IDN 1234.001 IDN\person | e51 |
| 2 | (Action) | Run | Actenym | IDN 333.02 IDN\run | e77777 |
| 3 | (Attribute) | Quickly | Attrenym | IDN 8181.002 IDN\quickly | e401 |
| 4 | (Items) (physical or abstract) | Mountains | Itenym | IDN 3737.008 IDN\mountains | e123 e124 (respectively) |

| | Words | Language | Country | IDN | AIA | Description |
|---|---|---|---|---|---|---|
| | \multicolumn{6}{c}{Descriptive Index Dictionary} | | | | | |
| | 351 | 352 | 353 | 354 | 355 | 356 |
| 1 | Antarctica | 1 | 1 | 666002.000 | ite.1 | The south pole |
| 2 | Beautiful | 1 | 1 | 373839.001 | ci | Pleasing to the senses |
| 3 | Quickly | 1 | 1 | 272727.01 | ca | At a fast speed |
| 4 | Fast | 1 | 1 | 272222.3 | cu | Able to move at great speeds |
| 5 | Walk | 1 | 1 | 280021.000 | abn | The act of traveling by feet |
| 6 | Walks | 1 | 1 | 280021.001 | abs | The act of traveling by feet |
| 7 | Walking | 1 | 1 | 280021.002 | abi | The act of traveling by feet |
| 8 | Walked | 1 | 1 | 280021.003 | abd | The act of traveling by feet |
| 9 | Horse | 1 | 1 | 111222.000 | ite.1 | A mammal |
| 10 | Caballo | 2 | 2 | 111222.020 | ite.1 | Un mamifero |
| 11 | Caballos | 2 | 2 | 111222.021 | ite.2 | Unos mamiferos |

FIG. 3E

| ID | Author | Country | Institution | Subject | Title | Year |
|---|---|---|---|---|---|---|
| 7 | Rabin, AS; Nikolash, AR | us; us | Emory; Emory | Cancer | Drug Related | 2012 |
| 8 | Klaman, K; Altraja, A | ee | Univ. Tartu | Biology | Predictors of | 2009 |
| 9 | Burgos, JM; Ellington, BA | us | Eastern New Mexico | Chemistry | New Element | 2005 |
| 10 | Gustafsson, I; Martinez, JL | es; se | CSIC; Ctny Hospital | Neurology | Neural Networks | 2005 |
| 11 | Jain, A; Dixit, P | in | CSM Medical Univ | Agriculture | Arid Growing | 2008 |
| 12 | Kuwano, M; Uchiumi, TT | jp; jp | Kyushu Univ. | Pharma | Drug Resistant | 1999 |

FIG. 7A

1230 → 1st Sentence: Captain John called Tom.

| 1a. | ENI\John = e209 | IDN\called = 500.12 | 12a |
|---|---|---|---|
| 1b. | ENI\Tom = e300 | IDN\called = 500.12 | 06a |

FIG. 12D

1240 → 2nd Sentence: Sergeant John called Tom.

| 2a. | ENI\John = e312 | IDN\called = 500.12 | 12a |
|---|---|---|---|
| 2b. | ENI\Tom = e300 | IDN\called = 500.12 | 06a |

FIG. 12E

1250 → 3rd Sentence: John called Tom.

| 3a. | IDN\John = em210 | IDN\called = 500.12 | 12a |
|---|---|---|---|
| 3b. | ENI\Tom = e300 | IDN\called = 500.12 | 06a |

FIG. 12F

1260 → Query: Who called Tom?

| 4a. | IDN\[who] | IDN\called = 500.12 | 12a |
|---|---|---|---|
| 4b. | (Tom) = e300 | IDN\called = 500.12 | 06a |

| | John (e209) | John (e312) |
|---|---|---|
| Number | Source of Data | |
| 203 | John is talking to Mary in the airport and she is laughing. | |

FIG. 12H

|   | Word | Language | Country | IDN | AIA | Description |
|---|---|---|---|---|---|---|
| 1 | auto | 1 | 1 | 000050.006 | ite.1 | A passenger vehicle typically having 4 wheels |
| 2 | automobile | 1 | 1 | 000050.001 | ite.1 | A passenger vehicle typically having 4 wheels |
| 3 | automobiles | 1 | 1 | 000050.003 | ite.2 | Passenger vehicles typically having 4 wheels |
| 4 | autos | 1 | 1 | 000050.007 | ite.2 | Passenger vehicles typically having 4 wheels |
| 5 | wheelaz | 1 | 1 | 000050.060 | ite.1 | A passenger vehicle typically having 4 wheels |

FIG. 17C

| Number | Word | Language | Country | IDN | AIA | Description | ENI |
|---|---|---|---|---|---|---|---|
| 34 | Kokiko | 1 | 1 | 999478.000 | ite.1 | A new Itenym (Singulatum) | e47389 |
| 35 | pato | 2 | 2 | 116937.000 | ite.1 | A new Itenym (Pluratum) | n/a |

FIG. 18C

Select Anomaly Type:

| Page | Anomaly | Once | Trusted | Fiction | Untrusted | Auto |
|---|---|---|---|---|---|---|
| 1228 | The robot purchased a car | ok | ok | ok | ok | ok |

FIG. 19C

Anomaly Status:

| | Page | Anomaly Sentence | Once | Trusted | Fiction | Untrusted | Auto |
|---|---|---|---|---|---|---|---|
| 1 | 1228 | The robot purchased a car | 0 | 0 | 1 | 0 | 0 |
| 2 | 1235 | Tom lives in Arizona | 0 | 1 | 0 | 0 | 0 |
| 3 | 1369 | Fufu kissed Mary | 0 | 0 | 1 | 0 | 0 |

FIG. 19D

This exemplary puzzle has three individuals of different nationalities living each with a different animal pet in a different house (in the real Einstein Puzzle there are 5 individuals, 5 pets, 5 color houses, 5 drinks and 5 cigarettes). For example:

1) There are three homes: first, second and third.
2) There are three individuals: a Tico (from Costa Rica), a French and a German.
3) There are three animals: a dog, a cat, and a bird Clues:
A) The Tico lives in the second house
B) The European has a dog
C) The cat lives in the third house Question: In which house does the bird live?

Top block (2312):

| | | | |
|---|---|---|---|
| 1 Tico<br>2 French<br>3 German | e\Tico<br>e\French<br>e\German | first<br>second<br>third | 19d<br>19d<br>19d |
| 1 Tico<br>2 German<br>3 French | e\Tico<br>e\German<br>e\French | first<br>second<br>third | 19d<br>19d<br>19d |
| 1 German<br>2 French<br>3 Tico | e\German<br>e\French<br>e\Tico | first<br>second<br>third | 19d<br>19d<br>19d |
| 1 German<br>2 Tico<br>3 French | e\German<br>e\Tico<br>e\French | first<br>second<br>third | 19d<br>19d<br>19d |
| 1 French<br>2 Tico<br>3 German | e\French<br>e\Tico<br>e\German | first<br>second<br>third | 19d<br>19d<br>19d |
| 1 French<br>2 German<br>3 Tico | e\French<br>e\German<br>e\Tico | first<br>second<br>third | 19d<br>19d<br>19d |

Bottom block (2313):

| | | | |
|---|---|---|---|
| 1 Cat<br>2 Dog<br>3 Bird | e\cat<br>e\dog<br>e\bird | first<br>second<br>third | 19d<br>19d<br>19d |
| 1 Cat<br>2 Bird<br>3 Dog | e\cat<br>e\bird<br>e\dog | first<br>second<br>third | 19d<br>19d<br>19d |
| 1 Bird<br>2 Dog<br>3 Cat | e\bird<br>e\dog<br>e\cat | first<br>second<br>third | 19d<br>19d<br>19d |
| 1 Bird<br>2 Cat<br>3 Dog | e\bird<br>e\cat<br>e\dog | first<br>second<br>third | 19d<br>19d<br>19d |
| 1 Dog<br>2 Cat<br>3 Bird | e\dog<br>e\cat<br>e\bird | first<br>second<br>third | 19d<br>19d<br>19d |
| 1 Dog<br>2 Bird<br>3 Cat | e\dog<br>e\bird<br>e\cat | first<br>second<br>third | 19d<br>19d<br>19d |

2310

SYSTEM AND METHOD OF ATTRIBUTE, ENTITY, AND ACTION ORGANIZATION OF A DATA CORPORA

BACKGROUND OF THE INVENTION

1. Field of the Invention

The invention is related generally to a system for and method of efficiently representing data, that enables inferred and extracted results in response to a query.

2. Related Art

A massive amount of data is stored in information systems and networks, such as files containing text. Currently, there is often useful information resident in this sea of data that cannot be extracted efficiently for analysis. There is simply too much data for humans to absorb. While computers may be fast enough to process the data, they cannot comprehend concepts or context needed to understand the content of the data. Humans understand concepts and context, but cannot process the data fast enough to get through it all.

Data is archived as a cheaper alternative to paper-document storage, or it sits in email, text message, or social media server memories because the files were transmitted over the Internet. Regardless of the reason why these files are found in computer storage, the fact is that the files were created for human understanding, not computer understanding. The information can be hugely useful if it can be extracted and sorted in such a way as to enable sophisticated analysis—but without an ability to understand the data, itself, identifying what is relevant data for extraction and analysis has not been possible.

Understanding the content of data require the ability to comprehend the words people use to convey their thoughts. If the processing power of computers is to be relevant in the effort to mine massive data files, then a computerized approach must be able to comprehend text, not merely recognize patterns and apply statistical reasoning solutions. The promise of "Big Data" analytics will never be met if the relevant data cannot be extracted from its massive storage repositories.

Relevant information is masked in an overwhelming volume of words due to ambiguities inherent in words. Increasing processor speed may reduce the challenge presented by data volume, but no currently available software will overcome the challenge presented by words, which effectively encrypt the data. Whether simply searching data files for specific elements of data or extracting specific elements from data for complex analysis, current technology is limited to search-and-retrieve operations driven by word-based pattern matching and statistical modeling. Therefore, even with increased computer processing power, the problem of understanding data still exists.

Because computers cannot comprehend the words contained in the data files, current technology can do little more than apply sophisticated algorithms to identify similar word patterns in a user's query with those in the data. These algorithms have become quite sophisticated, but the basic approach remains that of probabilistic scoring of queries and data indexes to establish the best match between query and data—i.e., statistical reasoning solutions. If a specific answer resides in the database, such as "George Washington was the first President of the United States", then current software can return that answer in response to the query, "Who was the first President of the United States?" The answer was explicit in the database. If the answer is not explicit in the data, then the software will return a list of possible files where the answer might be found. It is then incumbent on the user to read through the list of potentially relevant documents and find the answer implicit in the data.

A good example of the problem that this lack of understanding creates is demonstrated in the following; "Who died today?" In this simple three-word query, the user wants to know the names of the people who died on this day. But a computer cannot comprehend this simple question. Instead, it focuses on the key words "died" and "today". Most algorithms are sufficiently sophisticated to deal with words similar to "died" or its general meaning, such as "death", "killed", "passed away", etc. But no software deals with the temporal nature of the word "today." Consequently, if one were to do an internet search with a "search engine", one would get about over 500,000 responses or hits—a list of links to over 500,000 URLs to sift through. Even if a user could open, read, and extract useful information from these URLs at the rate of one per second (which is not likely), it would take 150 man-hours (3.75 standard work weeks at 40-hours/week) to get through the entire list. But worse than that, because the computer did not understand the question, none of the results answer the question. Instead, the word-pattern matching returns a list of URLs that link to deaths: reported in USA TODAY™ or other media with the word "today" in the title, that occurred today in history, or that were reported today, etc. When answering a query requires understanding both the query and the text files, word-based pattern matching is inadequate. Perhaps this is why web browsers connect to software which is called a "search" engine rather than an "answer" engine—it is good at searching for patterns but not at answering queries.

Answering queries with current technology relies on the answer being explicit in the text. In order to increase the likelihood that an answer to a potential query will be explicit in the data, one known approach is to seed the data with answers to likely questions. IBM's computer WATSON™, for example, downloads large data base files and then sets an army of human experts to work reading though the files and preparing a list of question/answer pairs which are loaded into the computer. When asked a question by a user, WATSON™ then statistically searches for the highest correlation between the word pattern in the query and the word pattern in the pre-loaded answers. This approach is called statistical reasoning. Not only is this process of generating question and answer pairs exceedingly expensive and time consuming, it also limits the information that can be extracted from the data to those questions that have been previously created and stored. What is advertised to a layperson as "thinking", but it is actually no more than retrieving preselected answers from large data files. While such an approach may be adequate for static data sources, such as voluminous government regulations, historical fact tables, or medical diagnostic decision trees, it cannot provide insights into dynamic data, nor can it leverage the inexhaustible power of a computer's ability to find all relevant, co-related data in huge data files.

GOOGLE™, FACEBOOK™, and MICROSOFT™, among others, are attempting to use deep neural nets to identify objects in photos and recognize the individual words we speak into digital assistants like SIRI™. Their hope is that this same breed of artificial intelligence can dramatically improve a machine's ability to grasp the significance of those words, to understand how those words interact to form meaningful sentences. These industry leaders have recognized the importance of comprehending words as an enabler for a wide range of computer functions. But, their neural-net approach still relies on pattern matching and probabilistic scoring and requires some level of supervised learning.

Currently, available technology simply cannot provide insightful knowledge. It can only provide a list of potentially relevant sources to serve as leads for humans to process manually who then generate insightful knowledge, or it can search a database of pre-loaded knowledge generated by experts. But it cannot provide insightful knowledge, or extract all the relevant data for additional analysis from data files because it cannot comprehend the meaning(s) in data, such as text.

Humans can read and comprehend text files, but cannot process fast enough to sort through massive files quickly. Computers can process data quickly, but cannot comprehend the concepts and context conveyed by text. Either humans need to process at computer speeds or computers need to comprehend at human levels. The technology required to achieve the former is not on the horizon. The technology to achieve the latter has not yet been demonstrated by known approaches.

Therefore, there is useful information that resides in the sea of data stored in information systems and networks that cannot currently be understood by computers for analysis. The promise of "Big Data" analytics cannot be met if the relevant data cannot be understood and extracted from its massive storage repositories. This current lack of understanding effectively buries relevant information in overwhelming volume and masks it with the ambiguities inherent in words. Increasing processor speed will reduce the challenge presented by data volume, but no currently available software will overcome the challenge presented by words.

Currently, the generalized approach employed by all the technologies and methodologies mentioned above is that the fundamental understanding of natural languages is based on grammar. Specifically, grammar classifies words into five major grammatical types such as functional words, nouns, adjectives, verbs and adverbs. Grammar then uses these grammatical types to study how words should be distributed within a string of words to form a properly constructed grammatical sentence. However, understanding natural languages from a grammatical stance encourages the desertion of two major and crucial points. The first point is that grammar does not reflect the mind's natural ability to learn, create and achieve language and speech. People from all ages and cultures can communicate using natural languages without any formal grammatical training or expertise. The second point is that grammar is not concerned with the words' descriptive purpose or with the things that words are actually trying to describe or identify, but rather with the words' own grammatical operations and purpose (how the word is used within sentences).

This later point forces grammar to divide words that describe single ideas into separate grammatical identifications. For example, grammatically speaking, the word "human" is divided into a noun and an adjective based on how the word "human" is being used within a given sentence. In the sentence "the feelings of a human are profound" the word "human" is a noun, because "human" operates as a noun. But in the sentence "human feelings are profound" the word "human" is now an adjective, because grammatically speaking "human" in this example is operating as an adjective. Another example is what happens to the word "talking", which grammatically speaking is divided into three different elements such as a noun, an adjective or a verb. In "the talking of the president" the word "talking" is a noun; in "the talking president left the building" the word "talking" is an adjective; and in "the president is talking" the word "talking" is a verb. As a result, grammar not only divided "human" in two diverging terms and "talking" into three completely different terms, but in addition, grammar added complexity, because the grammatical classifications of "human" and "talking" were based on usage of each word within each sentence, not meaning.

But more importantly, grammar ignored the most important aspect behind each word, and that is what every word (human and talking) is actually trying to describe. Descriptively speaking (not grammatically speaking), the word "human" always describes a living being and the word "talking" always describes the same type of action on all sentences above. Another serious limitation that grammar endows is that most colloquial and conversational communications between people are informal and therefore do not follow the rigidness or sophistication demanded by the rules of grammar. This limits grammatical-based technologies from processing this type of data. Consequentially, grammar, aside from adding complexity and unnecessary partitioning of words, also reduces the capacity of computers and software to be flexible to process and understand what people are naturally saying, writing or implying. In view of the foregoing, there is an ongoing need for providing systems and methods of identifying words differently for processing natural languages including creating and maintaining searchable databases that when queried by a user produce results that are precisely and accurately responsive to the user's query. Moreover, because the purpose of ontological categories is to distinguish the elements it studies, failing to properly differentiate such elements from each other leads to serious inconsistencies. Indeed, if we select the wrong parameters to distinguish and study the elements of a given system, the resulting categories could be obtrusive and contradictory. For example, if "motion" is selected as the parameter to study the pieces of a train; then the engine, the passenger cars and the caboose can be confused, because all these pieces experience the same type of motion when the train moves. This is similar to what grammar has done by defining how words are used instead of what words describe. Stating how a word is used in a sentence does not identify what the word is actually trying to describe. This has led grammatical approaches to create obtrusive categories, confusion and contradictions in semantic and meaning-based analysis. For example, in many dictionaries the word "elected" is divided as an adjective and a verb (this is obtrusive within that dictionary); while in other dictionaries, "elected" is only an adjective or only a verb (this is contradictory among dictionaries).

In addition, current technology is focused on identifying the part of speech a word represents as opposed to what the word is describing or intending to describe. To date, this approach or methodology precludes current technology from recognizing the single unique individuals, unique items, or unique things that words represent or are trying to describe in time and space. Nor can current technology assign or associate actions and/or attributes to a unique single individual, item or thing and vice versa.

Therefore, there is need in the art for methods and approaches that can analysis big data and address the limitations identified above.

SUMMARY

To address the foregoing problems and limitations, in whole or in part, and/or other problems that may have been observed by persons skilled in the art, the present disclosure provides systems, apparatus, instruments, devices, methods, and/or processes, as described by way of example in implementations set forth below.

To break free from the traditional word-based analysis, statistical analysis, and grammatical-based technologies requires a new understanding of natural languages and their underpinning logic that would enable computers to have the capacity to comprehend words and what they inherently describe in context. Once words can be comprehended, sense can be made of the information contained in phrases, idioms, sentences, paragraphs, tables, letters, etc. thus allowing the computer to understand content in context and discover new information, learn, disambiguate, analyze, infer, respond, question, identify anomalies, detect contradictions and make logical predictions among others.

Unlike the current state of the art, which inevitably focuses on words as meaningless symbols which need to form patterns before they can be statistically analyzed, statistically correlated and statistically exploited, the present approach is based on a new theory of sets-logic-and-language that provides computers the ability to comprehend words in context.

In the proposed approach, all conceivable and perceivable things such as actions (i.e., walking, talking), items (i.e., physical objects like a car and abstract objects like an idea), and attributes (i.e., fast, cold) are represented by "internal objects" which are virtually represented within the computer by unique symbols (i.e., unique numbers) called Entigens. In this fashion, a country like Germany is represent by its unique Entigen and England is represented by another unique Entigen. Similar to things, the names of these things are also represented by special Entigens called Identigens. Like this, a word (i.e., the word Germany) which is represented by its unique Identigen is used for identifying its corresponding unique Entigen (the country of Germany). Due to the distinctiveness of things (actions, items and attributes) and their Entigens, words and their Identigens divide based on their descriptive or identifying purpose. As such, words and Identigens are separated into Actenyms which identify actions; Itenyms which identify items; and Attrenyms which identify attributes. Moreover, uniqueness of Entigens, means that words and Identigens further divide into Singulatums (words and Identigens capable of identifying a solely unique Entigen) and Pluratums (words and Identigens capable of identifying one or several Entigens that have similarities). As a result, the present proposed approach eliminates grammatical identifications, grammatical and syntactic analysis, and grammatical and statistical complexities enabling for a greatly simplified platform and more effective processing to represent words, their meanings, and their purpose in context. Next, as words successively appear in sentences, their corresponding Identigens begin to form mathematical-like sets, called CETs that continue making more CETs with existing CETs that will accurately identify the word's intended Entigens, annotate knowledge, and begin representing the operations of rational thought (i.e., learning, reasoning and others). Additionally, Entigens' uniqueness means that knowledge can be built around each specific individual object or Entigens, which forms Entigen profiles that innately bypass the inevitable inconsistencies and contradictions imbedded in classes and general definitions. But more importantly, Entigen's own existence, allows the computer to represent each Entigen's and corresponding thing's unique time lapse, called Entigen Time (ETime for short) thus enabling the computer to perceive the passage of time.

Accordingly, the proposed approach not only enables computers to comprehend the meanings and things conveyed in human language, such as text, but it also enables them to represent knowledge in its entirety, including the uniqueness of every conceivable and perceivable thing and temporal essence.

Like this, the proposed approach involves the creation of a Descriptive Dictionary to register the words' Identigens, several modules for identifying and annotating the words and corresponding Identigens, a series of rules (Identigen CETLO rules hereafter referred to as CETLO rules) for grouping the Identigens into CETs, a series of databases for storing CETs and Entigens, a series of modules to perform CETs and Entigens' interactions, and several optional modules for inputting External data, creating new Identigens and Entigens, identifying and resolving anomalies and contradictions, and annotate Entigen's times.

Notably, because the proposed approach uses mathematical-like sets it would seem that traditional Set Theory would be appropriate. Unfortunately, it is not so, because Set Theory was developed to provide mathematics with a logical foundation. As such, Set Theory was never equipped to represent the greater complexities and greater volume of language, the nature of concepts and the intended things which are needed to understand language and replicate logic-based thought. Accordingly, a new theory of sets (Entigen Logic Theory) has been employed to process human languages and allow the computer to represent knowledge and do logic-based thinking. But more importantly, due to the similarity with mathematical-like sets, the consistency of CETs is governed by profound logical mathematical principals, which give the proposed approach unparalleled logical accuracy not found in current technology.

Departed from traditional word-based approaches, the present proposal introduces a series a new terms, new processes and new methods for accurately representing knowledge. As a result, a basic glossary is shown next.

| | |
|---|---|
| AIA | Acronym for Attrenym (attribute), Itenym (item) and Actenym (action). |
| Actenym | Words or Identigens used to identify actions and/or events (i.e., walking, talking) |
| Attrenym | Words or Identigens used to identify attributes and/or characteristics (i.e., quick, tall, fast). |
| CET | Sets that linguistic symbols (i.e., words), IDNs or ENIs form with each other. |
| CETLO | Logic that governs how word's IDNs are grouped to form different types of CETs. |
| CETLO Rules | Instructions that are applied to the strings of IDNs to create the different types of CETs. |
| Identigen CETLO Rules | The full name describing the CETLO Rules |
| Element | A word, Identigen, Entigen, CET Type or CET. |
| ENCET | A CET comprising at least one Entigen. |
| Entiductions | A type of IDN based inference that allows an Entigen to be identified in additional ways. |
| Entigen (ENI) | Unique number or character that represents each single conceivable and perceivable thing (action, item or attribute) in time and space. |
| Entigen Profile | A collection of CETs pertaining to an Entigen. |
| Entigen Time (ENTIME) | The timely existence of each Entigen. |
| Entigenetion | The creation of new an Entigen. |
| Identigention | Identification of an Entigen via CETs or IDNs. |
| Identigen (IDN) | A unique character or number that represents and distinguishes words and their intended meanings. |
| IDNCET | A CET of IDNs. |
| IEB-DCE System | Identigen and Entigen Based Data Collection and Extraction System. |

| | |
|---|---|
| Itenym | Words used to describe items, abstract or not (i.e., a car, a tree, a thought). |
| Pluratum | Words or IDNs that is capable of identifying one of several items, actions or attributes. |
| Singulatum | Word or IDN that is capable of identifying a unique action, item, or attribute. |
| Thing | Conceivable and perceivable things such as actions, items and attributes. |
| WORDCET | A CET of words. |

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 3D is a diagram of observable things, their names or words, their type of word, their exemplary Identigens and their exemplary Entigens in accordance with the example of FIG. 1.

FIGS. 3E-3F are depictions of a graphical user interfaces (GUI) 350 and (GUI) 360 displaying a formatted portion of an example of a Descriptive Index Dictionary database in accordance with the example of FIG. 1.

FIGS. 7A-B are exemplary diagrams of data entry in accordance with an exemplary implementation of FIG. 1.

FIGS. 12A-H are exemplary illustrations of questions and answers in accordance with an example implementation of FIG. 1.

FIG. 17C is an exemplary illustration of the Descriptive Index Dictionary comprising the added new synonym in accordance with the example of FIG. 1.

FIG. 18A-C are exemplary illustrations of learning and discovering new words upon data entry in accordance with the example of FIG. 1.

FIGS. 19C-D are exemplary depictions of GUIs for verifying or selecting the type of Anomaly in accordance with the example of FIG. 1.

FIG. 23A is an illustration of an example of the IEB-DCE System solving a logical prediction exemplified in an Einstein or zebra Puzzle in accordance with the example of FIG. 1.

FIG. 23B is an illustration of the permutations that the IEB-DCE System has created for performing a logical prediction of a Puzzle in accordance with the example of FIG. 1.

DETAILED DESCRIPTION

The foregoing description of implementations has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

Figure 1:
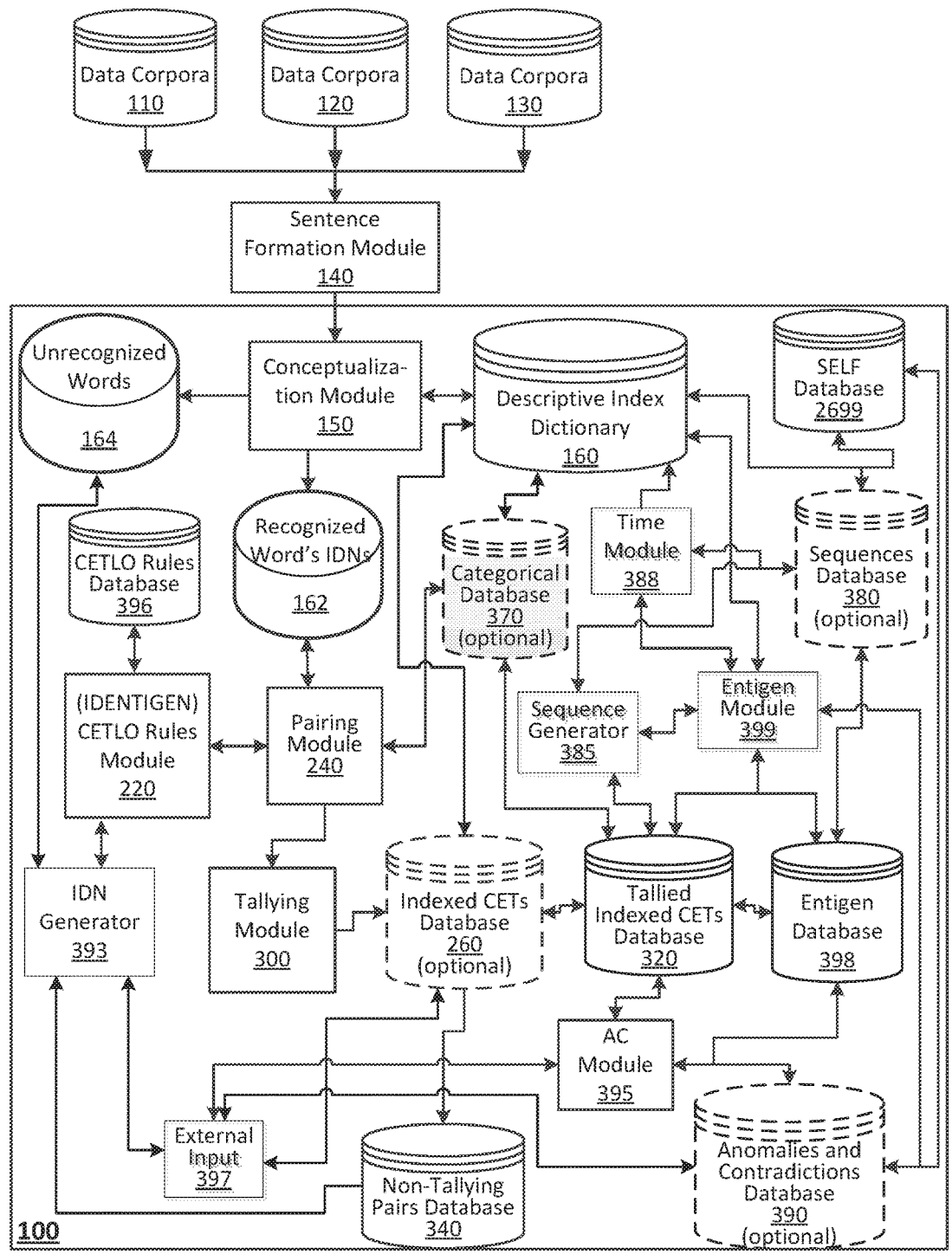
FIG. 1 is a block diagram of an example of an implementation of an approach for grouping, processing, and extracting information from data corpora in accordance with the present invention.

In FIG. 1, a block diagram of an example implementation of an approach for grouping, processing, and extracting information from data corpora is illustrated in accordance with the present invention. In FIG. 1, data corpora 110, 120, and 130 are data sources each containing machine-readable data, which may be read by the Identigen and Entigen Based Data Collection and Extraction (IEB-DCE) system 100. Each data corpora may be in any language (i.e. English, Spanish, French, German, etc.), including multiple data types (i.e. sound, text, and textual images) and if not already in sentence format, the data corpora may be segmented into sentences in Sentence Formation module 140.

In an example implementation, the IEB-DCE System 100 may process the data of data corpora 110, 120, and 130 sentence by sentence with Conceptualization Module 150. Conceptualization Module 150 is in signal communication with Descriptive Index Dictionary 160, which is a database containing a plurality of words representing a natural language, where each word is associated with an index or identifier (numerical identifier in the current implementation) referred to as an Identigen or IDN for short. In the current example of a IEB-DCE System 100 implementation, the IDN may comprise 12 digits or less, consisting of a natural portion and a decimal portion. It is appreciated by those skilled in the art that while the IDN illustrated herein has 12 digits or less, this numerical choice was made for the purpose of illustration only. The number of digits, as well as the placement of a decimal point (or not utilizing a decimal point) may be arbitrarily chosen by the designer of the IEB-DCE System 100.

Words in the Descriptive Index Dictionary 160 are divided into Attrenyms, Itenyms, Actenyms and Functionals as indicated by their corresponding Identigens or IDNs for short. Attrenyms are words that are used for identifying attributes, Actenyms are words that are used for identifying actions, Itenyms are words that are used for identifying items including any physical or abstract object, and finally Functionals which are words that join or describe specific information. Additionally, Itenyms, Actenyms and Attrenyms may be further divided into two types, such as: Singulatums which identify a unique item, action or attribute; and Pluratums which may identify one or a multitude of items, actions or attributes. Identigens (IDNs) are unique characters (i.e., numbers) that are used for identifying or annotating each type of word and its meaning.

Aside from Functionals, there may be other elements, such as symbols, characters, mathematical operators, etc., which may operate as filters, connectors, separators, identifiers etc., between Attrenyms, Itenyms and Actenyms or AIA for short. Although Functionals may have IDNs to identify them and may be processed as descriptive elements too, they may not have the same conceptual or descriptive importance as AIAs. There may yet be other types of elements that are symbols used as short hand notation in forms, such as the "$" symbol that means money. Such symbols may be also associated with a IDN identifier and processed the same as words. Other symbols, like numbers, do not have IDNs but may be processed the same as IDNs words. Specifically, numbers are annotated or associated with specialized identifiers such as "num" so they can be differentiated from IDNs and other identifiers during processing.

The Descriptive Index Dictionary 160 may be generated manually, for example, by starting with lexical databases such as ROGET'S THESAURUS™, WORDNET™, and EuroWordNet, to generate the words and corresponding IDNs for the Descriptive Index Dictionary 160. However, this process is very laborious and costly. Therefore, in other implementations, a IEB-DCE System 100 may be configured to implement a self-driven descriptive dictionary dynamically built by a processor from a collection of documents that may include one or more lexical databases.

In the Conceptualization Module 150, each word being analyzed is compared against the Descriptive Index Dictionary 160 and if a match is found, the word is associated or replaced with its appropriate IDN; and in the event that the word has multiple meanings, called polysemous, the word is associated or replaced with multiple corresponding IDNs. For example, the word "bank" may have at least three meanings in the Descriptive Index Dictionary 160 such as a depository financial institution (Itenym), a sloping land beside a body of water (Itenym), and a flight maneuver of an aircraft (Actenym). There may also be two more meanings including: bank as in doing business with a bank (Actenym) and bank as in hoping to profit from investing (Actenym). Thus, in the case of the word "bank," there would be five matches found in Descriptive Index Dictionary 160, which generates five corresponding AIAs consisting of the word "bank" and their appropriate IDNs. These 5 descriptive elements may be stored in Recognized Words data file 162. Words that do not match with any words of the Descriptive Index Dictionary 160 may be stored in Unrecognized Words data file 164, which words may be later re-examined.

Once all words of a sentence are conceptualized, for example, words are replaced by their IDN or their IDNs are accessible or their categories are available, they pass from Recognized Words data file 162 to a Pairing Module 240, which is in signal communication with a "CETs formed by Logic Rules" or CETLO Rules Module 220. The CETLO Rules Module 220 comprises or has access to special rules (CETLO Rules 396) which have the purpose to group symbols, IDNs, and other elements into pairs or larger groups as well. An example of a very basic CETLO Rule may be the following:

If X=>Pluratum Itenym→human IDN (if the first analyzed element is a Pluratum which is associated with IDN of "human", and), and X+1=>Actenym→present tense=12a (if the next analyzed element to the right is an Actenym in present tense, then form a set or CET type 12a, and), and tag X and X+1//12a (mark the first element, the Pluratum Itenym, and the second element, the Actenym, 12a).

As a result, a group or CET may be formed comprising $IDN_x$ (IDN of the first word), $IDN_{x+1}$ (IDN of the second word) which CET is identifiable as a 12a type; which may be described by the format $[(IDN_x);(IDN_{x+1}):12a]$.

As illustrated above, a CETLO Rules may incorporate a series of conditions before its corresponding CET is formed, including that the Itenym used in the rule must satisfied the added condition of "being human" which may be available via the Categorical Database 370 or other sources of information. Generally, CETLO Rules may be stored in a table or other data structure within the CETLO Rules Module 220. For the English language, a working prototype of the IEB-DCE System 100 may operate efficiently and accurately with approximately five hundred CETLO Rules in the table. Notably, CETLO Rules may also be represented by a snipped, a small program, an algorithm, a chip or other. Generally, the CETLO Rules are ordered, i.e., they are operated in a predetermined sequence. Also, there may be several different types or forms of CETLO Rules. As an example, one form of CETLO Rule may operate to erase or modify CETs previously formed by other CETLO Rules, while other CETLO Rules may operate only on elements involved on previous CETLO Rules. In another example, some CETLO Rules specifically group numbers with the IDN of the words that the numbers are modifying (i.e. in "500 cars", the number 500 is grouped with the IDN of "cars"). Essentially, there is a myriad of parameters that may be used, and a series of operations that CETLO Rules may be designed to perform. The grouping of elements using the Conceptualization Module 150 and the Descriptive Index Dictionary 160 operates at a first level of word-sense disambiguation. As an example, consider the words "Frank" (an Itenym identifying an individual person), "frank" (an Itenym identifying a sausage), "frank" (an Attrenym identifying the attribute of being candid), and "runs" (the Actenym identifying an action). The IDN of the word "Frank" (Itenym of a person) may be grouped with the IDN of the word "runs" (Actenym of an action) under the CETLO Rule noted above because the first word is an Itenym related to human's IDN, and the second word is an Actenym. However, the IDN of the word "frank" (Attrenym of being candid) and the IDN of the word "runs" (an Actenym), under the CETLO Rule noted above, do not form a group because the frank's IDN doesn't match the condition of the CETLO Rule. Also, the IDN of "frank" (Itenym of a sausage) and "runs" (Actenym) do not form a group or CET either because, in this case, frank's IDN does not relate to human's IDN. As a result, because only the IDN of "frank" (a human) and "runs" group; the IEB-DCE System 100 may disambiguate which IDN or meaning is correct; and therefore discard the other IDNs (frank a sausage, and frank being candid) from further processing.

Once all words' IDNs of a sentence are grouped (CETS are created) by the Pairing Module 240, the CETs pass to a Tallying Module 300, which determines if all CETs of the sentence are interconnected. This is done by tallying each CET of a sentence with at least one common IDN of another CET of the sentence. For example, if the sentence consists of two CETs; the CETs may be considered interconnected if there is an IDN that is common to both CETs. If interconnected, then both CETs of the sentence would be tallied because of their common IDN and the sentence is then considered to be correct and therefore may be understood by a human (if presented with the sentence rather than the CETs and IDNs).

If the sentence consists of three or more CETs, the process is the same in that each CET must be connected to at least one other CET via at least one matching or shared IDN. Essentially, if the Tallying Module 300 cannot connect all the CETs of the sentence being analyzed based on at least one matching IDN, then that sentence is considered not properly constructed. Under these circumstances IEB-DCE System 100 has other resources to resolve this type of sentence inconsistency.

The words, IDNs, and CETs of incomprehensible or incorrect sentences are stored in the Non-Tallying Pairs Database 340 to be processed later with the intent of discovering the reason why they failed the Tallying Module 300. This later process may include examining the IDNs and associated words, modifying, adding, or deleting entries in the Descriptive Index Dictionary 160, and/or modifying or adding CETLO Rules as needed to address non-grouped IDNs or CETs. If additional user inputs are needed to add new word meanings (IDNs), discover new types of descriptive elements, or add other analytical processes, this may be accomplished via the IDN Generator Module 393 and External Input Module 397.

Figure 2:
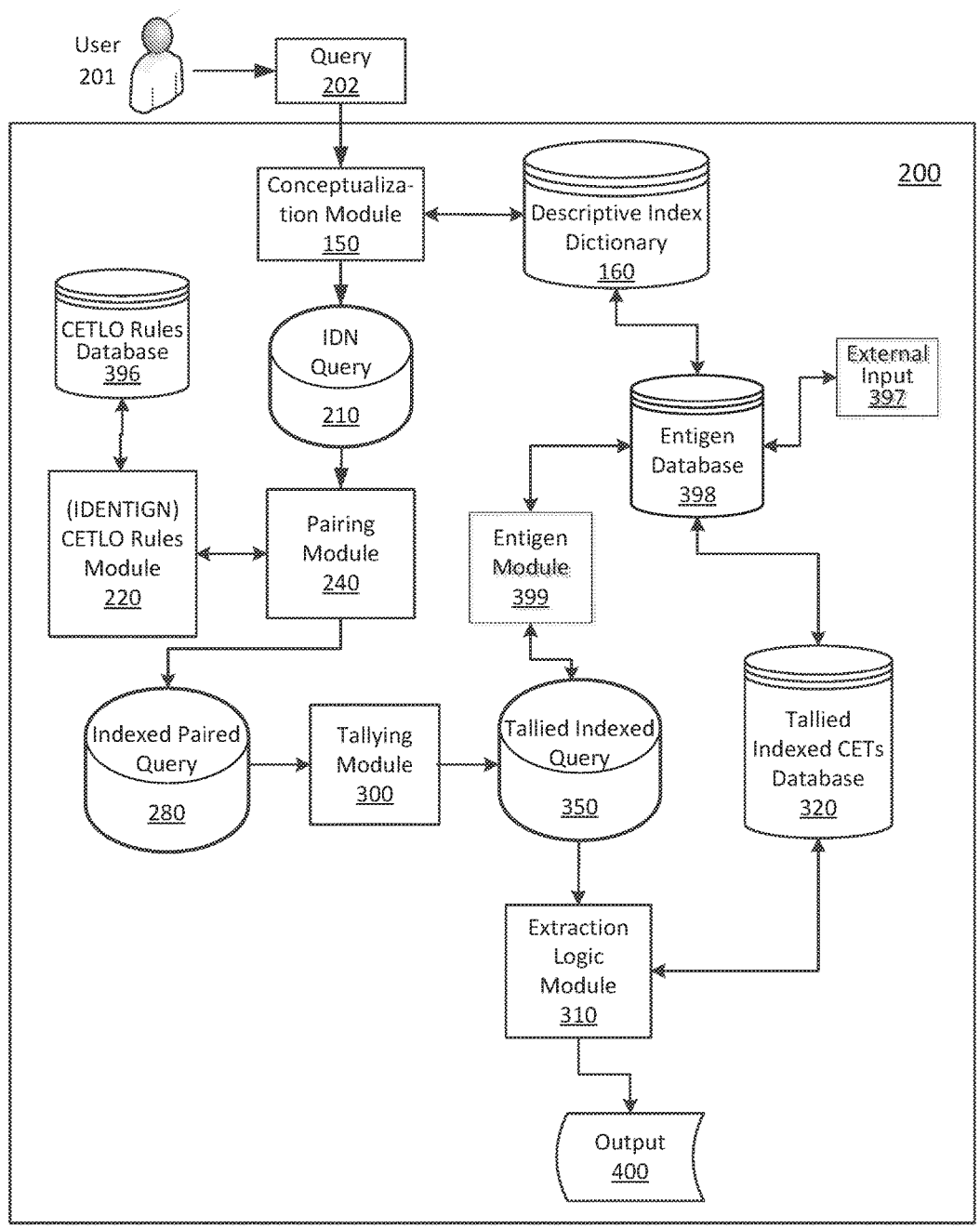
FIG. 2 is another block diagram of an example of an implementation of the system of FIG. 1 in accordance with the present invention that includes elements for querying databases.

The CETs, IDNs and other data corresponding to comprehensible sentences that passed the analysis of the Tallying Module 300, may then be stored in the optional Indexed CETs Database 260, which may be used as a means to pre-store or as a filtering stage to identify repetitive data, unwanted data or CETs before the desired CETs, IDNs and other data is moved or reproduced in the Tallied Indexed CETs Database 320, which database may then be accessed for information extraction as shown in FIG. 2.

Further, optional databases 380 and 390 may be used for anomalies, contradictions, logical sequences (inductions, deductions, and sentiments), alarms and other types of information; and Sequence Generator Module 385 may be used to generate sequences and alarm. The Entigen Database 398 also associates Entigens (unique element identifiers) with their corresponding IDNs, or CETs, add Entigens and New Entigens to corresponding IDNs or CETs, replace Entigens with their corresponding IDNs or CETs, even delete Entigens from the corresponding IDNs or CETs. In this fashion, IDNs and CETs may be used to identify specific Entigens which are unique numbers or symbols designed to identify unique, single and discreet items, actions or attributes. In this fashion, a word like "Antarctica" (Singulatum Itenym that identifies a unique place on Earth), identifies its IDN, which in turn identifies its unique Entigen whose purpose is to represent the unique place on Earth called Antarctica. Also, a word like "car" (Pluratum Itenym that identifies one or many similar vehicles) identifies its IDN, which in return is able to identify one or multiple Entigens; wherein each Entigen represents each individual vehicle from a plurality of vehicles.

In this fashion, the IDN of "Antarctica" may lead, via the Entigen Module 399, directly to its Entigen; and the IDN of "car" may lead, via the Entigen Module 399, to one or many Entigens. Accordingly, the process of identifying a word's Entigen, named Identigention, and is a rather simple process for a Singulatum. No matter who, what, where, when, why or how a Singulatum is mentioned, its Entigen is always the one. However, Pluratum Identigention may require additional processes and information to identify the intended Entigen(s).

Over time, additional data, inductions, deductions, abductions, CETs, their IDNs, their Entigens may be added to the Tallied Indexed CETs Database 320 or to the Entigen Database 398. Notably, there are several types and forms for indexing or creating indexing tables of the data in the optional Indexed CETs Database 260, the Tallied Indexed CETs Database 320 and the Entigen Database 398. For example, each IDN, CET, type of CET, section of IDN or order of IDN within the CETs, can be used as individual elements or as pairs or other groups to create specific indexes to quickly retrieve data.

Additionally, the uniqueness of each Entigen not only grants them the ability to experience exclusive associations with present IDNs, new IDNs, present Entigens and new Entigens; but more importantly, their independent nature allows Entigens to inscribe their own passage of time, named Entigen Time or "ENTime" for short. For example, the ENTime of Entigens identifiable by the Actenym "sleeps" are known to last approximately 8 hours when grouped with Entigen that represent humans (humans sleep approximately 8 hours on average). Thus, annotating when "Mary goes to sleep", for example at 10 PM, allows the IEB-DCE System to estimate that by 9 AM the next morning Mary should no longer be sleeping. In this fashion, the Time Module 388 operates in signal communication with at least the Entigen Module 399 and Entigen Database 398, so every Entigen may annotate or experience their unique existence and/or passage of time.

Turning to FIG. 2, a block diagram 200 of an example implementation of a IEB-DCE System 100 of FIG. 1 in accordance with the present invention is depicted. However, in this example of an implementation of IEB-DCE System 100, a user 201 enters a query 202 in the form of natural language text into IEB-DCE System 100. This natural language text is processed in the same manner as the data of data corpora 110, 120, and 130 of FIG. 1, resulting in CETs and their IDNs that are stored in IDN Query data file 210.

These words' IDNs pass from Conceptual Query data file 210 to Pairing Module 240, which is in signal communication with CETLO Rules module 220, both of which are again the same elements as in FIG. 1. In the same manner as in FIG. 1, the IDNs of Conceptual Query data file 210 are grouped using the CETLO Rules stored in the CETLO Rules Database 396 accessible to the CETLO Rules Module 220. The grouping of IDNs using the Conceptualization Module 150 and the Descriptive Index Dictionary 160 involves a first level of word-sense disambiguation to eliminate words that are not grammatically or syntactically correct under the CETLO Rules. The CETs that are formed by the CETLO Rules module 220 may be stored in Indexed Paired Query data file 280.

Once all IDNs of a sentence are grouped, the grouped IDNs (CETs) pass to a Tallying Module 300, which determines if all CETs of the query are interconnected. This is done by tallying each CET in the query with at least one other CET in the same query via a common IDN. Generally, a query may comprise of two or more CETs, and each CET must be connected to at least one other CET by at least one matching a IDN in both CETs. If all of the CETs of the query are found to be interconnected, and all IDNs of non-functional words are present within at least one CET, that is, it is understandable by a human user; the CETs may then be stored in the Tallied Indexed Query data file 350.

The CETs from Tallied Indexed Query data file 350 are then input into Extraction Logic module 310, which is in signal communication with Tallied Indexed CETs database 320 or the Entity Database 398. Extraction Logic module 310 is configured to extract information from the Tallied Indexed CETs database 320 by searching through the indexed tables of the Tallied Indexed CETs database 320 or the Entity Database 398 with the CETs stored in the Tallied Indexed Query data file 350. This process of information extraction may take many forms, e.g., text searching, synonym (IDN head) searching, CET searching, Entigen searching, questions and answers, as well as logical sequencing, anaphora resolution, and finding and resolving anomalies and contradictions via the Tallied Indexed CETs database 320 or the Entigen Database 398.

For example, previous to the query "Napoleon the conqueror" several documents were processed by the IBE-DCE system 100 containing two different individuals (two different Entigens) named "Napoleon." One set of documents, processed by the IEB-DCE System 100, mentioned an individual named Napoleon (an Entigen) who lived in the 1800's and who was an emperor that tried to invade many countries (the IEB-DCE System may conclude that this Napoleon or Entigen was a conqueror); while the other set of documents mentioned a Napoleon who is a dentist and lives in the current era. The query "Napoleon the conqueror" initially points to two possible different Entigens; however, using the Tallied Indexed CETs Database 320 or the Entigen Database 398, the IEB-DCE System 100 can disambiguate or correctly identify which Napoleon (which Entigen) the query is mentioning. This is because of the two possible Napoleons; one Napoleon (dentist Entigen) will create at least one contradiction or anomaly; while the other Napoleon (emperor Entigen) creates no anomalies or contradictions. Consequentially, the CBE-DCE system 100 identifies that the Napoleon in the query must be identifying the Entigen identifiable by "emperor" and thus the set of documents that contain or that are associated with this Entigen (emperor) are retrieved or displayed by the Output 400. Moreover, this process of information extraction may also include a user interface whereby a IEB-DCE System 100 prompts the user to answer queries or select options via the External Input 397 for further processing, and in response to the user's input, the IEB-DCE System 100 continues the user's query, all of which is described in greater detail herein below.

Figure 3A:
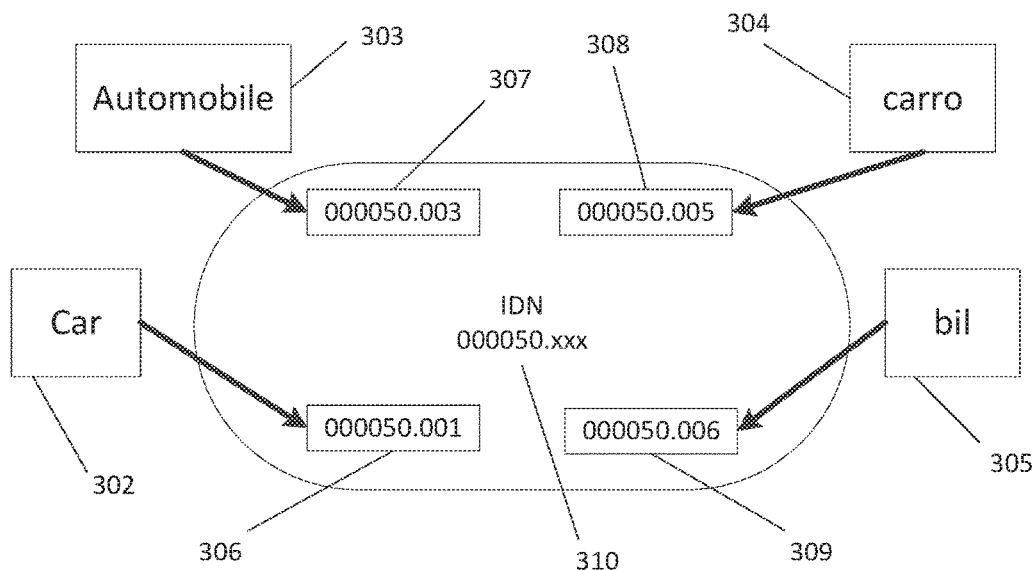
FIG. 3A is a depiction of diagram of a few exemplary synonyms words with their corresponding Identigens (IDNs) in accordance with the example of FIG. 1.
Figure 3B:
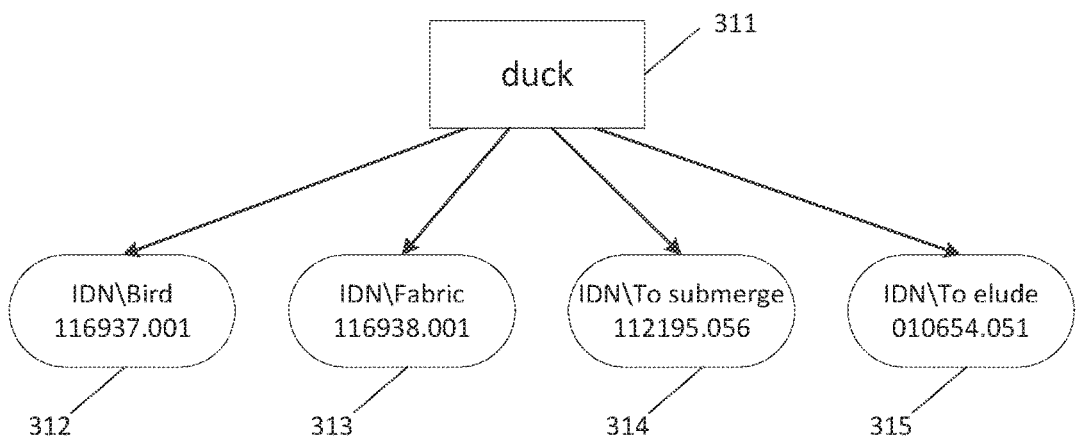
FIG. 3B is a depiction of a diagram of an exemplary polysemous word with its corresponding Identigens (IDNs) in accordance with the example of FIG. 1.

Turning to FIG. 3A and FIG. 3B, depictions that illustrate how words are organized in this example in accordance with the present invention depicted in FIG. 1 are shown. Notably, the proposed approach eliminates using words due to their inherent inconsistency. Word inconsistency is due to the fact that different words, known as Synonyms, can identify the same concept or intended Entigen (i.e., car, auto and automobile); while other words, known as polysemous, can identify different concepts or their intended Entigens (frank a sausage and frank being candid). For example, the word "frank" by itself, fails to identify which of its meanings (sausage or candid) it is describing. However, annotating one of frank's IDNs exactly describes the intended meaning. Additionally, dividing IDNs based of their words' intended descriptive purpose (whether the IDN identifies an action, and attribute or an item) not only removes grammar's complexity, but allows the IEB-DCE System 100 to begin showing the same consistency that is typical of mathematical numbers and symbols (i.e., the number 3 unequivocally describes one and only one quantity, that is, the quantity of three and vice versa). Returning to FIG. 3A, a synonym (different words that have identical meaning) "car" 302 identifies its IDN 306 or "000050.000"; the synonym "automobile" 303 identifies its IDN 307 or 000050.003; the synonym "carro" 304 (in Spanish) identifies its IDN 308 or "000050.005"; and the synonym "bil" 305 (in Danish) identifies its IDN 309 or "000050.006". As illustrated all IDNs belong to the same IDN family 310 or share the same "IDN head"; and the only difference among them is their decimal portion, which is also called IDN tail. For example, the IDN of car or "000050.001" 306 and the IDN of automobile or "000050.003" 307 are practically identical because they both have the same IDN head, but have different IDN tail (decimal part). In this fashion, the IDN family or "000050.xxx" 310 can be used to represent the concept of all synonyms and the decimal part can represent the actual word. Moreover, by ignoring or removing the decimal part of any IDN, it makes all IDNs equal and therefore all their corresponding words equal. As a result, annotating the IDNs instead of the words, allows the system to equate all of their corresponding synonym words or differentiate between words by including or excluding the IDN tails. Notably, the number of characters or numbers IDNs, including their tails, have depends on the designer of the IEB-DCE System or the number of words and meanings a target language or languages may have.

Turning to FIG. 3B, an exemplary chart of a polysemous word and its IDNs in accordance with an example implantation of the presented invention depicted in FIG. 1 is shown. Polysemous words are identical words that have different meanings. The polysemous word "duck" 311 points or identifies three different IDNs, such as the first meaning IDN 312 which annotates the meaning of a bird and it is represented by number "116937.001"; the second meaning IDN 313 which annotates the meaning of a fabric and it is represented by number "116938.001"; the third meaning IDN 314 which annotates the meaning of submerging one's head which is represented by the number "112195.056"; and the fourth meaning IDN 315 which annotates the meaning of eluding an object, which is represented by number "010654.051". In this fashion, the IDNs, also known as Identigens, annotate and represent the different meaning that their word "duck" has in language. As a result, by annotating the IDN instead of its word, the system is able to identify and differentiate the specific meaning/concepts that the polysemous word is describing or implying. Noteworthy, annotating IDNs instead of their words, introduces into the system, the same consistency that mathematical symbols follow in math. Noteworthy, the formatting "IDN\Bird" is used herein and in the later figures to describe the IDN of the word "Bird" and other formatting like "IDN\116937.001" will be used to describe that number "116937.001" is actually an IDN as well unless specified otherwise.

Figure 3C:
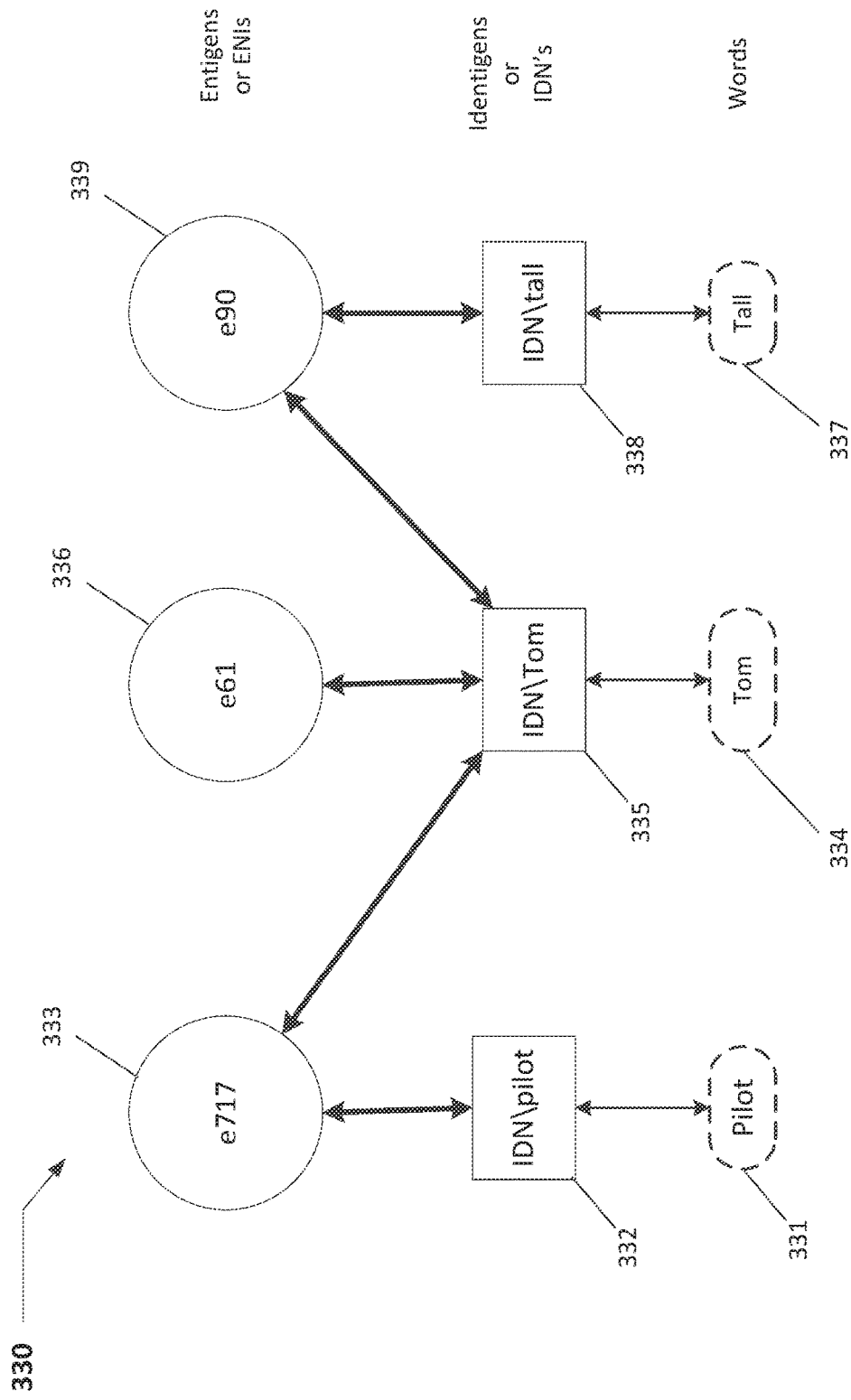
FIG. 3C is a depiction of several words, their Identigens and their corresponding Entigens in accordance with the example of FIG. 1.

In FIG. 3C, an exemplary schematic 330 of how several words, their Identigens and their corresponding Entigens may be organized in accordance with an exemplary implementation of FIG. 1 is shown. For example, the word "Pilot" 331 is identified by its Identigen 332 or "IDN\pilot", which in turn identifies the First Entigen 333 or "e717". Like this, "pilot" identifies its Identigen which in this example identifies a single Entigen. In similar fashion, the word "tall" 337 is identified by its Identigen or "IDN\tall", which in turn identifies the Third Entigen 339 or "e90". However, the word "Tom" 334 identifies its Identigen or "IDN\Tom" which in return is capable of identifying three different entities such as the first Entigen 333 or "e717", the Second Entigen 336 or "e61" and the Third Entigen 339 or "e90". Accordingly, the first Entigen 333 can also be identified when the Identigen of Pilot 332 and the Identigen of Tom 335 combine into a CET which linguistically is comparable to "pilot Tom". Also, the third Entigen 339 can be distinguished from the other Entigens when the Identigen of Tom 335 and the Identigen of tall 338 combine into another CET which would be linguistically comparable to "tall Tom". In this fashion, "pilot Tom" identifies the first Entigen 333, "tall Tom" identifies the third Entigen 339 and Tom identifies all three Entigens e717, e61 and e90 simultaneously. As a result, in order to distinguish the second Entigen 336 or "e61" from the other two entities (e717 and e90), at least one additional Identigen and CET will be necessary. Like this, the process for identifying an Entigen, which is exemplified in greater detail herein later can use several Identigens which were not originally combined. Significantly, it is possible to relate the words directly to their intended Entigens, thus bypassing the need of implementing Identigens in other approaches.

In FIG. 3D, a table 340 depicting exemplary stick-figures of things, their words-names, types of words, Identigens (or IDNs) and corresponding Entigens in accordance with an example implementation of the presented invention of FIG. 1 is shown. As illustrated, the Observables 341 column contains the stick-figures of some exemplary observable things (items, action, and attributes), whether physical or abstract, which words naturally intend to describe or identify. Next, the Word 342 column contains the words or names used to describe the items, actions or attributes shown by the stick-figures. Next, Word Type 343 contains the descriptive identification (AIA) or the type of word that each word has in the system. Next, Identigen 344 column contains the IDNs used to replace or annotate their corresponding words. Next, the Entigen 346 column contains the unique Entigens (i.e., a unique number) used to represent each item, action or attribute shown by the stick-figures. For example, the first record, shows the stick-figure of an item (a person), which is identifiable by the word "person" which is an "Itenym" or "ite" (identifies or describes an item), which is identified by an Identigen "IDN 1234.001" (or IDN\person), which identifies an Entigen "e51". The second record, displays a stick-figure of an action (the action of running), which is identifiable by the word "run", which is an "Actenym", which identifies an Identigen "IDN 333.02" (or IDN\run), which identifies an Entigen "e77777". In similar fashion, the third record, displays a stick-figure of an attribute (quickly), which is identifiable by the word "quickly", which is an "Attrenym", which is identified by an Identigen "IDN 8181.002" (or IDN\quickly), which identifies an Entigen "e401". Finally, the fourth record displays a stick-figure of two items (two mountains), which are identifiable by the word "mountains" (a Pluratum), which is an "Itenym", which is identified by an Identigen "IDN 3737.008" (or IDN\mountains) which in this example is capable of identifying two Entigens such as "e123" and "e124" which represent each of the mountains of the stick-figure (each mountain has its own Entigen).

In FIG. 3E, a graphical user interface (GUI) 350 displaying a formatted portion of an example of a Descriptive Index Dictionary 160 of FIG. 1 in accordance with an example implementation of the invention is illustrated. The Words 351 column of GUI 350 contains words of the Descriptive Index Dictionary; the Language 352 column depicts a character used for describing the language of the corresponding word; the Country 353 column depicts another character used for describing the country where the word is used; the IDN 354 column depicts the Identigen of each word; the AIA 355 column depicts the word's descriptive type; and the Description 356 column depicts a brief description of the corresponding word. For example, the first record is the "Antarctica" which language is "1" or English, used in country "1" or the USA, which IDN is "666002.000", which AIA is "ite.1" meaning that is an Itenym describing a single item and which description is "the South Pole". Notably, even in the English language, in different countries there are English words that have different meanings. By combining the country with the type of language (i.e., English) allows the IEB-DCE System 100 to identify each country, cultural meaning that each word may have. In fact, additional columns or information may be added to distinguish the specific meaning that a given a word has based on the county, city, even age of the users of the IEB-DCE System 100. Returning to FIG. 3E, another example is the second record or the word "Beautiful" which is in language "1" (English) used in country "1" (USA), which IDN is "373839.001", which AIA is "ci" meaning a characteristic used to modify or describe items, which description is "pleasing the senses." The next exemplary word is on the third record or "Quickly" which is in language "1" (English), country "1" (USA), Identigen "272727.01" and AIA "ca" which is this example is used to describe attributes that are used for modifying or describing actions. The fourth record "Fast" which Identigen is "272222.3" has an AIA "cu" meaning that is a word that can be used for modifying or describing items and/or actions. On the fifth, sixth, seventh and eighth records are the different words in different temporal forms used for describing the act of walking or traveling with one's feet. As illustrated in the AIA 355 column, the AIAs vary in the last character (n, s, i, d) which are used for annotating the action's temporal value or form. Next, the ninth record "Horse" has an Identigen "111222.000", has an AIA "ite.1" meaning that it is an Itenym (word describing an item or object) wherein the decimal value of the AIA or ".1" is used in this example to describe that the word describes a single item. The tenth record "Caballo" shows that this word belongs to language "2" or Spanish, belongs to country "2" used in this example to describe Costa Rica, and with an AIA "ite.1" meaning an Itenym, describing a single item, just like its translation in English "horse" does. Notably, Horse's Identigen and Caballo's Identigen are practically the same except for their decimal values which are used to identify each specific word (horse versus caballo). Finally, the last record shows the word "Caballos" which means horses in English. Notably, caballos' AIA or "ite.2" differs from horse and caballo's AIA or "ite.1", wherein character ".2" is used for identifying Pluratums (IDNs capable of identifying multiple Entigens); while ".1" is used for identifying a Singulatum (IDN that identifies a single Entigen of an action, item or attribute).

Figure 3F:
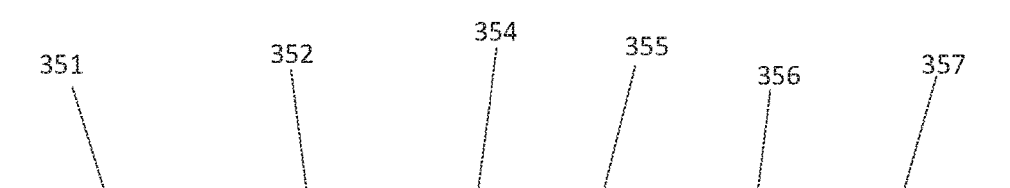

In FIG. 3F, a graphical user interface (GUI) 360 displaying a formatted portion of an example of a Descriptive Index Dictionary 160 of FIG. 1 depicting polysemous words in accordance with an example implementation of the present invention is illustrated. The Words 351 column of GUI 350 contains words of a Descriptive Index Dictionary 160; the Language 352 column depicts a character used for describing the language of the corresponding word; the IDN 354 column depicts the Identigen of each word; the AIA 355 column depicts the word's descriptive type; the Description 356 column depicts a brief description of the corresponding word; and the Singulatum 357 column depicts whether the word is a Singulatum (word identifying a unique entity or its Entigen) or not (i.e., Pluratum). For example, the first record displays the first word "Ducks" which is in language "1" (i.e., English) its Identigen or "116938.001" its AIA or "ite.2" (meaning that is an Itenym in plural form), its description or "a fabric" and its Singulatum status or "no" meaning that "Ducks" identifies one or many distinct items. The second record displays the second word or "Ducks" too; with its Language identifier or "1" its distinctive Identigen or "116937.001" its AIA or "ite.2" meaning that it is also an Itenym in plural form; its description or "a bird" and its Singulatum status or "no" meaning that it identifies one or many items (many birds). In similar fashion, the third and the fourth records show more words "Ducks" with different Identigens, different AIAs corresponding to different types of actions, and obviously different descriptions. Like this, "Ducks" describes two different Itenyms and two different Actenyms. From the fifth to the twelfth records, additional forms of the different Ducks are shown. The thirteenth record or "Ship" shows, under the AIA 355 column, "acn" meaning that is a transitive Actenym which is not a Singulatum. The fourteenth record or "Shipment" shows, under the AIA column, "acm.2" meaning that it is a word describing an event, or the event that resulted from action of shipping something. Notably, the majority of Actenyms are Pluratums because they identify several actions; however, there are few Actenyms which words or Identigens identify a uniquely distinctive event like the "Big Bang" (according to most theories, there is only one Big Bang). Finally, the fifteenth record shows again the word "Antarctica" with its AIA or "ite.1" (Itenym in singular form) in addition to its Singulatum status or "yes" meaning that it is an Itenym capable of only describing a single and unique Entigen.

Figure 4A:
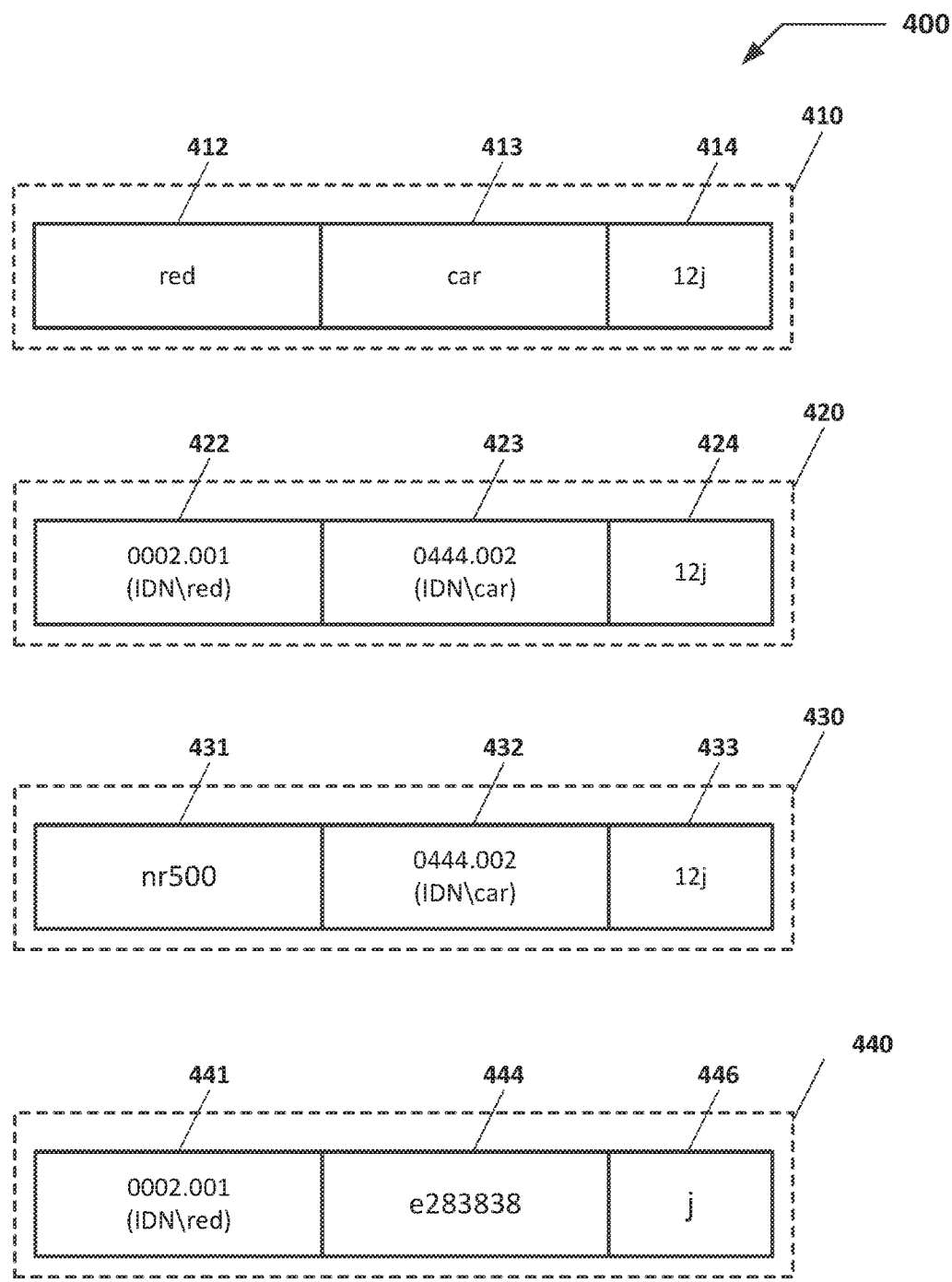
FIGS. 4A-B are exemplary schematic depictions of various types of CETs in accordance with the example implementation of FIG. 1.

In FIG. 4A, several exemplary schematic depictions 400 of various types of CETs, comprising words, IDNs and Entigens in accordance with an example implementation of the present approach of FIG. 1 are shown. The first CET comprises the word "red" 412 and the word "car" 413 which form a group or CET type "12j" 414. Notably, this type of CET is here referred as a WORDCET 410 because it contains at least one original word or number. The second CET 420 is a type "12J" 424, but unlike the previous CET, this CET displays the actual IDNs "0002.001" 422 (IDN\red) and "0444.002" 423 (IDN\car). Notably this kind of CET is here referred as an IDCET because it comprises IDNs. The exemplary third CET 430 which was constructed from the phrase "500 cars" contains the original number "500" which is represented by "nr500" 431 and car's Identigen or "0004.004" 432 (or IDN\car). This CET is also a type "12j" 433. Notably, this CET makes use of another formatting or "nr" and then the "number" (i.e., nr500) to differentiate numbers from IDNs, Entigens or other values. Notably, numbers, due to their consistency, don't need to be annotated or replaced by IDNs like words. The fourth CET 440 is called an ENCET because it comprises at least one Entigen "e283838" 444 in the CET. As shown, this ENCET involves "0002.001" 441 which corresponds to "red" and the Entigen "e283838" 444 which corresponds to a unique and single car. As illustrated, this ENCET is type "j" 446 indicating the relationship that exists between the Entigen and the IDN of the color called "red". In this fashion, the ENCET is annotating a specific red car.

In this fashion, FIG. 4A also illustrates how the WORDCET 410 may lead to an IDCET 420, and how this IDCET 420 may lead to its final ENCET 440. Notably, WORDCETs will form an integral part of the system when different IEB-DCE Systems begin to communicate or learn from one another. This is because to keep all IDNs and Entigens standard across all systems would be difficult, if not impossible. Like humans, the systems will learn the items, actions and attributes that make up their own world and when they need to share this information, the most practical way is to use a standard communication platform like a natural language.

While natural languages may be the best way for humans to communicate (a standard communication platform), natural languages is very inconsistent. For example, although "Mary saw Lisa in the park" is grammatically correct, this sentence is semantically ambiguous because it fails to describe who is in the park (Mary or Lisa). However, WORDCETs although using words, do group words in the correct types of CETs thus removing semantic ambiguity.

Figure 4B:
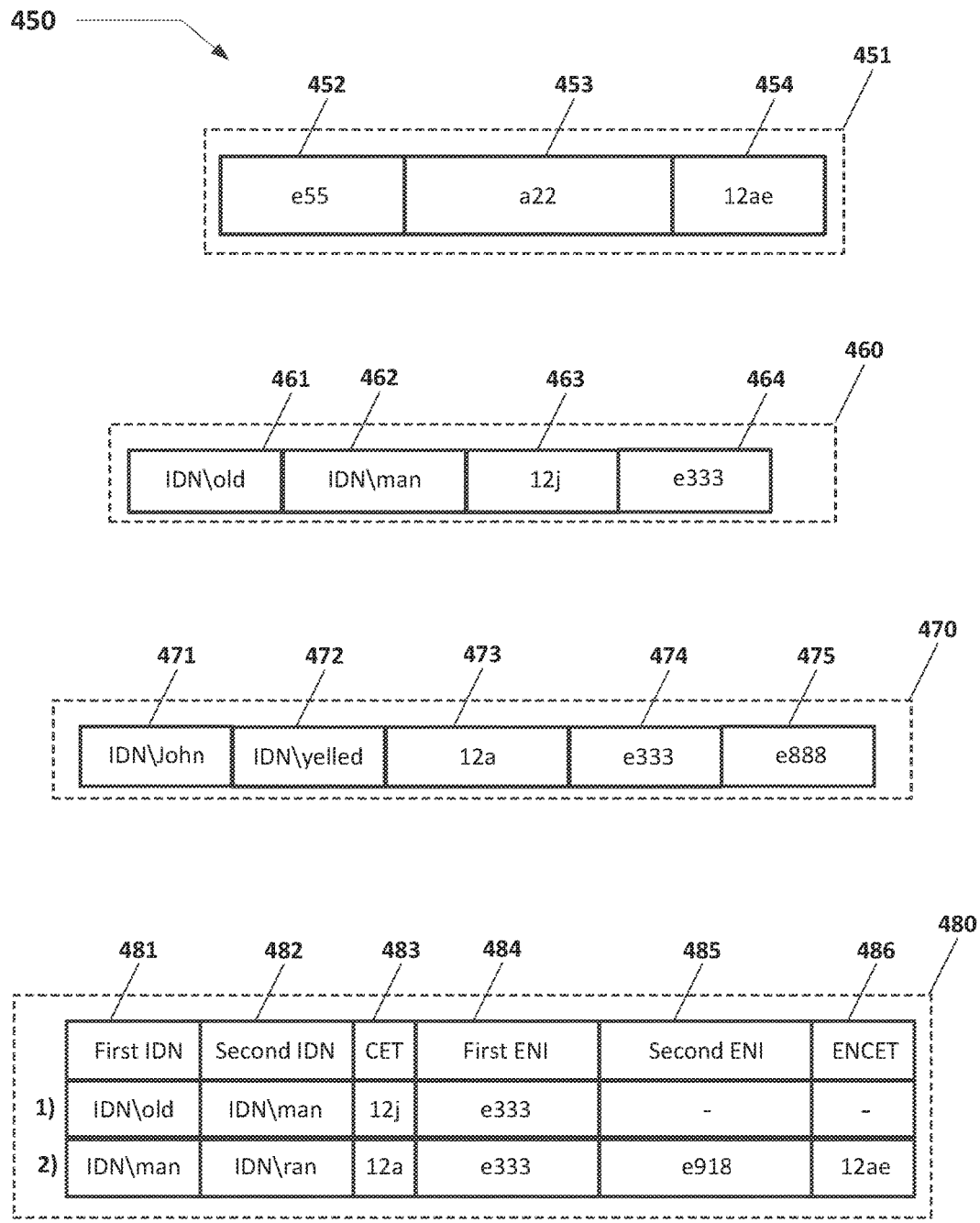

In FIG. 4B, several exemplary schematic depictions 450 of various types of CETs, comprising IDNs and Entigens, in accordance with an example implementation of FIG. 1 are shown. The ENCET 451 comprises two Entigens or "e55" 452 and "a22" 453 which together form a CET type "12ae" 454. The next complex ENCET 460 comprises the Identigen of old or "IDN\old" 461, the Identigen of man or "IDN\man" 462, which make a CET type "12j" 463, and Entigen "e333" 464; wherein e333 is identifiable via this 12j CET. In other words, IDCET 12j of "old man" identifies e333. The next complex ENCET 470 comprises several IDNs and their Entigens such as "IDN\John" 471, "IDN\yelled" 472 type "12a" 473, the Entigen that IDN\John identifies or "e333" 474 and the Entigen that yelled identifies or "e888" 475.

Notice how e333 of the Second CET 460 is the same Entigen in the Third CET 470, meaning that the Second CET 460 and IDN\John both equally identify Entigen e333. Next, GUI 480 depicts six Columns and two Rows. The First IDN 481 column and Second IDN 482 column contain the words' Identigens (IDNs). The CET 483 column contains the type of CET that the IDNs form with one another. The First Entigen 484 column and the Second Entigen 485 column contain the first Entigen and/or second Entigen that the respective IDNs identify. Finally, the ENCET 486 column contains the type of CET that the Entigens make with each other. Like this, the IDNs, IDCETs, corresponding Entigens and corresponding ENCETs can be combined in a single GUI 480. For example, the first record contains IDNI\old, IDN\man in a CET type 12j which is linguistically comparable to "old man" and identify Entigen e333. While the second record combines IDN\man, IDN\ran in a CET 12a which linguistically is comparable to "the man ran", and Entigens e333 and e918, meaning that e333 (John the old man) experienced a particular action e918 (ran). Notably, the first record of the GUI 480 shows no second Entigen in its Second Entigen 485 column; meaning that this IDCET does not create an ENCET but simply identifies a single Entigen (e333). Like this, there are IDCETs that identify Entigens (i.e., 12j); while other IDCETs combine Entigens (i.e., 12a).

Figure 5A:
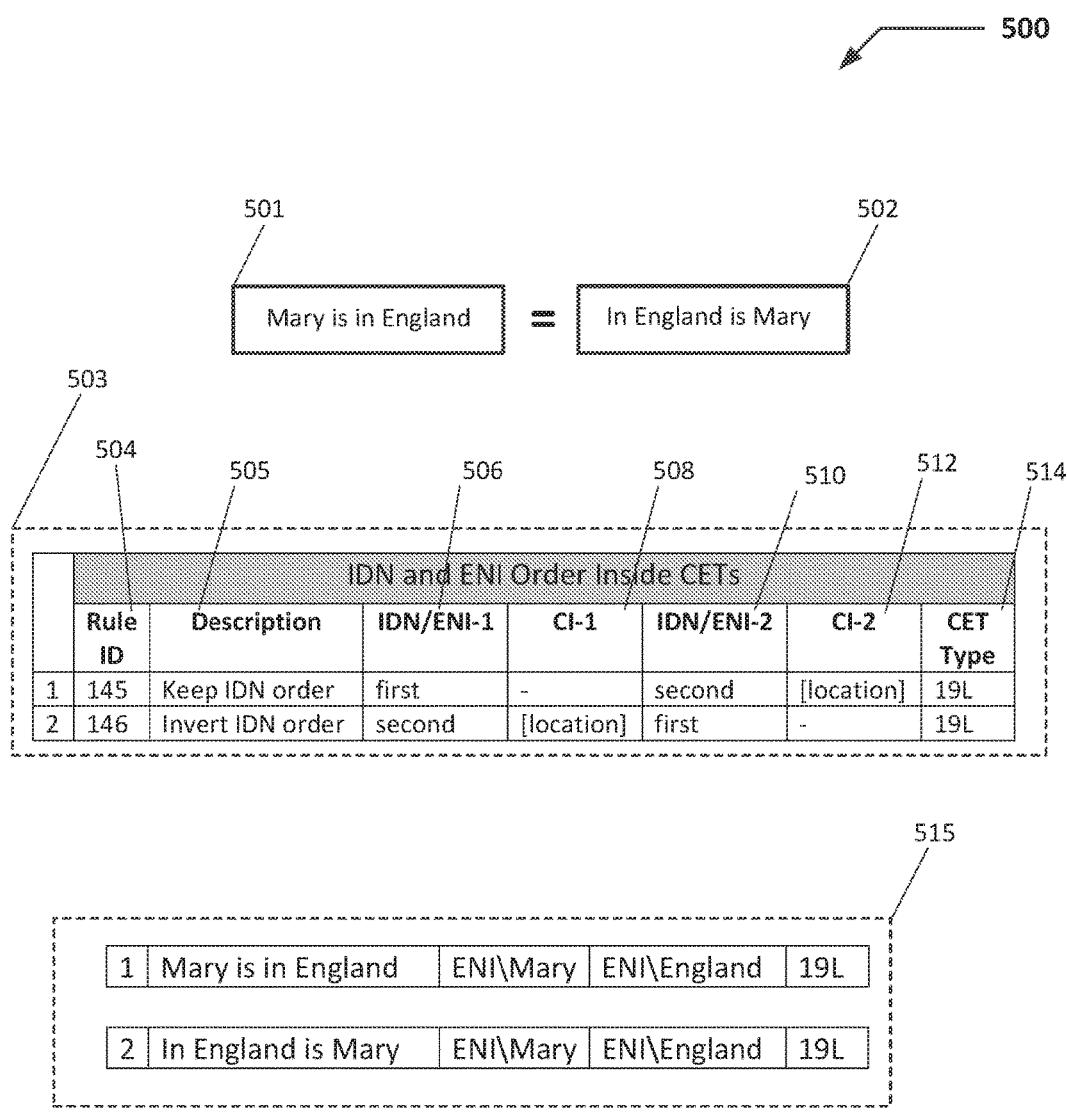
FIG. 5A is an exemplary depiction approach of successions that some IDNs and Entigens follow in exemplary CETs in accordance with the example of FIG. 1.

Turning to FIG. 5A, several exemplary depictions 500 displaying two conceptually equal sentences, a formatted portion of an example of an IDN and ENI Order Inside CETs GUI which describes the succession that IDNs or Entigens follow inside CETs that the CETLO Rules Database 396, FIG. 1 and the resulting CETs that were created in accordance with an example implementation of FIG. 1 is shown. In natural languages, the order or succession that words appear in sentences may change but what they describe conceptually together could be the same. Fortunately, CETs offer a solution since the order in which IDNs are arranged inside these CETs may be equated so word order is not a limitation. For example, the sentences "Mary is in England" and "in England is Mary" both describe, conceptually speaking, exactly the same thing; but the succession of the words which "Mary" and "England" followed in both sentences is different (in the first sentence "Mary" is first, but in the second "England" is first). Consequentially, the order that the IDNs of "Mary" and "England" follow inside the CETs may be equated/standardized, so the CETs are always equal regardless of word order. Returning to FIG. 5A, a first Sentence 501 or "Mary is in England" and the second Sentence 502 or "In England is Mary" are equated to illustrated that both sentences are conceptually speaking identical although their word order is different. The IDN and ENI Order Inside CETs GUI 503 displays several columns such as the Rule ID 504 column which displays the number of the CETLO Rule responsible for creating the CET; the Description 505 column provides a brief describes of the order that the IDNs will follow inside the CET; the IDN/ENI-1 506 column displays whether the first IDN in the sentence is also the first IDN or Entigen inside the CET; the CI-1 508 column displays the category of the first IDN or Entigen of the CET; the IDN/ENI-2 510 column displays whether the second IDN of the sentence is also the second IDN or Entigen inside the CET; the CI-2 512 column displays a category of the second IDN or Entigen of the CET; and the CET Type 514 column displays the type of CET that the CETLO Rule formed. For example, the first record or rule "145" shows it description or "keep IDN order" meaning that this rule does not change the order of the IDNs inside the CET. Accordingly, this rule next shows "first" (506 column) verifying the Description 505 or that the first IDN from the sentence it is also first IDN inside the CET; then shows no value for the category of the first IDN; then shows "second" (510 column) verifying that the second IDN used from the sentence it is also the second IDN or Entigen inside the CET; then displays "[location]" meaning that the second IDN must have "location" as its category (i.e., Antarctica, New York, Europe and their corresponding IDNs are all locations); and finally it displays the type of CET or "19L". In contrast, the second rule below changes the order of how the IDNs of the sentence will appear inside the CET. For example, the second record or rule "146" shows its Description or "Invert IDN order" meaning that the original order of the IDNs from the sentence has to be changed inside the CET. Accordingly, this rule shows next "second" (506 column) verifying the description or that the second IDN of the sentence becomes the first IDN inside the CET; then shows "[location]" which is the category of the first IDN inside the CET; then shows "first" (510 column) verifying that the first IDN from the sentence becomes the second IDN inside the CET, then it shows no categorical condition for the second IDN, and finally that this CET is also a type "19L". The Results 515 show both sentences and their resulting CETs. For example, the first record displays the first Sentence or "Mary is in England" next to its corresponding ENCET which comprises the ENI of Mary (ENI\Mary), then the ENI of England (ENI\England) and their type of CET (19L). The second record displays the Second Sentence or "In England is Mary" next to its corresponding ENCET which comprises the ENI of Mary (ENI\Mary) next to the ENI of England (ENI\England) and their CET type (19L). As illustrated, the word order in the sentences is different, but the IDN order and CET types are identical; meaning that CETs can equalize sentences conceptually.

Figure 5B:
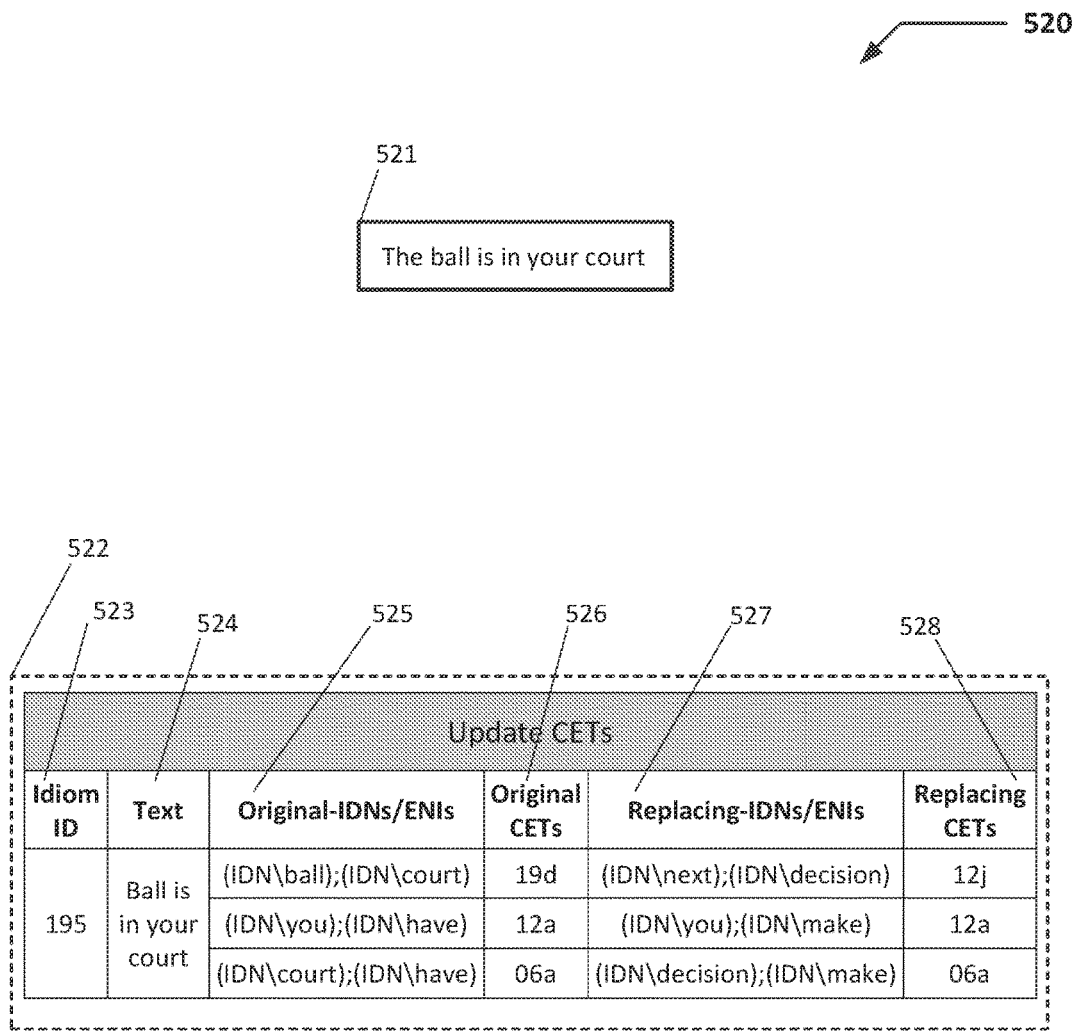
FIG. 5B is an exemplary formatted portion for handling Idioms and other word formatted information in accordance with the example of FIG. 1.

In FIG. 5B, several schematics 520 display several GUIs, sentences, CETs of an exemplary idiom and its reconstruction in accordance with the exemplary implementation of FIG. 1 are shown. Natural languages contain specific word successions called "idioms" which express different ideas than the words of the succession. For example, the idiom "at the drop of a hat" describes the concept of "instantly" and not "the falling of a hat" per se. Accordingly, when an idiomatic succession occurs, its IDNs are replaced with the intended IDNs or CETs. Therefore, the word succession or idiom "at the drop of a hat" could be interpreted as a collocation which in the Descriptive Dictionary points to a single IDN which is in the same value range than the IDN of instantly (IDN\instantly). Like this, an entire idiom can be substitute with a single IDN. However, there are other more "Complex Idioms", like those that encompass, not one IDN like "instantly", but several IDNs instead. For example, the idiom "the ball is in your court" expresses "you make the next decision" which not only involves "you" (a person to be determined), but in addition, it also introduces the action and item of "make a decision." As a matter of fact, this Complex Idiom can also be modified from its original succession (the ball is in your court) to "the ball is in accounting's court" which still expresses the same idea of "having to make a decision", but the individual who needs to make the decision has now being changed (the idiom changed the decision maker from "you" to the "accounting department"). As a result, these idioms cannot be replaced with a single IDN (like instantly) but instead, they need to be replaced by several of their intended IDNs and these IDNs then need to make CETs with their corresponding IDNs. Returning to FIG. 5B, when the Complex Idiom 521 or "the ball is in your court" is processed by the IEB-DCE System (100, FIG. 1) it will generate a series of CETs. The Update CETs GUI 522 depicts the original CETs that the Complex Idiom forms next to the CETs that will replace the original CETs. For example, the exemplary Update GUI 522 displays the Idiom ID 523 column which depicts the number of the Idiom or "195"; the Text 524 column depicts the words of the idiom or "the ball is in your court"; the Original IDNs column 525 depicts the IDNs that the idiom introduces; the Original CETs column 526 depicts the type of CETs that the IDNs of the idiom form; the Replacing IDNs column 527 depicts the IDNs that will be added (or replace idiom's IDNs); and the Replacing CETs column 528 depicts the types of CETs that the new or replacing IDNs form. Notably, in this example, all the original CETs of the Complex Idiom are replaced with new ones (no original CET repeats in the replacing CETs); but there are other idioms that keep some CETs (repeat in the replacing CETs column 527 and 528) and others which introduce specific things (Entigen of an action, item or attribute). As a matter of fact, if the Original CETs of the Complex Idiom comprise the entire IDN (i.e., entire number including the decimal portion) then the Update CETs would only modify the exact words; however, if the Original CETs of the Complex Idiom comprises only the IDN head (no decimal portion) then the idiom may allow synonym words. For example, if the decimals of the IDNs are annotate, then the idiom must comprise the exact words; but if the decimals are omitted from the original CETs, then a phrase such as "the ball is in your courtyard" may be treated as the idiom itself (court and courtyard are synonyms).

Figure 6A:
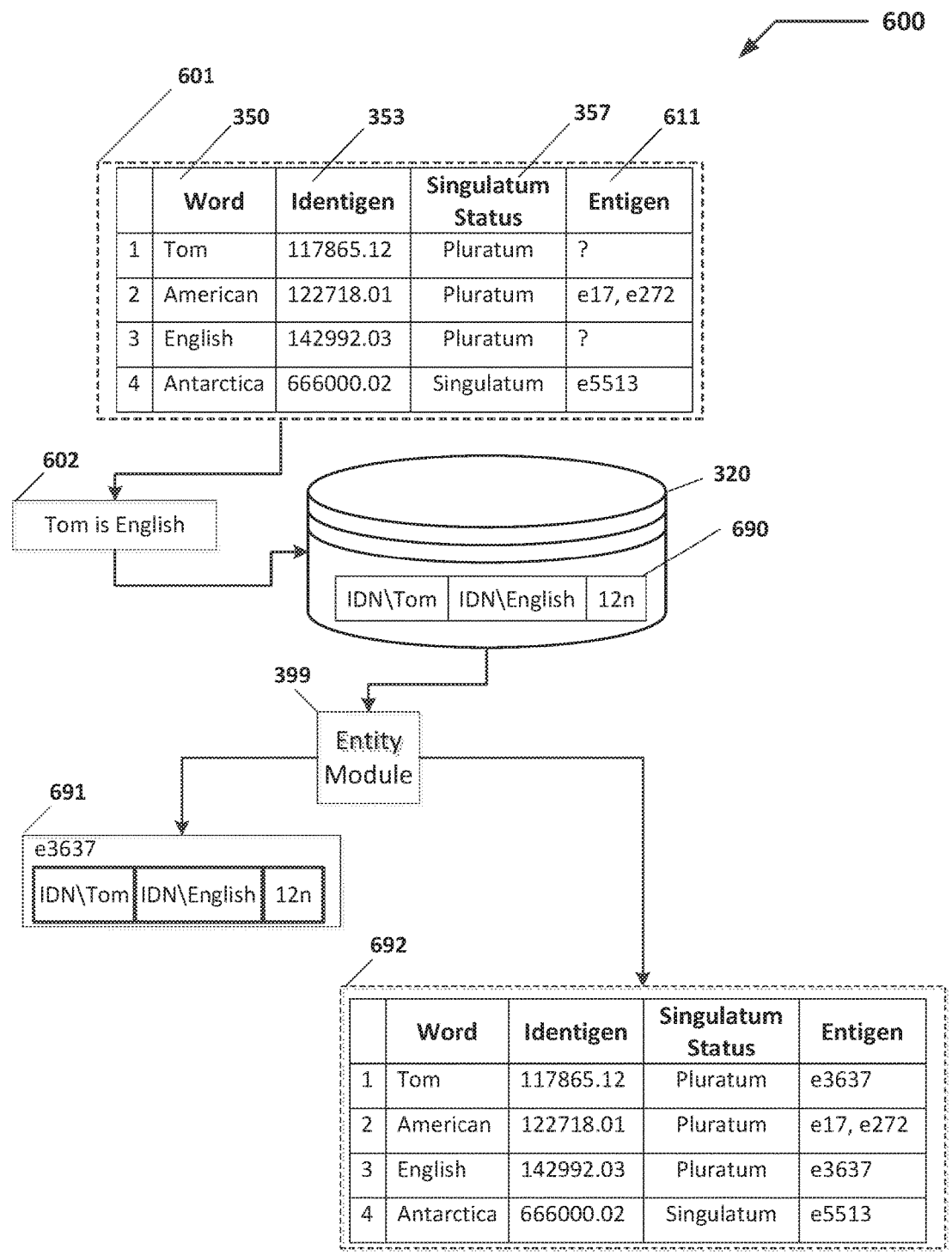
FIGS. 6A-6C are exemplary schematic depictions of various types of CETs, databases, processes and entities and their Entigens in accordance with the example of FIG. 1.

In FIG. 6A, several exemplary schematic depictions 600 of various types of CETs, databases, processes and Entigens in accordance with the example implementation of FIG. 1 are shown. The Original Descriptive Index Dictionary 601 depicts a graphical interface comprising several columns such as the Word 350 column which displays every word; the Identigen 353 column which displays the IDN that each word identifies; the Singulatum Status column 357 which describes whether the word is a Singulatum or a Pluratum; and the Entigen column 611 which displays any Entigen that the corresponding word or IDN may identify. For example, the first record shows that the word "Tom" identifies an Identigen "117865.12" which is not a Singulatum or "Pluratum"; yet this Pluratum identifies no Entigen yet or "?". Notably, in this example, the Original Descriptive Dictionary 601 is acknowledging that "Tom" is able to identify many Entigens, yet it doesn't tell the IEB-DCE System, which are Tom's Entigens. Like this, as the IEB-DCE System 100 begins to read and learns of a specific Tom in the future, the IEB-DCE System 100 will assign Tom its own Entigen. Another example is the fourth record which describes that "Antarctica" identifies an Identigen "666000.02"; which is a "Singulatum" which identifies an Entigen "e5513". Notably, unlike Tom, the Itenym Antarctica already has its Entigen which represents a unique polar region. Later, when the sentence 602 or "Tom is English" is processed, the IEB-DCE System generates in the Tallied Index CETs Database 320 a corresponding IDCET 690 that involves "IDN\Tom" and "IDN\English" in a "12n" type CET. Next, the process for creating Entigens, named Entigenetion, is carried out by the Entity Module 399 which generates Entigen e3637 which is shown in its newly created Entigen Profile 691. Accordingly, the Entigen Profile 691 of Entigen e3637 shows that e3637 can be identified independently by the Itenyms corresponding to IDN\Tom or IDN\English and/or by the CET type 12n of both IDNs. As a result, in this example, the Descriptive Dictionary is updated to display Tom's newly created Entigen (e3637) which is shown in the first record in Updated Descriptive Dictionary Display 692.

Figure 6B:
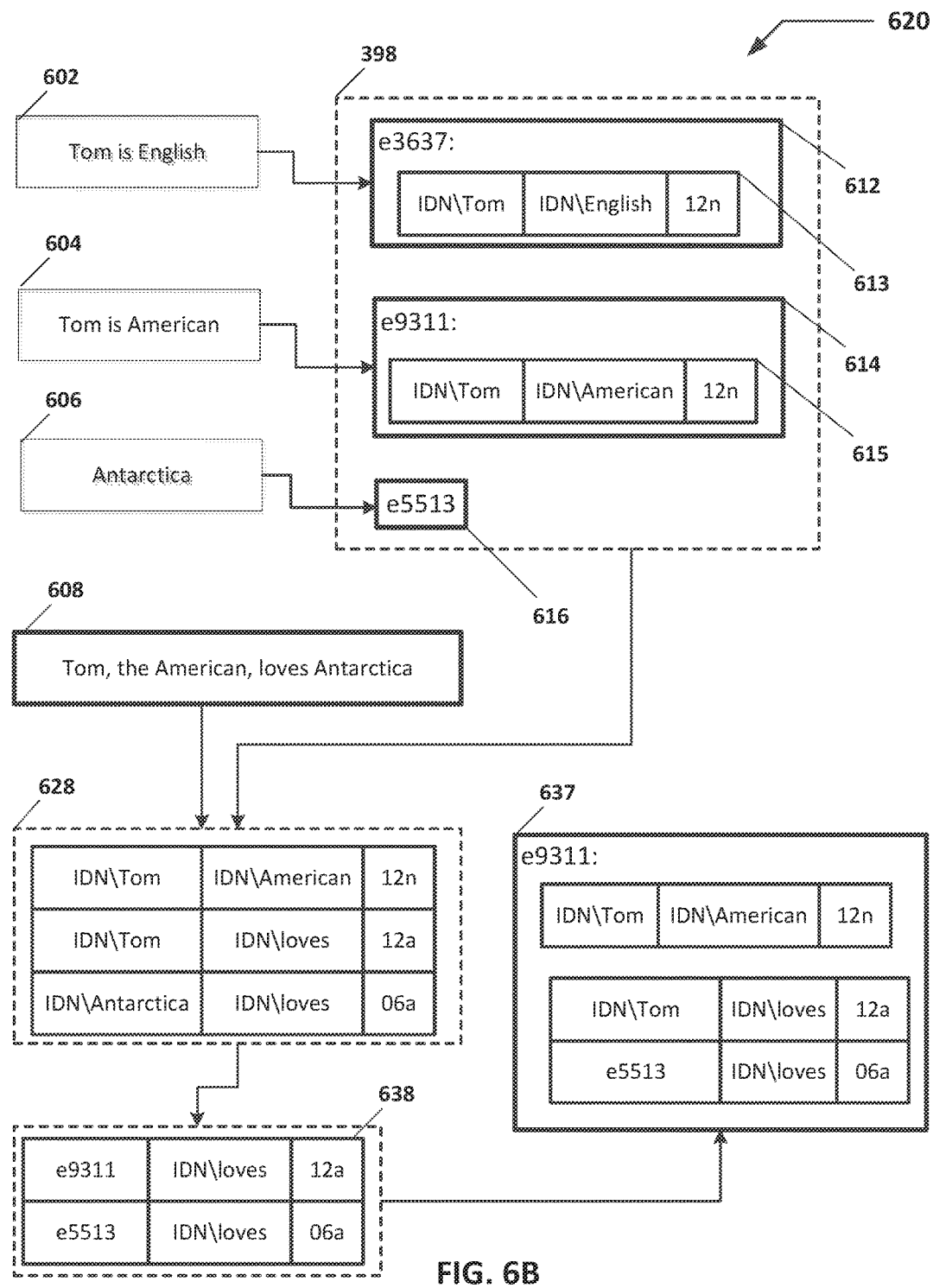

In FIG. 6B, a block and flow diagram 620 of several exemplary schematic depictions of various types of CETs, databases and processes in accordance with the proposed approach from FIG. 1 are shown. The first sentence 602, via the Entity Module 399, FIG. 1 created the First Entigen Profile 612 of Entigen e3637 in the Entigen Database 398, which was exemplified in FIG. 6A. The Second Sentence 604 or "Tom is American", via the Entigen Module 399 FIG. 1 formed the Second Entigen Profile 614 of Entigen e9311 which in turn is identifiable by the Second IDCET 615. Consequentially, in this example the Itenym Tom can identify two different individuals (two Entigens) thus requiring that additional information be present that can help identify which Entigen (which individual) is Tom describing. However, because the Singulatum "Antarctica" 606 identifies a single Entigen 616 or e5513, there is no need of additional information (the word Antarctica by itself identifies Entigen e5513). Next, the exemplary Entry Sentence 608 or "Tom, the American, loves Antarctica" is processed by the IEB-DCE System 100 which results in several CETs depicted in Data Entry Table 628. Next, the Identigention procedure, which may be carried out by the Entity Module 399, FIG. 1, tries to identify the specific Entigens that the CETs 628 are identifying. Notably, this allows the IEB-DCE System 100 not only the ability to identify or create new Entigens encompassed by autonomous data entry; but also incorporate situational, spatial or time awareness.

Returning to FIG. 6B, next, Identigention of Data Entry Table 628 discovers that the second sentence 604 (Tom is an American) is describing e9311. For example, the first CET in the Data Entry GUI 628 is the same as CET 615 which can be used to identify Entigen e9311, while Entigen e3637 is identifiable via another CET 613. Accordingly, the Result GUI 638 now displays the corresponding ENCETs using Entigen e9311; and the newly updated Entigen Profile 637 (previously Entigen Profile 614) comprising the newly processed CETs for identifying e9311. Therefore, the more information the IEB-DCE System processes, the more it learns about the Entigens in its databases or means of storage. Notably, IDN\loves could have also experience Entigenetion (create its new Entigen) thus forming a profile for the newly learned emotion that Tom, the American, has experienced. In this manner, Entigen Profiles promote a variety of advantages, such as collection, comparison, differentiation, experimentation and others Profile operations that allow the system to perform many other intellectual operations.

Figure 6C:
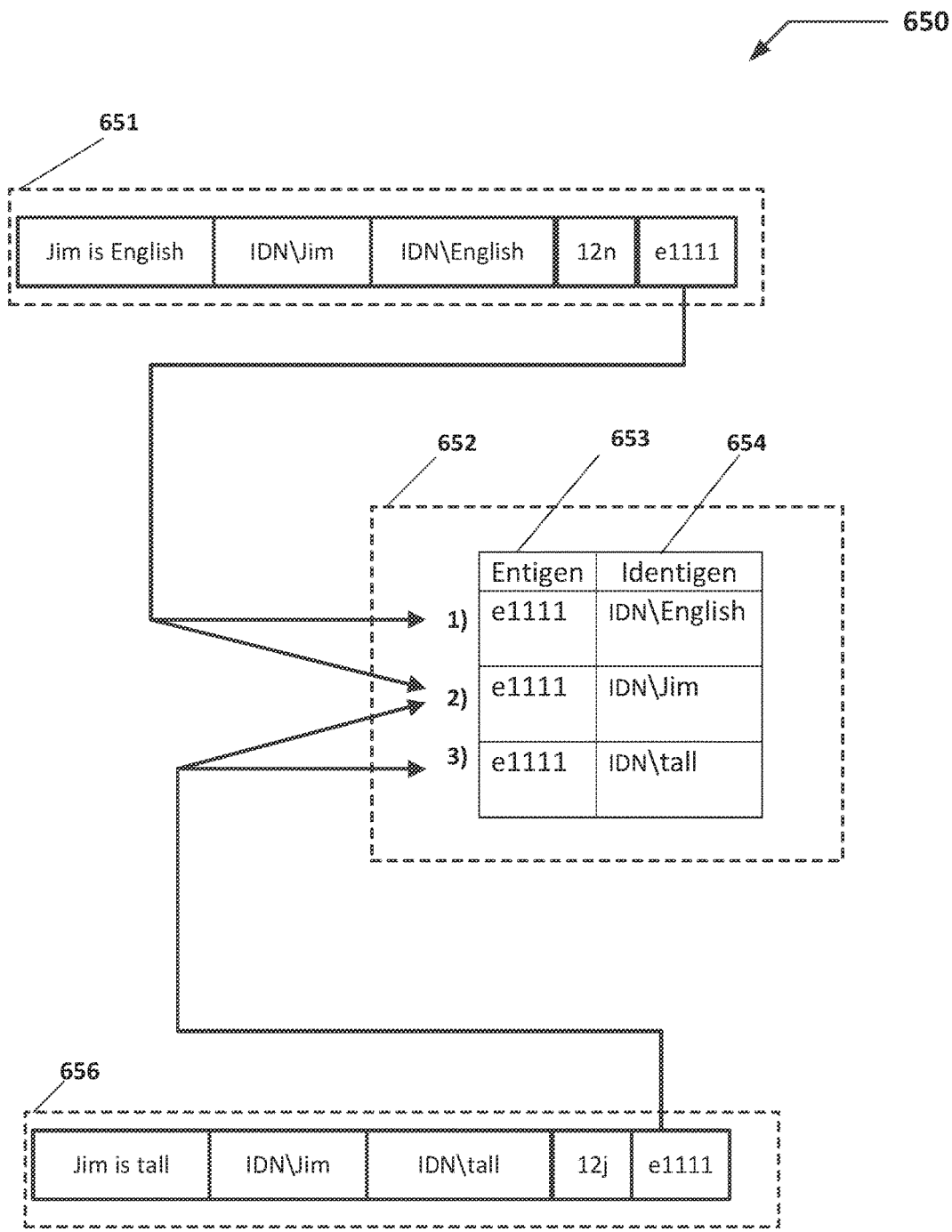

In FIG. 6C, a block and flow diagram 650 of several exemplary schematic depictions of various types of sentences, CETs, databases, processes, relations, Entigens and their IDNs in accordance with an example implementation of FIG. 1 are shown. The First Complex CET 651 depicts the sentence "Jim is English", their IDNs (IDN\Jim and IDN\English) that result from processing the sentence, the type of CET (12n), and the Entigen e1111 that the sentence's CET identify. Notably, the term "Complex CET" is used herein to describe a CET that incorporates its words and/or its Entigen for depiction or operational purpose. Returning to FIG. 6C, in the Entigen Profile 652, the Entigen column 653 contains the Entigens, and the Identigen 564 column contains the Entigens' IDNs. For example, the Entigen (e1111) of the first Complex CET 651 is shown again in the Entigen Profile 652 in the first two records. As depicted, e1111 can be identified by IDN\English and/or IDN\Jim. In similar fashion, the Entigen of the second Complex CET 656 depicts the sentence "Jim is tall", their IDNs (IDN\Jim and IDN\tall) that resulted from processing the sentence, the type of CET (12n), and the same Entigen e1111 that the sentence's CET identify Like this, the Entigen Profile 652 also shows, in the second and third records that e1111 can be identified by IDN\Jim and IDN\tall. More importantly, Entigen Profile 652 further shows that e1111 can be identified by any IDN combination including a new combination between D\tall and IDN\English, which was not describe by any of the original sentences or CETs. Notably, this new combination is the result of the operation herein described as an Entiduction. In the next figure, a search is performed that uses an Entiduction to find matching data. Notably, how IDNs may combine in an ENTIGEN profile is regulated by a series of Entiduction rules or Entigen based inferences which will be later exemplified in this disclosure.

Figure 6D:
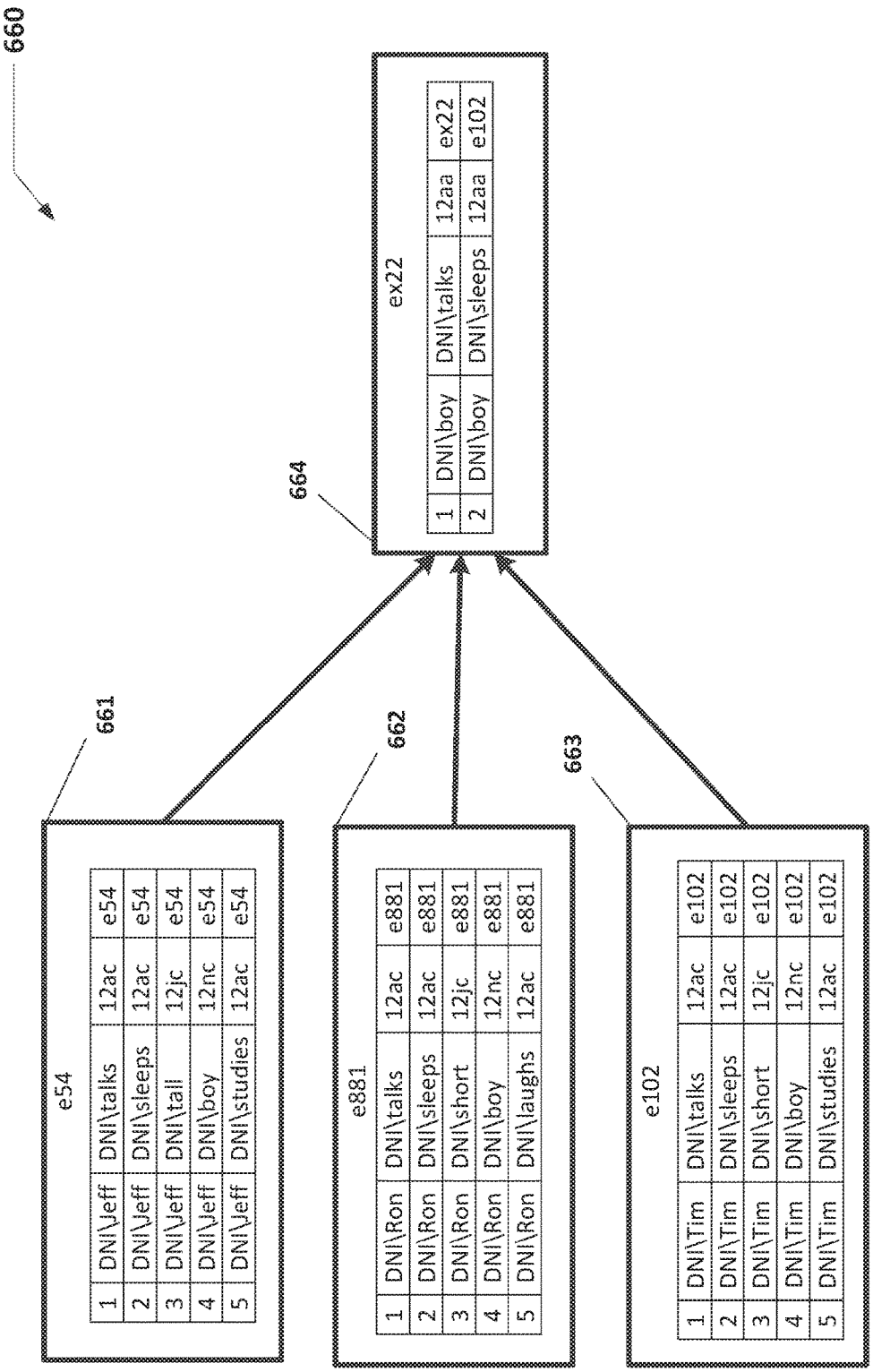
FIG. 6D displays exemplary Entigen profile operations and exemplary Average Entigen Profiles in accordance with the example of FIG. 1.

In FIG. 6D an exemplary schematic 660 of an Entigen Profile operation comprising several depictions of exemplary Entigen Profiles and their average or Median Entigen Profile in accordance to the description of FIG. 1 is shown. As information arrives, and CETs are created, they begin to aggregate information to the Entigens that these CETs and their IDNs imply. Like this, based on several Entigens Profiles that a specific IEB-DCE System handles, the idea of forming a "Median Entigen Profile" is possible which introduces a significant point of the philosophy behind this application; and that is: "Because languages intend to describe entities (Entigens), the idea of classes is largely inconsistent." Words in language are used for identifying things (actions, items and attributes); and it is not until these things begin to accumulate, that the idea of creating a median thing may not start to take shape. But more importantly, this median thing, which ultimately may have its own Entigen, was formed from the unique individuals that each observer personally experienced. In other words, because different observers have experienced different individuals, then they may have different medians. Accordingly, any generalized definition (i.e., a definition for sport cars) that is introduced to a system, it must be viewed as relative or temporary since such generalized definition is itself based on the individual experiences of the definition's designer. As a matter of fact, there will be words that to one observer (i.e., an IEB-DCE System or a person) identify a single Entigen and to others, the same word identifies multiple Entigens (other IEB-DCE Systems or people). For example, the word "Antarctica" used in this proposal identifies a single place on Earth; but to some readers, Antarctica may identify also their pets. Indeed, what makes a word capable of identifying a unique Entigen depends on the experiences and knowledge that each system or person has. Nonetheless, for each IEB-DCE System is important to recognize whether the word identifies one or multiple Entigens. Accordingly, Actenyms, Itenyms and Attrenyms are further divided into Singulatums which identify a single Entigen; and Pluratums which are capable of identifying multiple Entigens within that system. Consequentially, the typical understanding of classes and subclasses is replaced in the present proposal with Median Entigens, and regular Entigens are freed from generalized descriptions which enables them to begin accepting any symbol (words) that is capable of describing or identifying them. Like this, if someone names his pet "captain", the things normally attributed to captains (Median Entigen) do not affect the pet, nor does the pet affects the attributes of captains. Ultimately, it is each Entigen that matters, not the Median Entigen or definitions; and when an Entigen can't be identified, then the Median Entigen could take its place. The following FIG. 6D depicts the formation of a Median Entigen based on regular Entigens (not Median Entigens). However, the above could also be constructed without IDNs (the words directly identify their intended Entigens); or by single IDNs which point to their Entigens regardless of type or meanings. For example, the IDN of Napoleon equally identifies the emperor and a pastry (both pastry and people use the same IDN).

Returning to FIG. 6D, several initial Entigen Profiles show the different CETs that each of the Entigens relates with. For example, the first Entigen Profile 661 which belongs to the e54 Entigen named Jeff, comprises several CETs including its first, second and fourth CETs which mention that e54 talks, sleeps and it is also called "boy". The second Entigen Profile 662 which belongs to an e881 Entigen named Ron, mentions in its first, second and fourth CETs that e881 talks, sleeps and it is also called "boy". The third Entigen Profile 663 which belongs to an e102 Entigen named Tim, mentions in its first, second and fourth CET that e102 also talks, sleeps and can be called "boy". The similarity or pattern that all these Entigens share is the name "boy" and that all these Entigens can sleep and talk. Accordingly, a Median Profile 664 is generated; wherein the Median Entigen "ex22" is called "boy", it "sleeps" and "talks". Notably, the character "x" is added to the Median Entigen to differentiate it from regular or non-median Entigens. Significantly, the Median Entigen and Median Entigen Profile is what the dictionaries normally introduce. Therefore, any information the Median Entigen Profile contains could or should only be used as a suggestion to regular Entigens that are introduced into the system. Accordingly, although the CETs in the Entigen Profiles (661, 662 and 663) were types 12ac and 12nc (certain); the CETs in the Median Entigen Profile 664 are of type "12aa", meaning that their information is only suggestive and not certain. Like this, unnecessary contradictions can be avoided, and when the information fails to identify a given Entigen, the Average Entigen may be utilized instead. Like this, documents that have CETs with Median Entigens, are documents that need Identigention (identify the proper Entigen). Noteworthy, the proposed approach of identifying repetitions (patterns) that Entigens share to create Median Profiles constitutes a different approach from the patterns that current technologies intend to use. In the proposed approach, patterns surface from known Entigens; while in current technologies finding patterns hopefully leads to knowledge. Accordingly, the proposed approach potentially moves from the bottom to the top, and not from the top to the bottom like current approaches and patterns try to do.

Figure 6E:
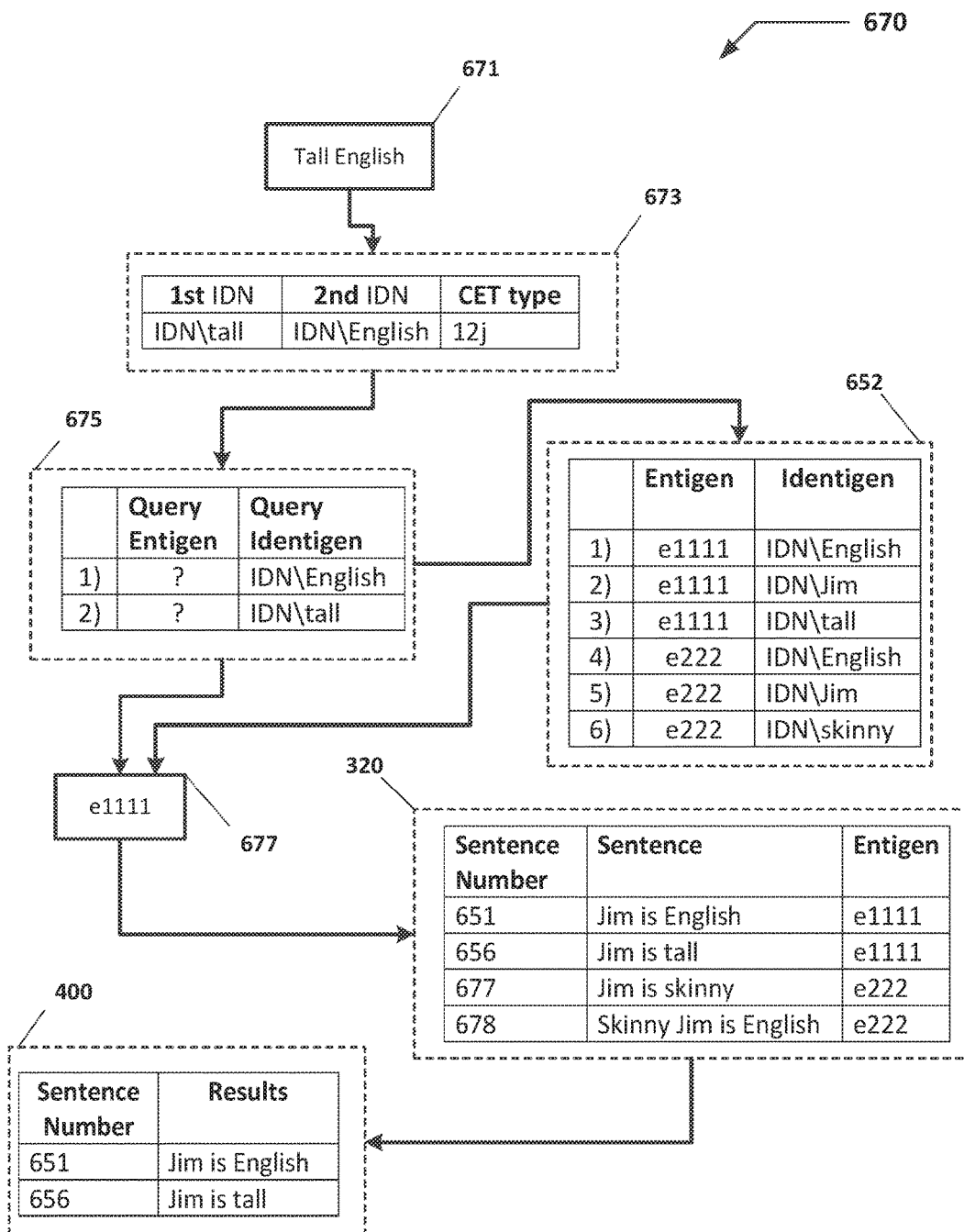
FIGS. 6E-6G are exemplary diagrams of several schematic sentences, CET, IDNS, Entigens their searches and information retrieval in accordance with the example of FIG. 1.

In FIG. 6E, a block diagram 670 of several schematic exemplary sentences, CETs, IDNs and search implementing Entigens in accordance with an example implementation of FIG. 1 is shown. In the current example, results are retrieved based on the query's Entigen; wherein the words of the query and results don't match but their Entigens do, thus the reason why the records are correctly retrieved. For example, when the Query 671 "tall English" is processed, it generates the Query CET 673 which displays a CET type 12j comprising IDN\tall and IDN\English. As a result, the query is trying to find a single Entigen which is identifiable by both IDNs. Next, the Query Entigen Profile 675 displays the two IDNs (IDN\English and IDN\tall) that can identify the query's Entigen. Next, the Entigen Profile 652 displays several known Entigens (e1111 and e222) and their corresponding IDNs (under the Identigen column). As a result, when the IDNs of the Query Entigen Profile 675 are matched or searched on the Entigen Profile 652, the only Entigen that may be identifiable by both IDNs (IDN\English and IDN\tall) is e1111 677 (e222 cannot be identified by IDN\English and IDN\tall). Next, a search for Entigen e1111 on the Tallied Indexed CETs Database 320 retrieves documents that comprise or identify e1111. As a result, two documents that have e1111 are displayed in the Results 400. Notably, the Query 671 mentions "tall English" but the Results 400 mention "Jim is English" and "Jim is tall" which together make a "tall English" whose name is Jim.

Figure 6F:
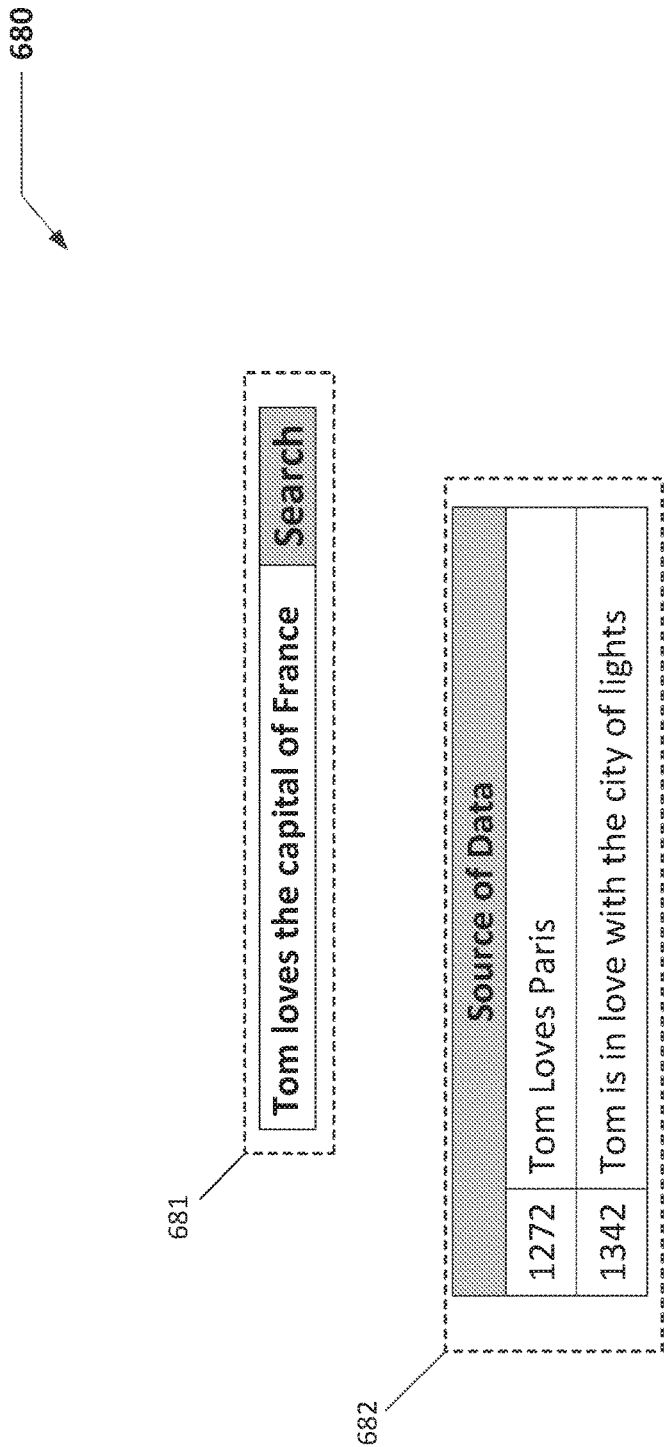

In FIG. 6F an illustration 680 of a Search using an Entigen and its description is depicted in accordance with an exemplary implementation of FIG. 1 is shown. The Query 681 or "Tom loves the capital of France" involves the description of "Paris" which is "the capital of France." The Results GUI 682 is displayed comprising several retrieved documents or results. For example, record number 1272 or "Tom loves Paris" involves "Paris" which identifies the same Entigen that was identified by "the capital of France" in the Query 681. The next record number 1342 or "Tom is in love with the city of lights" involves two different descriptions such as a description of the action "loves" whose description is "being in love"; and another description such as "the city of lights" which is another description for identifying the Entigen which identified by "Paris" and by "the capital of France". In this fashion, because queries and documents may be using different IDNs which point to the same Entigens, resulting searched Entigens generate superior outcomes. Additionally, because the system annotates the IDNs, and the IDNs identify the word themselves, it is then possible to retrieved documents that only match the IDNs or words if desired.

Figure 6G:
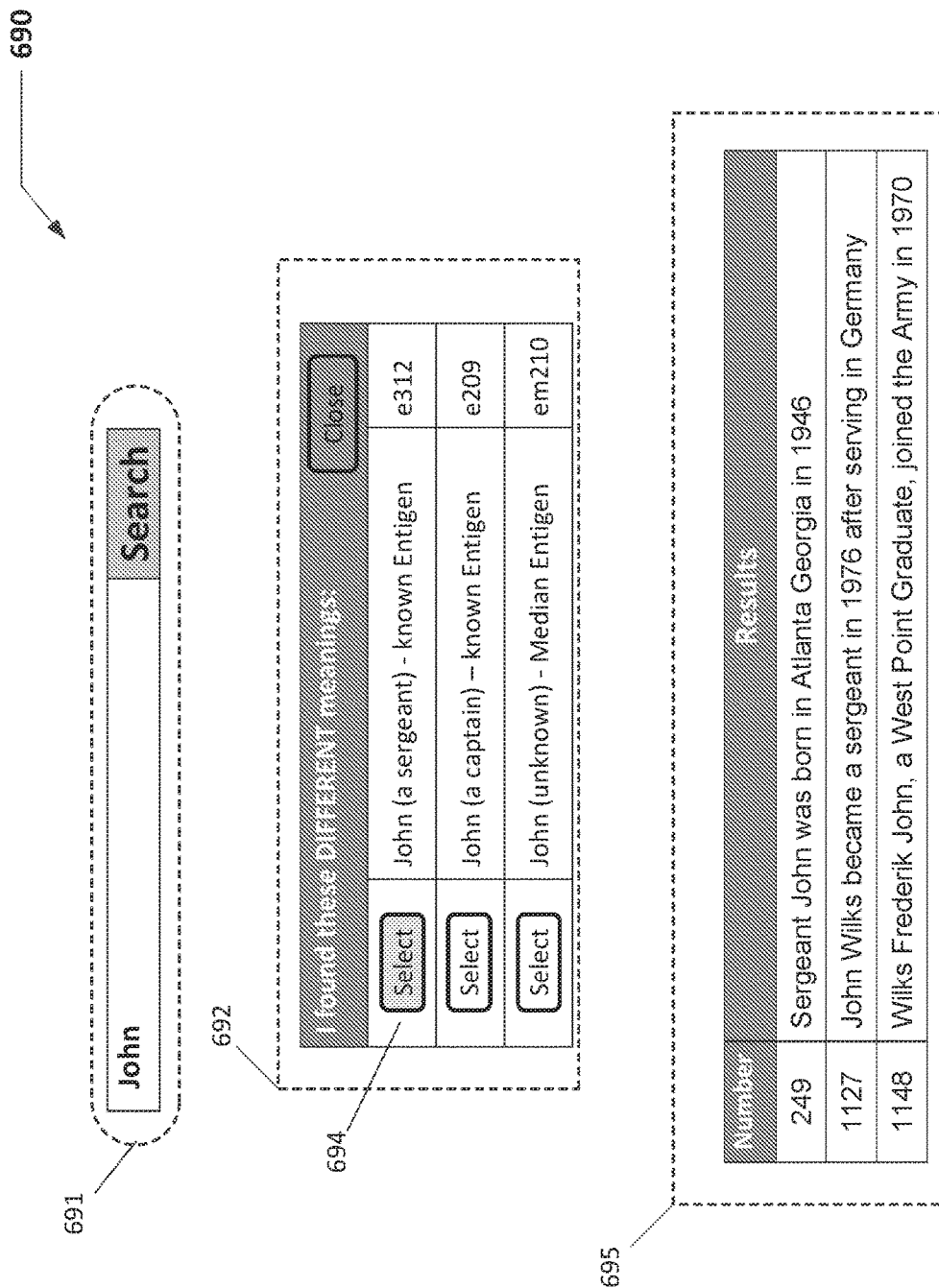

In FIG. 6G, an exemplary diagram 690 that depicts the results that a query with multiple meanings generates in accordance with an exemplary implementation of FIG. 1 is shown. In this example, a query is made of a single word that can identify multiple Entigens. Consequentially, when the search of the Ambiguous Query 691 is performed, a User Selection GUI 692 is displayed which asks the user to select a single description that corresponds to a single Entigen. As illustrated, the User Selection GUI 692 displays the Itenyms of three different Entigens such as "John the sergeant—known entity" which points to Entigen "e312"; "John the captain" which points to Entigen "e209"; and finally "John the unknown" which points to the Median Entigen (or an IDN without an Entigen). Like this, selecting the third option (John the unknown) can retrieve group all those CETs (and their documents) that failed to identify an Entigen, or it could retrieve all CETs of John (with Entigens and with the Median Entigen). In this particular example, the results of the search default to the first option 694. Consequentially, the Results GUI 695 displays all those documents wherein the word "John" is identifying the sergeant. In this fashion, selecting an option generates an External Input 397, FIG. 1 that allows the IEB-DCE System 100 to display the user's desired results. Notably, in the Result GUI 695, the last record number "1148" mentions "Wilks Frederick John" which identifies the same Entigen of "John the sergeant" before he a sergeant. Significantly, this has three significant implications: the first implication is that crafting technologies solely around words, limits such technologies from differentiating and separating results based on concepts; the second implications is that developing technologies to operate based on words, limits these technologies from attending language's primary objective which is describing objects, not words; and the third implication (maybe the most important one) is that once an Entigen has been identified, it can encounter and experience transformations in time, space, attributes, actions and words which are used to identify it without creating contradictions or ever losing its identity.

Figure 7B:
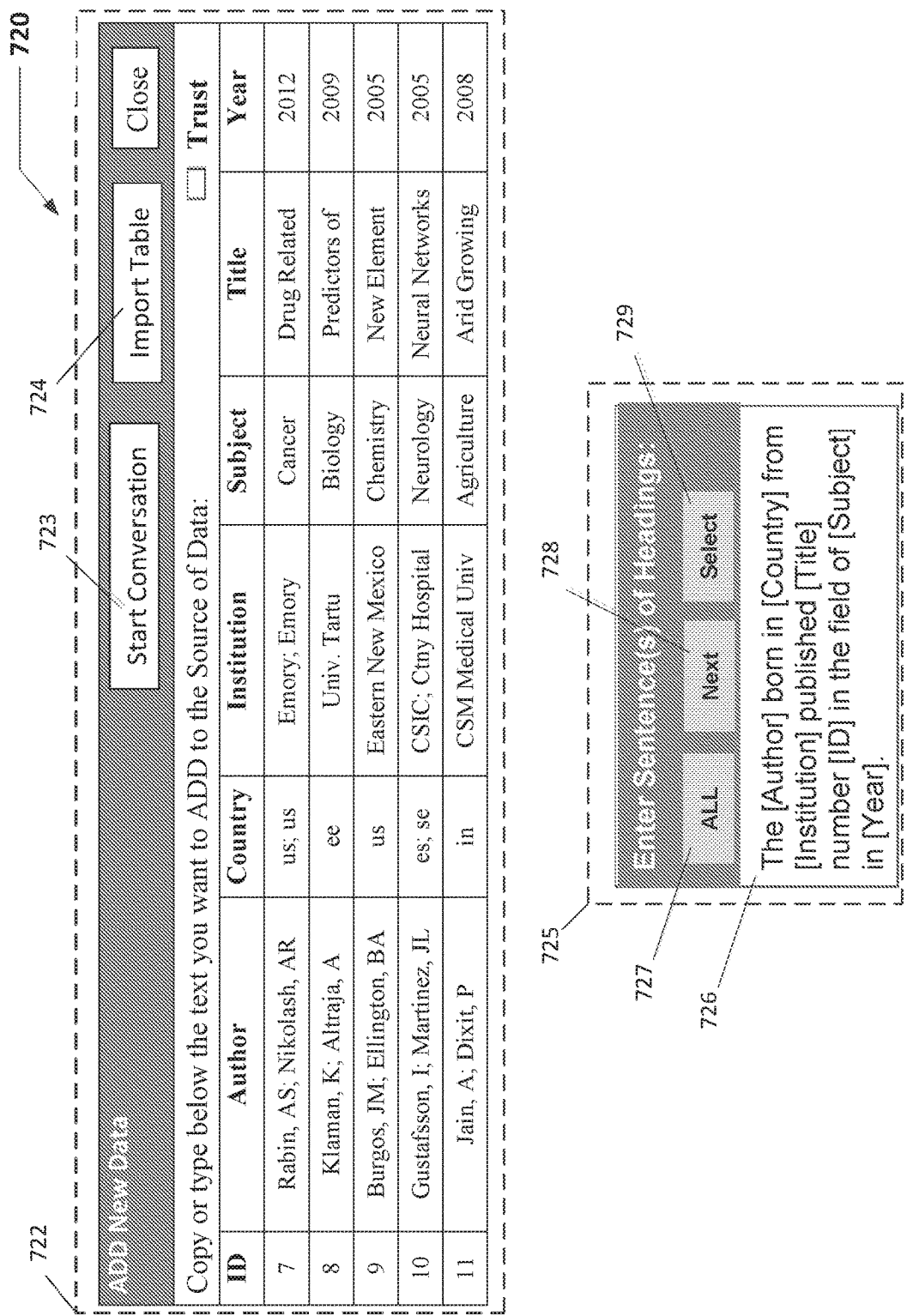

In FIGS. 7A and 7B, the entries of structured data such as the entry of table in accordance with the approach depicted in FIG. 1 are shown. Turning to FIG. 7A an exemplary diagram 700 of an Entry Table 702 that comprises many columns and many rows to be processed is depicted. The table 702 which contains research information is considered to be ambiguous because neither the meaning of the headings nor the relationships between the headings are clear. For example, it is not clear if the relation between the Author 704 column, which contains the names of researchers, and the Country 706 column, which contains several characters annotating different countries, describes the place of birth of the researcher or where he lives. Another example, it is not clear if the relation between the Institution 708 column, which contains the names of several universities and laboratories, and the Country 706 column, which describes a country, is describing the place where the research is being conducted. Like this, without a natural language example or definition, it is practically impossible to identify the correct relationships.

In FIG. 7B, a diagram 720 of the Add New Data GUI 721 displaying a Table 702, FIG. 7A that was shown in the previous figure in accordance with an exemplary implementation of FIG. 1 is depicted. By optionally clicking the Import Table Button 724 a folder containing Table 722 (selectable by a user in the current implementation) is entered into IEB-DCE System 100. The Enter Sentence of Heading GUI 725 allows a user to enter a sentence that expresses the relationship between the columns of the table that is to be processed by the IEB-DCE System 100. Accordingly, a user types a sentence of the headings "the [Author] born in [Country] from [Institution] published [Title] number [ID] in the field of [Subject] in [Year]" in the Entry Area 726. The IEB-DCE System 100 then uses this sentence and the IDNs (or Entigens) of each record to create their corresponding CETs to ingest the table's data. In other words, the "Sentence of Headings" operates as a model of each sentence of every record below the headings. Like this, each record (row) is processed as if it was a sentence. Moreover, clicking the ALL 727 Button ingests all the records in the table. By clicking the Next 728 Button, the user has option to choose which rows are to be processed, and by clicking the Select 729 Button the system identifies which records the user has chosen. Like this, the user has the option to enter or process the whole table or portions of the table (all or some columns and all or some records). As a result, the relationships that exist between the various columns can be described thus allowing the system to ingest the table's data without ambiguities. In fact, once processed, the table may be queried using natural language. In addition, to disambiguate the meaning of ambiguous words in each record, the IEB-DCE System 100 may check if the IDN or Entigen of the record has a relation (a 12n type CET) with the headings' IDN. In other words, it checks that the headings are categories of the records. For example, if the heading says "machines", then every record in that column must contain machines. Like this, if a particular record is ambiguous, then the heading may be used to disambiguate it. For example, a table has a column called "machines" and one record in this column contains the word "ship" which is ambiguous because it has two meanings (a vessel or an action). Because the IEB-DCE System 100 can relate the heading and the record, the system can select the vessel (a machine) versus the action. Moreover, the specific Entigens can be presented to the user, giving him the additional ability to select the Entigen of choice. The conversion is started by selecting "start conversation" button 723.

Figure 8:
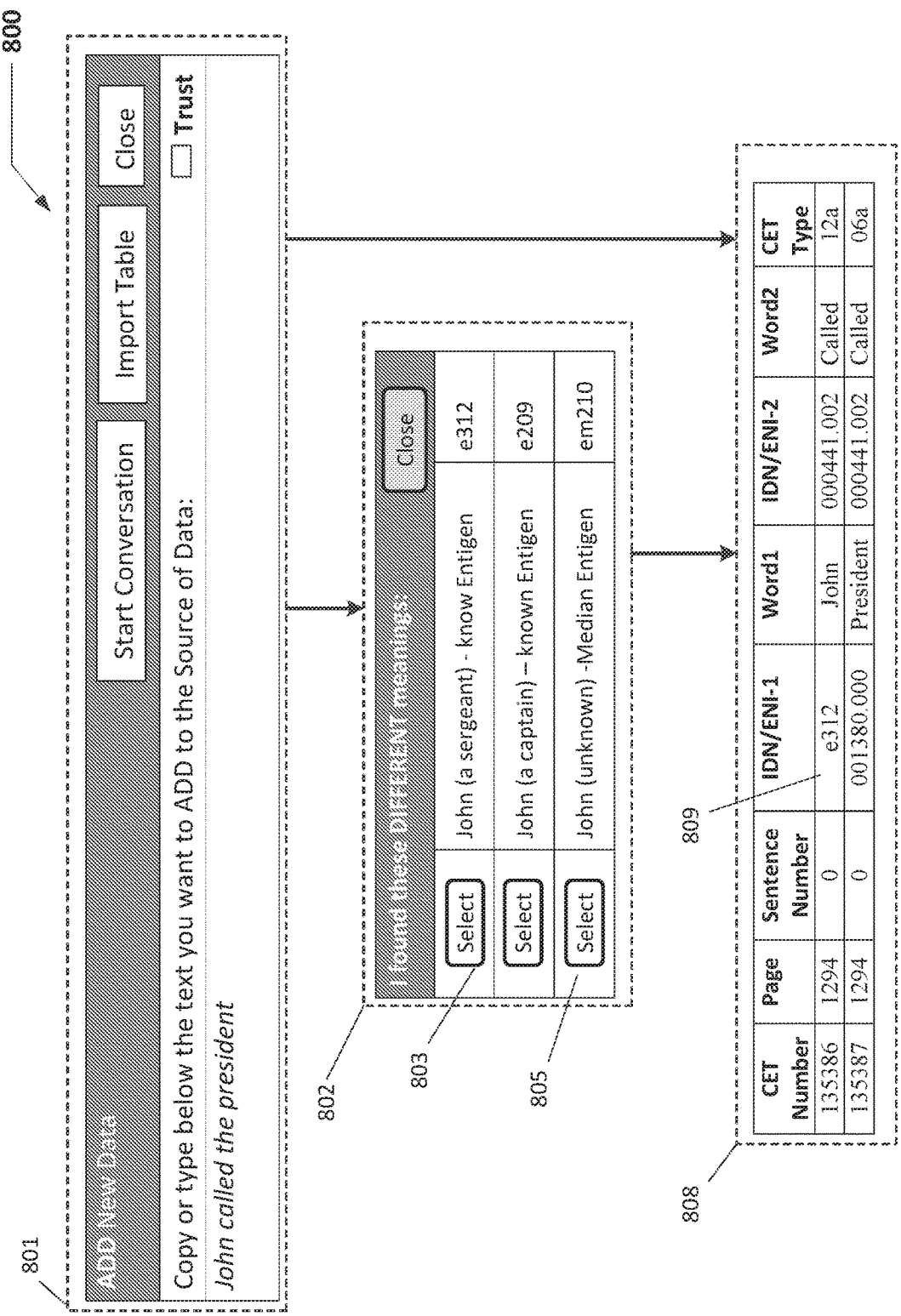
FIG. 8 is a schematic comprising several exemplary GUIs of an ambiguous data entry in accordance with an example implementation of FIG. 1.

In FIG. 8, a schematic 800 comprising several exemplary GUIs of an ambiguous data entry in accordance with an example implementation of the present invention as shown in FIG. 1 is depicted. The Add New Data GUI 801 contains the ambiguous sentence "John called the president". This sentence is considered to be ambiguous because according to the Descriptive Index Dictionary 160, FIG. 1 of this example the word "John" is an Pluratum which means that "John" can be identify at least one of many known individuals, such as John the sergeant (an Entigen) and John the captain (another Entigen), or one of many unknown individuals such as the generic or general name of John or its IDN. Accordingly, the I Found These Different Meanings GUI 802 is displayed which prompts a user to select which Entigen is "John" identifying. In this fashion, a user's External Input 397, FIG. 1 allows the IEB-DCE system to identify which Entigen should be selected from the sentence "John called the president". To exemplify the entry of this new data, a user selects the first option 803 (John a sergeant). Note, if the user doesn't select any Entigen, the IEB-DCE System assumes the Median Entigen which is the last option 805 or "John is unknown". In this fashion, the IEB-DCE will have the opportunity to later investigate the true entity (Entigen) via future searches, acquired new knowledge, or other operations to identify the correct Entigen (select which John was mentioned). Accordingly, after selecting the first option 803, the Document Table 808 is generated by the IEB-DCE System comprising the corresponding CETs, IDNs and Entigens of the entered and selected data, which in this example includes e32121 809 which corresponds to the selected "John the sergeant."

Figure 9:
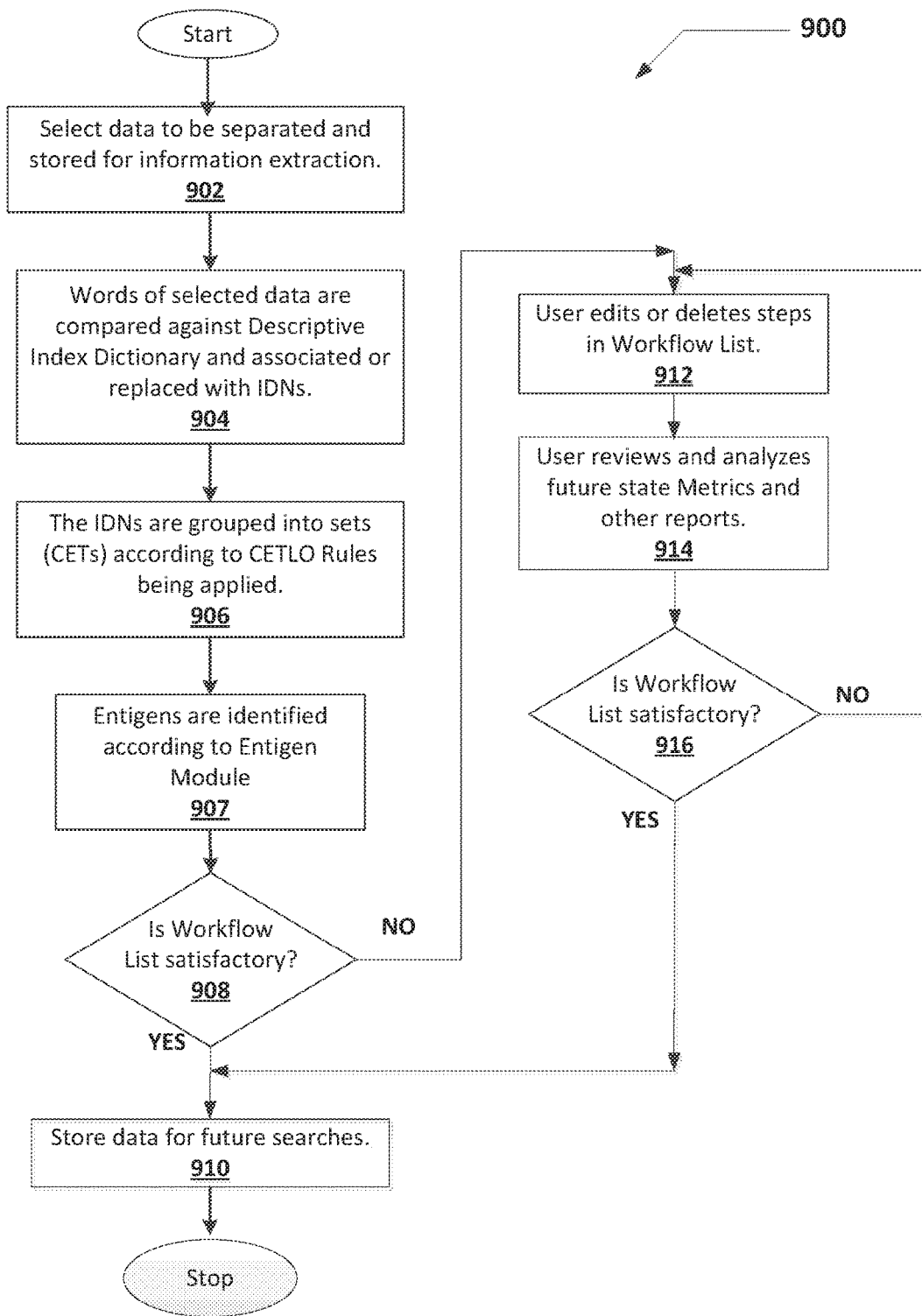
FIG. 9 is a flow diagram of an automatic and semi-automatic method of using a system or person for grouping and extracting information from data corpora in accordance with an example implementation of FIG. 1.

In FIG. 9 a flow diagram of an automatic and semi-automatic method for grouping and extracting information from data corpora in accordance with an example implementation of the present invention is shown. The approach starts in step 902 with the data, such as text separated into readable strings such as sentences. In step 904, the separated data is then subdivided and categorized via a Descriptive Index Dictionary and associated IDNs. The results of the associated IDNs are further processed according to CETLO Rules 906. In step 907, any Entigens that are identifiable are identified; and if it is not identifiable, then the IDNs remain. If the results are satisfactory in step 908, then results may be stored in a database as processed data for future searches in step 910. Otherwise if the results in step 908 are not satisfactory, in step 912 associations and associated IDNs may be edited or deleted to resolve non-grouped IDNs or other ambiguities. The results of the associations may then be viewed along with metrics in online and/or report formats in step 914. If the results are satisfactory in step 916, then results may be stored in a database as processed data for future searches in step 910. Otherwise in step 912, associations and associated IDNs may be edited or deleted again or further refined. Once the initial data has been stored in step 910, it may be queried or searched. The search or query is processed in a similar manner as the initial data using the Descriptive Dictionary.

Figure 10A:
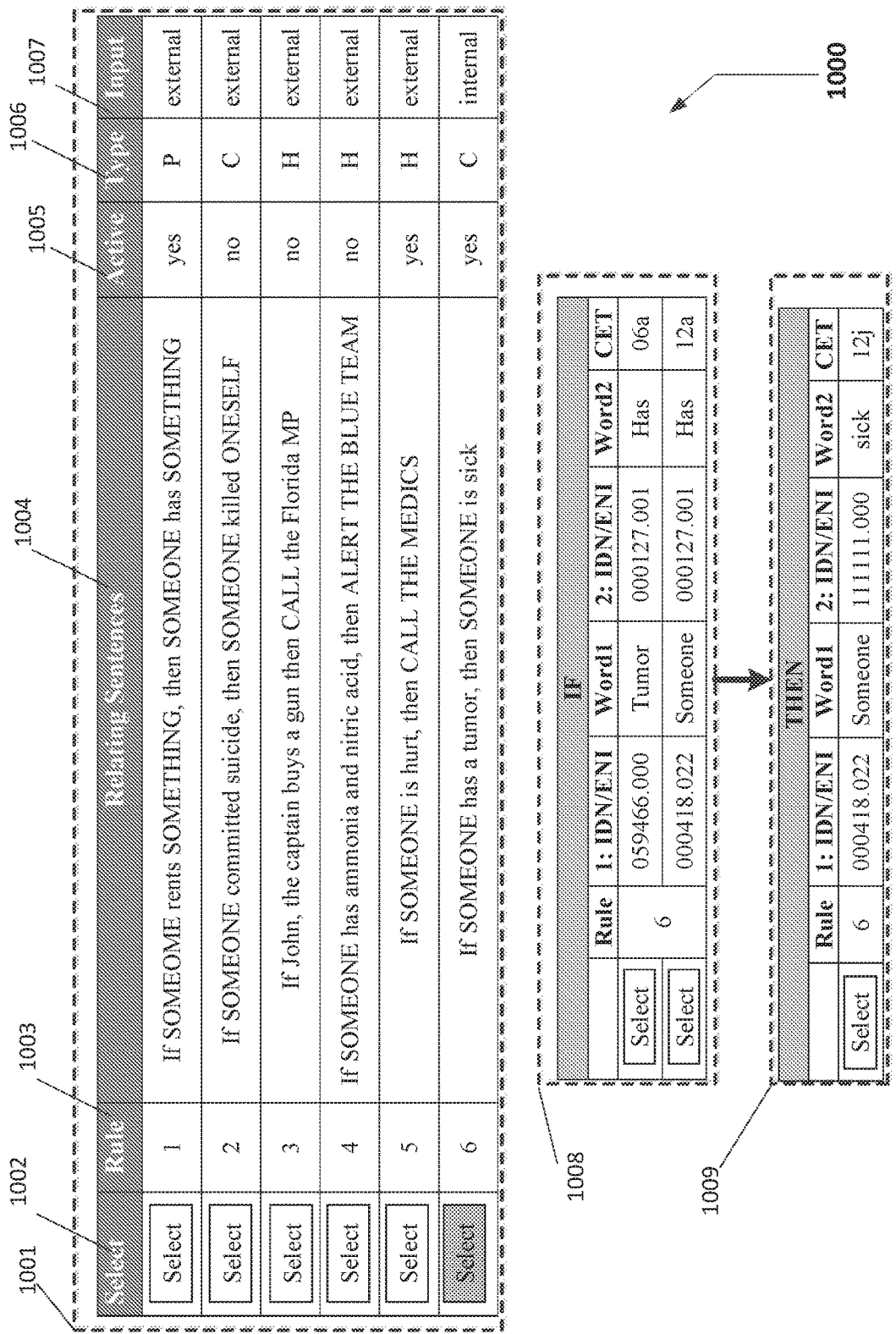
FIGS. 10A-B is a depiction of exemplary Sequences in accordance with and example implementation of FIG. 1.

In FIG. 10A, an exemplary GUI 1000 depicts a Sequences 1001 GUI and two corresponding relational GUIs 1002-1003 that illustrate some exemplary Logical Sequences FIG. 1 380 in accordance with an example implementation of FIG. 1 is shown. Logical Sequences involve the representation of many logical operations and relational types of knowledge including inductions, deductions, sentiment, culture and others. For example, in the field of Logic, inductions and deductions are the operations that the human mind uses to relate events in time and space which may also be known as cause and effect. An induction example is: if an airplane has landed in the airport, then the airplane had been flying before. A deduction example is: if the airplane has landed, then the airplane will park at the gate to unload its passengers or cargo. Another type of information that may be contained in the Sequences database 380, FIG. 1 is what may be described as culture which outlines the events that relate cultural behavior of typical life. An example of culture is that when a first individual salutes a second individual and the second individual normally salutes back. Another type of knowledge that may be stored in the Sequences Database 380, FIG. 1 is Standards which are normal principles or typical relationships that exist between occurrences. For example, in a biography there is typical knowledge (sentences) that normally mentioned, meaning that Standards do not try to relate knowledge like most sequences do; but instead they look to see that certain information is disclosed.

Returning to FIG. 10A, as illustrated the Sequences 1001 GUI comprises several column such as the Select 1002 column where buttons allow a user to select the corresponding record; the Rule 1003 column displays the number of the corresponding Sequence; the Relating Sentences 1004 column displays the particular Sequential relation between at least two sentences; the Active 1005 column displays whether the sequence is active or not; the Type 1006 column displays the character "P, C or H"; wherein P signifies Possible", C signifies "certain" and H signifies "alarm" or a procedure to be followed if the particular information or sequence occurs; and finally the "Input" 1007 column which describes whether the sequences was entered externally (i.e., a user) or "internally" (i.e., created by the IEB-DCE System 100). For example, the first record or "if SOMEONE rents SOMETHING them SOMEONE has SOMETHING" describes the relationship or the "cause and effect" relation that happens between renting and subsequently having something. This first record also shows "yes" or that it is active (Active 1005 column); that is a type "P" or possible (under the Type 1006 column) and "external" (under the Input 1007 column) or that it was entered by an external input like a user 397, FIG. 1. The second record or "if SOMEONE committed suicide then SOMEONE killed ONESELF" is another sequence or deduction, which is not active (displays "No" under the Active 1005 column), it is type "C" or it is certain; and that was generated by an external input like a user. The third record or "if John, the captain, buys a gun then CALL the Florida MP" is a different type of sequence because this sequence is asking the IEB-DCE System 100 to perform a call to the military police of Florida in the event that the IEB-DCE System 100 finds that the Entigen of John (who is a captain) buys a gun. This third sequence is not active; it is a type "H" meaning that it is a command; and it was entered externally. However, if the third sequence is turned on (activated) the IEB-DCE system 100 will generate an alarm if the Entigen of "John the captain" makes CETs with the IDNs of "buying and gun". Next, in this example, the sixth record or "if SOMEONE has a tumor then SOMEONE is sick" (which is active and certain and was generated internally by the IEB-DCE System) is selected. Accordingly, IF 1008 GUI and the THEN 1009 GUI are depicted showing the CETs corresponding to the respective sentences of the sequence. For example, the IF 1008 GUI depicts two CETs which combine the IDNs of someone, has and tumor, which are linguistically comparable to "some has a tumor". The THEN 1009 table depicts a single CET which linguistically is comparable to "someone is sick". In this fashion, any CETs that match the CETs in the IF 1008 GUI, will generate the CET of the THEN 1009 GUI. Like this, a sentence like "John has a tumor" generates CETs comparable to "John is sick".

In this fashion, the IF 1008 GUI and THEN 1009 GUI display the data or knowledge that the IEB-DCE System needs to process deductions, inductions, alarms and others. Notably, the IF and THEN GUIs imply a particular flow or direction that the data must follow. However, the inverse direction (instead of from left to right, from right to left) may also be possible which in some cases retains the "TYPE" of sequence but other times does not. For example, "if someone has a tumor, then some is sick" is a certain (type C); however, the inverse or "if some is sick, then someone has a tumor" is only a probability (the inverse in type P), because not everybody who is sick has a tumor. This will be an important point of discussion in the predictive analysis as many other factors such as time, space, verifications, suspicions, and others are incorporated and their CETs and CET operations are disclosed. Additionally, many other factors such as time and space may change the parameter and other sensorial data that the IEB-DCE System 100 may use to identify, operate or disambiguate ambiguous terms.

Figure 10B:
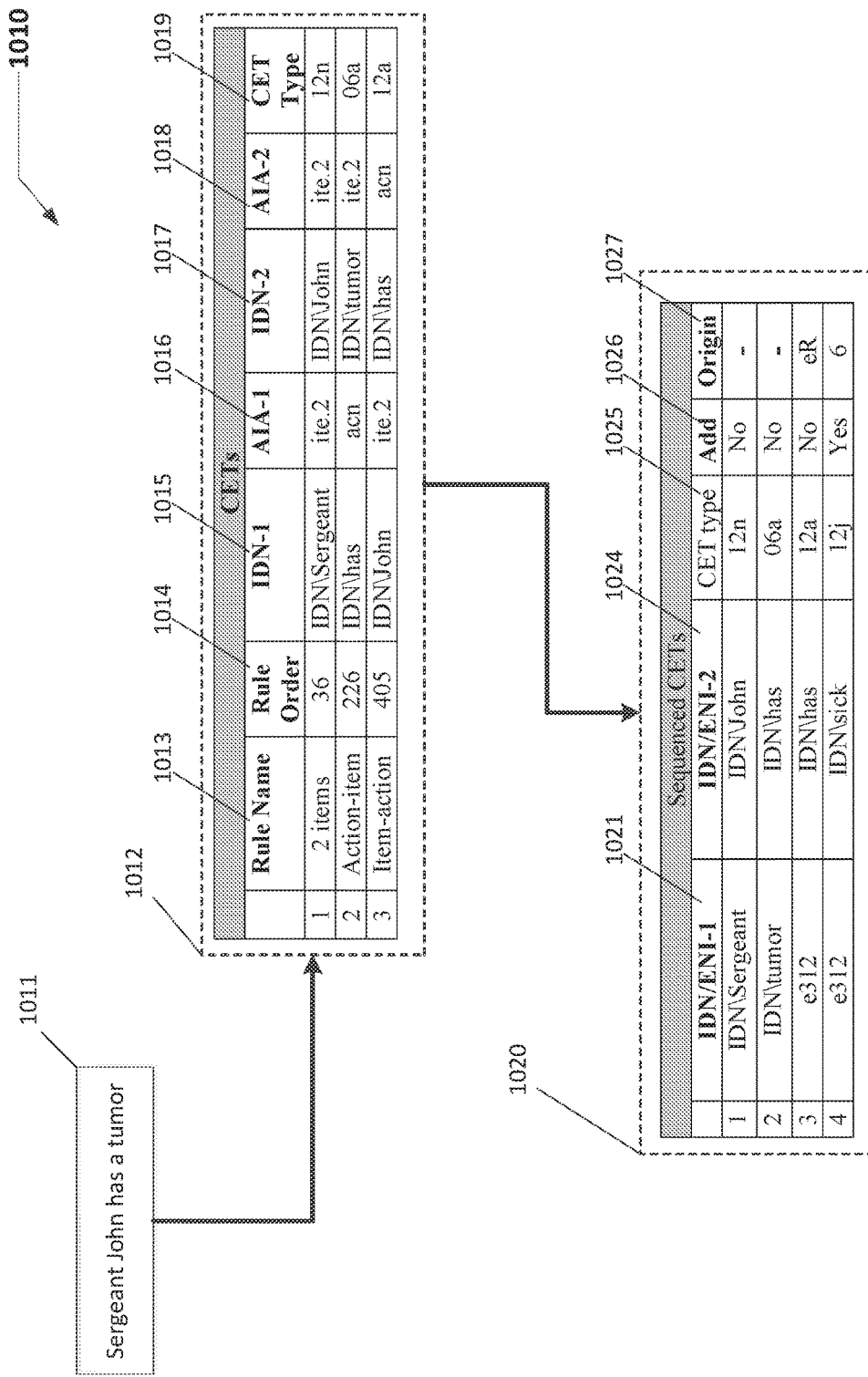

In FIG. 10B, an exemplary GUI 1010 of a document that was processed by the IEB-DCE system 100 implementing the knowledge of the exemplary sixth sequence or "if some has a tumor, then someone is sick" 1001, FIG. 10A in accordance with an example implementation of the present invention as shown in FIG. 1 is depicted. In this example, the sentence 1011 or "Sergeant John has a tumor" passes to the formation module 140, FIG. 1, conceptualization module 150, FIG. 1, Paring Module 240, FIG. 1 and the Tallying Module 300, FIG. 1 hence resulting in the CETs GUI 1012. The CETs GUI 1012 depicts the different types of CETs (more specifically IDCETs) that the sentence "Sergeant John has a tumor" has created. For example, the Rule Name 1013 column depicts the name of the CETLO Rule; the Rule Order 1014 column depicts the number of the Rule; the IDN-1 1015 column depicts the first IDN of the CET; the AIA-1 1016 column depicts the AIA type of the first IDN; the IDN-2 1017 column depicts the second IDN of the CET; the AIA-2 1018 depicts the corresponding AIA type of the second IDN; and the CET Type 1019 column depicts the type of CET that the IDNs make. As illustrated, the CETs 1012 GUI comprises a total of three records which CET types are: 12n, 06a and 12a respectively.

The Sequenced CETs 1020 GUI depicts IDCETs and ENCETs which resulted from applying the exemplary sequence "if someone has a tumor, then someone is sick" to the CETs of the original sentence 1011 or "Sergeant John has a tumor". Accordingly, the IDN/ENI-1 column 1021 depicts the first IDN or Entigen; the IDN/ENI-2 column 1024 depicts the second IDN or Entigen; the CET Type 1025 column depicts the type of CET; the Add 1026 column depicts whether the CET is original or the result of a sequence operation (an added CET); and the Origin 1027 column depicts the source or the origin where this CET was created. As illustrated, the fourth record in the Sequenced CETs 1020 GUI depicts the additional CET that occurred from applying the sequence, comprising Entigen e312 (sergeant John's Entigen), the IDN of sick in a CET type 12j which is linguistically comparable to "Sergeant John is sick". Notably, this fourth record also shows, under the Add 1026 column the word "yes" meaning that this CET was added by the IEB-DCE-System 100 thanks to a Sequence;

and under the Origin 1027 column depicts the number of the sequence rule or "6" which was exemplified in FIG. 10A.

Figure 10C:
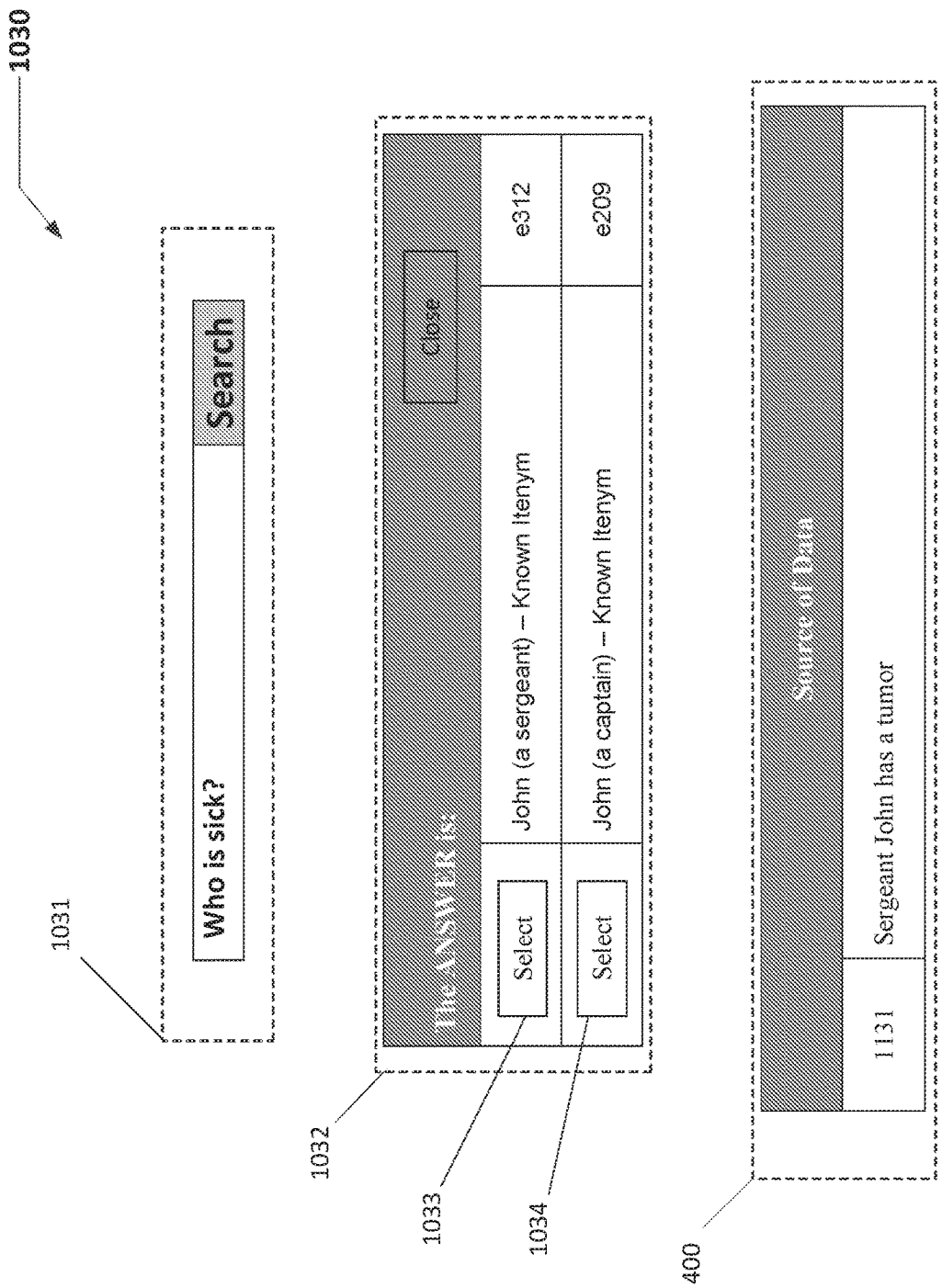
FIG. 10C is an exemplary illustration of answering an inquiry in accordance with the example implementation of FIG. 1.

Turning to FIG. 10C several exemplary GUIs 1030 of answering a user's inquiry accordance with the present invention shown in FIG. 1 is depicted. The User Question 1031 or "who is sick?" asks the IEB-DCE System if anybody is sick. The Answer GUI 1032 depicts the two answers such as the First Answer 1033 or "John (a sergeant)" which is e312, and the Second Answer 1034 or "John (a captain)" which is e209. Notably, clicking the First Answer Selection 1033 generates a display of all those documents that support this type of answer (e209). For example, the Output 400 (see also FIG. 2) is depicting a document or "Sergeant John has a tumor" which supports its corresponding answer. Notably, clicking the other Second Answer Selection 1034 will result in a display of those documents, wherein Entigen corresponds to "John a captain" or e312. As illustrated, the document has an identifying number or "1131" which was assigned by the IEB-DCE System 100 when it processed a document that mentioned that "Sergeant John has a tumor." Notably, both answers display the same name or "John"; but each "John" thanks to the Identigention process, has been differentiated into their corresponding Entigens, thus resulting in two different and distinctive answers/results.

Figure 11:
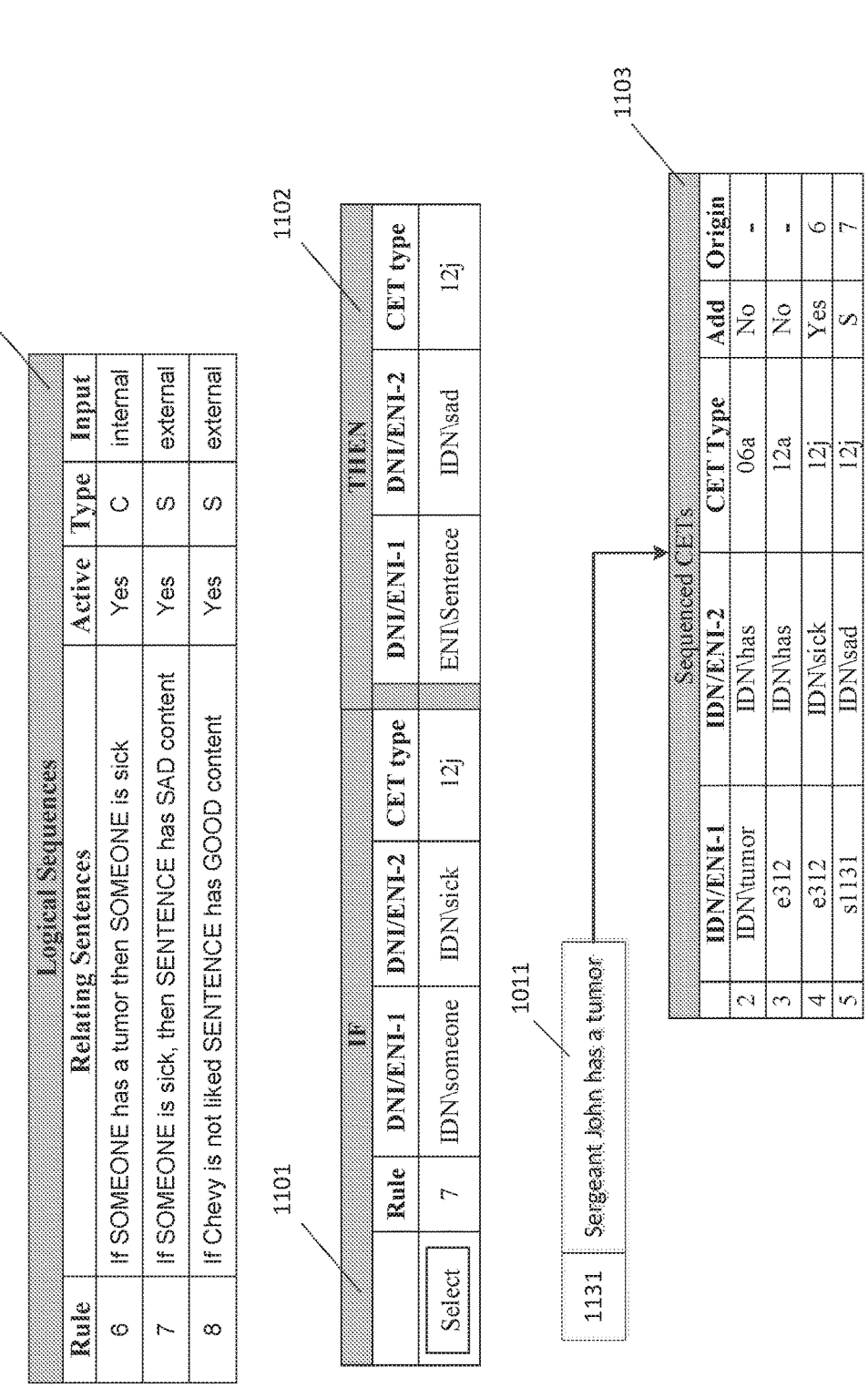
FIG. 11 is an exemplary schematic of several sequences performing Sentiment Analysis in accordance with an example implementation of FIG. 1.

In FIG. 11, an exemplary schematic 1100 comprising several GUIs of Sequences 380, FIG. 1 for performing Sentiment Analysis in accordance with an example implementation of the present invention shown in FIG. 1 is depicted. The Logical Sequence 1001 GUI depicts, in natural language, several records including the sixth rule or "if SOMEONE has a tumor; then SOMEONE is sick" which was illustrated in FIG. 10A and FIG. 10B, and the seventh rule or "if SOMEONE is sick then SENTENCE has SAD content" which unlike previously illustrated sequences, it is a Sentiment, designed to describe the type of content expressed in the sentence or the sentence's CETs processed by the IEB-DCE System 100. As illustrated, the seventh rule (Rule column) displays "Yes" under the Active column meaning that is active; it displays the character "S" (under Type column) meaning that this sequence has a sentiment (it can be emotionally classified); and it displays "external" (under Input column) meaning that it was introduced by an external input (i.e., a user or another IEB-DCE System 100). In this fashion, if a sentence (or its CETs) mentioned that anyone is sick, then this statement can be marked as containing information which is considered to be sad. Returning to FIG. 11, the IF 1101 GUI depicts the conditional CET (if this CET is found) and its corresponding THEN 1102 GUI (this CET is added) depicts the added CET. The processing of the Sentence 1011 or "Sergeant John has a tumor" that was exemplified in FIG. 10A and FIG. 10B formed some of the CETs that are depicted in the Sequenced CETs 1103 GUI, which include the ENCET shown in the fourth record which linguistically is comparable to "e312 or John the sergeant is sick". Accordingly, because the information of the IF 1101 GUI is matched by the fourth record (e312 is sick), the additional information depicted in the THEN 1102 GUI is added, and it is displayed on the fifth record of the Sequenced CETs 1103. The fifth record shows the sentence's Entigen or "s1131" under the IDN/ENI-1 column; the Identigen of sad or "IDN\sad" under the IDN/ENI-2 column; the CET type or "12j" under the CET Type column; character "S" which identifies a Sentiment under the Add column; finally, number "7" under the Origin column which identifies the rule number of the Sequence in the Logical Sequences 1001 GUI. Like this, s1131 is annotated as describing or containing sad content. Notably, in this example, the Sentiment Sequences (like rule 7) used the Entigen of the sentence, but they can also use the Entigen of the paragraphs, even page numbers to classify or emotionally ranked entire documents. Notably, because a user can enter, in natural language, any kind of sentence (a sentiment sentence) to identify a type of sentiment, sentiment sentences can also be identified and create more sentiment sentences, thus creating a chain or inference process introduced herein as "Inferential Sentiment". Another example depicted in the Logical Sequences 1001 GUI is the eight record or "if a CHEVY is not liked then MARK AS GOOD". In this example, a user identifies a negative feeling (not being liked) as being a good thing (i.e., the user is a marketing analyst from a rival car manufacturer). Accordingly, Logical Sequences provide users with superior means for discreetly analyzing the emotional content of documents.

Figure 12A:
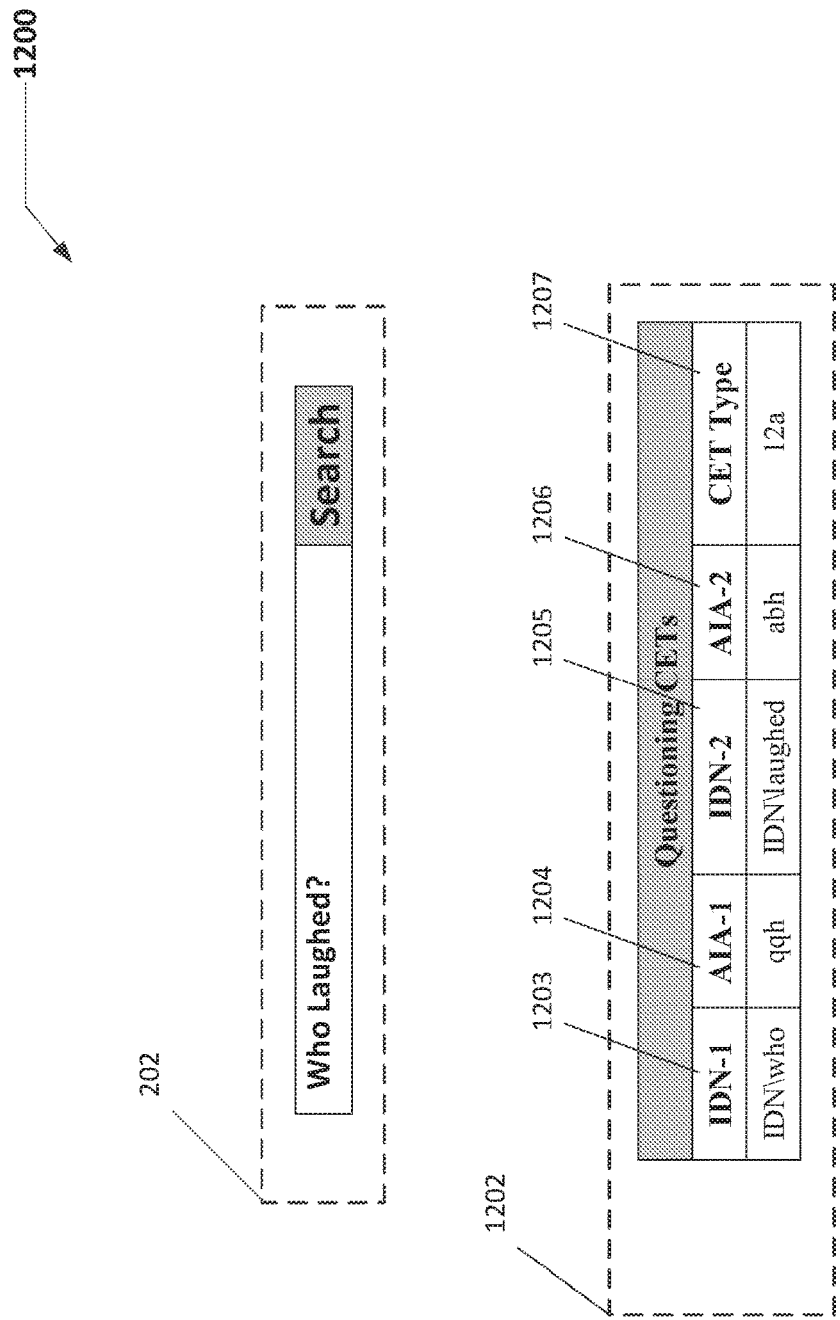
Figure 12B:
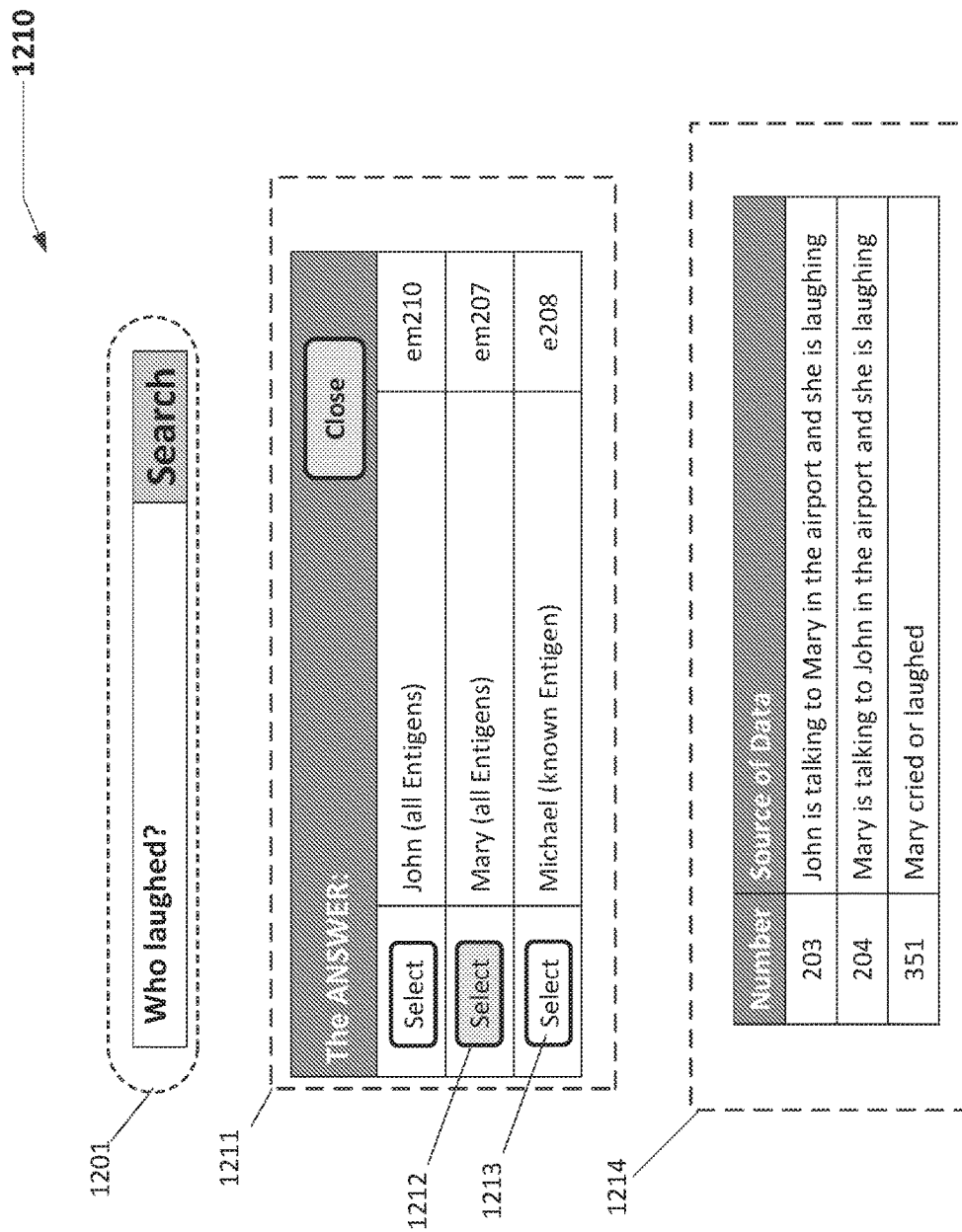
Figure 12C:
Figure 12C:
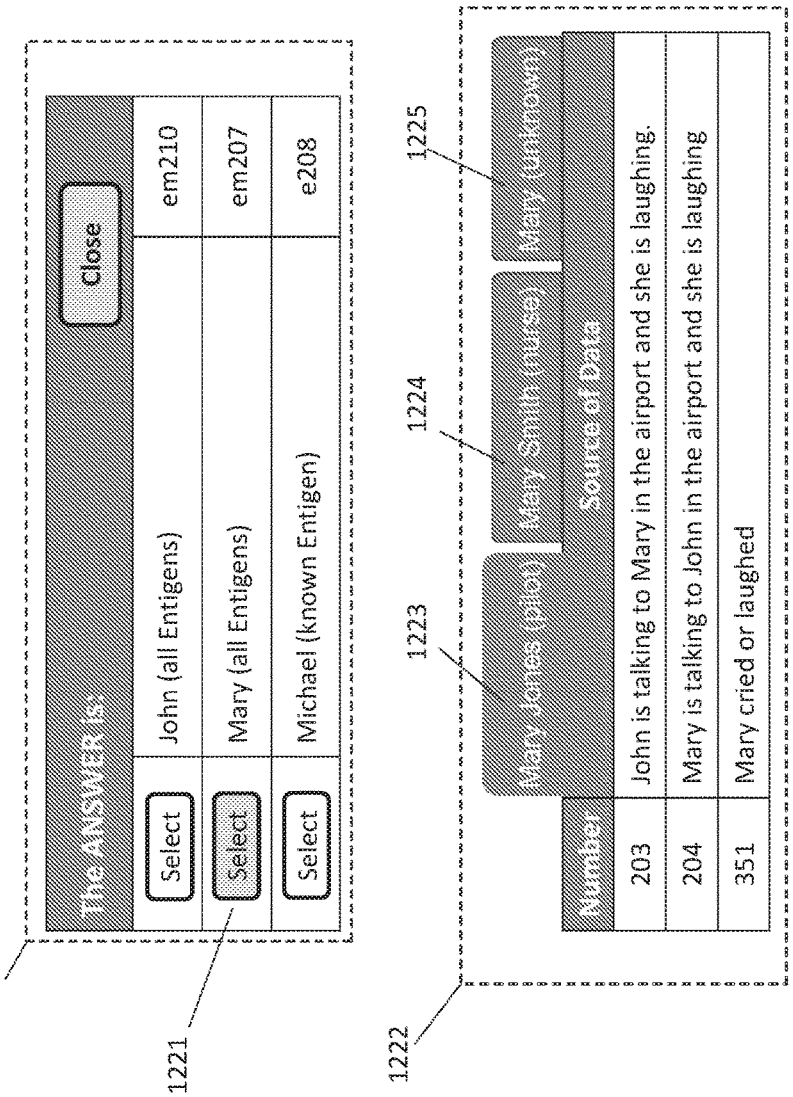

In FIGS. 12A, 12B and 12C, several illustrations for processing questions and answering such questions in accordance with an exemplary implementation of FIG. 1 and FIG. 2 are shown. In FIG. 12A, an illustration 1200 of an exemplary CETs that correspond to a question in natural language is shown. The Question 202 (see FIG. 2) or "Who laughed?" passes Conceptualization Module 150, FIG. 2 and other modules and processes including the CETLO Rules Module 220, FIG. 2 and the Pairing Module 240, FIG. 2 to the Tallied Indexed Query 350, FIG. 2 which is displayed in the Question 1202 GUI depicting the Identigens (IDNs) and their corresponding AIAs (word types) of the question. For example, in the IDN-1 1203 column is the IDN of who or "IDN\who"; the AIA-1 1204 column depicts who's AIA (word type) or "qqh"; the IDN-2 1205 column depicts the IDN of laughed or "IDN\laughed"; the AIA-2 1206 column depicts laughed's AIA or "abh" which means that laughed is an Actenym; and finally the CET Type 1207 column depicts the type of CET or "12a" that the question forms and therefore the type of CET that the data must match to become an answer. Notably, the AIA "qqh", like the other AIAs used for questions (i.e., IDNs of what, where, when, why and how) has a unique operation which is: not only identifying IDNs, in the results that match "being human" (who tries to find humans), but also selecting the matched word (i.e., John) to become the answer.

In FIG. 12B, an illustration 1210 of several correct answers, based on IDNs, of an exemplary Question of FIG. 12A in accordance with an example implementation shown in FIG. 1 and FIG. 2 is depicted. To answer the Question 1201, The Answers GUI 1211 is displayed comprising several correct answers. For example, selecting 397, FIG. 1 and FIG. 2 the Second Answer 1212 or "Mary (all Entigens)", which corresponds to "em207" or the Median Entigen (any Mary), the user may be presented with the Answers Support Display 1214 which displays the Source of Data or all those documents supporting the answer (matching CETs) wherein "Mary laughed". Accordingly, selecting a different answer, results in documents which support that selected answer. Notably, in this example, the Answers GUI 1211 is displaying several types of answers: some that correspond to Median Entigens or "em210 and em207" (which could be compared to IDNs) and one last or Third Answer 1213 that corresponds to a regular Entigen or "e208" (a single and unique person named Michael).

In FIG. 12C an illustration 1220 of several correct answers, which this time are divided based on different Entigens, of an exemplary Question of FIG. 12A in accordance with as the example implementation shown in FIG. 1 is depicted. To answer the Question 1201 or "Who laughed?", The Several Answers GUI 1211 is displayed comprising several correct answers. For example, selecting the Second Answer 1221 or "Mary (all Entigens)", the user may be presented with the Answers Support Display 1222 which divides documents based on the different Entigens which are identifiable by the word "Mary". For example, a First Entigen Description Tab 1223 or "Mary Jones (pilot)" displays the description of the first Entigen whose is primarily identifiable by the name "Mary Jones who is a pilot". Accordingly, the three documents (documents numbered 203, 204, and 351) displayed below correspond to the first Entigen. In the similar fashion, selecting the Second Entigen Description Tab 1224 or "Mary Smith (nurse)" would result in documents corresponding to a second Entigen (another individual) whose name is also Mary but happens to be a nurse. However, selecting the Third Median Entigen Tab 1225 or "Mary (Unknown)" displays documents wherein "Mary" is identifying the Median Entigen (not a regular Entigen). Notably, in this example, the Median Entigen is used to identify those individuals whose Entigens couldn't be identified (those documents wherein the Pluratum "Mary" failed to identify specific Entigen).

Turning to FIGS. 12D-H, schematic depictions of an example of a process of answering a question using a query of a database in accordance with the present invention is shown. This process may be performed by the Extraction Logic module 360 of FIG. 2, operating on Tallied Indexed CETs Database 320 or the Entigen Database 398 of FIG. 2. FIG. 12D-H are schematic depictions of three different sentences that were processed by the IEB-DCE System 100 including the Identigention process which resulted in a series of CETs and ENCETs. For example, in FIG. 12D, the first Sentence 1230 or "Captain John called Tom" resulted in two different ENCETs wherein the first CET (1a) involves "e209" (Captain John); and the second CET (1b) involves "e300" (Tom). In FIG. 12E, the sSecond Sentence 1240 or "Sergeant John called Tom" resulted in its two ENCETs wherein the First ENCET (2a) involves "e312" (sergeant John) and the second ENCET (2b) involves "e300" (Tom). In FIG. 12F, the third Sentence 1250 or "John called Tom" resulted in two CETs, wherein the first CET (3a) involves the Median Entigen or "em210" and the second CET (3b) involving "e300" (Tom). Notably, because this sentence failed to identify which John or which regular Entigen (e209 or e312) is mentioned, the Median Entigen (em210) is used instead (this CET could have also used the IDN).

As a result, based on Entigens of the Itenym "John", the IEB-DCE System 100 is able to retrieve three different types of results: e209 (Captain John), e312 (Sergeant John) and em210 (unidentified or unknown John). Consequentially, questions could be divided based on their corresponding Entigens.

In FIG. 12G, the Query 1260 or "Who called John" results in two CETs, wherein the First CET (4a) involves the IDN of the variable who or "IDN\[who]" and the second CET (4b) involves "e300" (Tom). Notable, the variable or "IDN\[who]" is designed to match any Entigen that is also identifiable by human (or its IDN). In other words, who retrieves Entigens that are humans. Accordingly, because e209 (Captain John), and e312 (Sergeant John) are human, then "who" finds them as a match.

In FIG. 12H, the Extraction Logic module 310 of FIG. 2 matches the Identigens (or Entigens) of the question with the Entigens in the Source of Data 320, FIG. 1 and FIG. 2 to answer the question which is displayed in the Answers GUI 1270 depicting one of the Entigens or John the captain in the tab "John (e209)". Notably, in this example, the unknown or unidentified John (the Median Entigen) or "em210" is not shown since it is uncertain which or what is being identified by "John" in the third sentence (see FIG. 12F). Additionally, in this example, the tabs are using the words that IDN\who retrieved along with their corresponding Entigen (i.e., e209 in the first tab). The tabs in this example do not offer additional descriptions for their Entigens (i.e., John the captain or John the sergeant). Significantly, additional means for displaying more information (i.e., links) could be added to display all the Identigens of e209 and e312 respectively (i.e., a graphical database).

As a result, CETs, their types, IDNs and Entigens may be used to efficiently find matches and retrieve data surpassing traditional approaches that rely on words or word patterns.

Figure 13A:
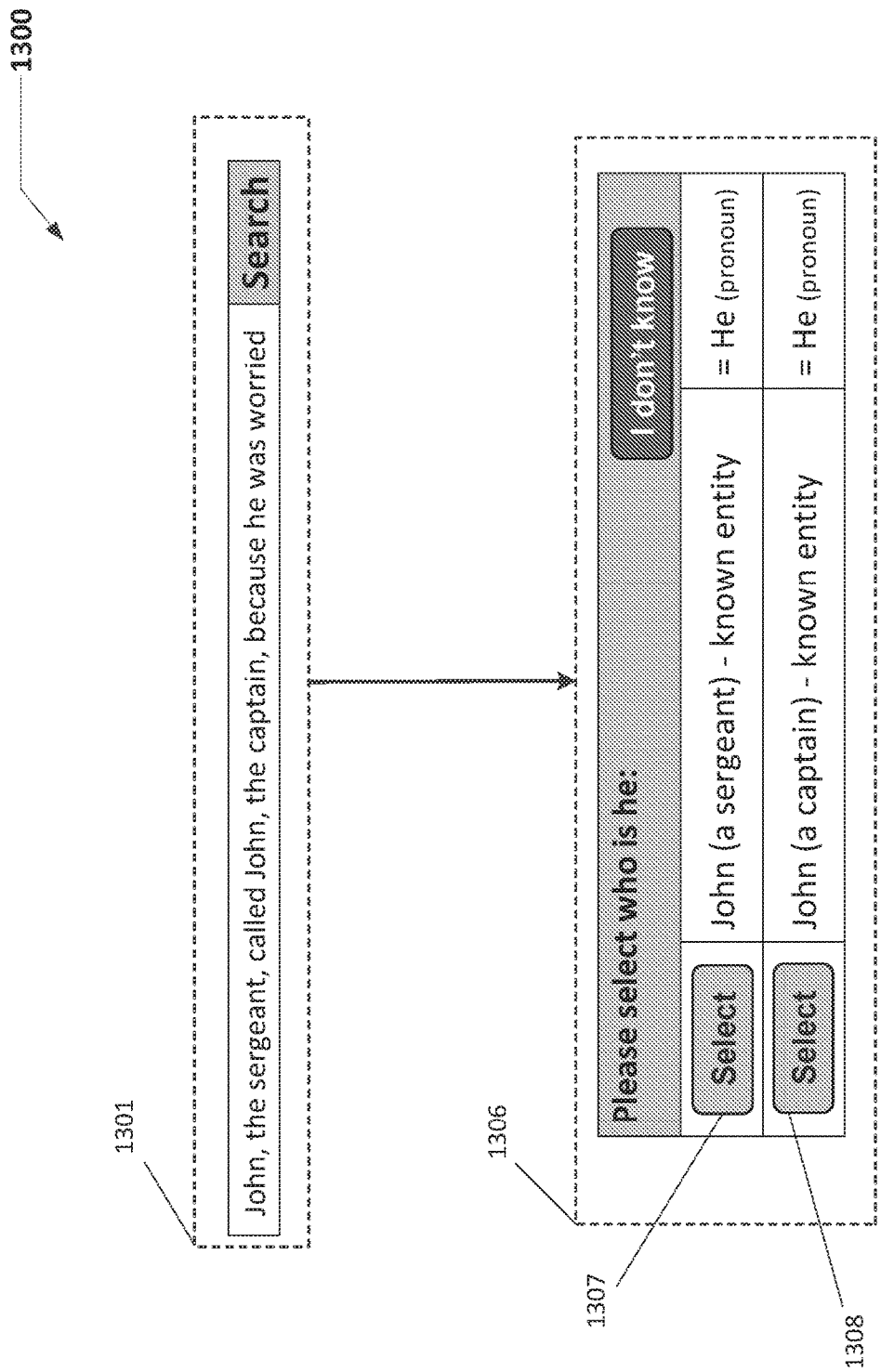
FIGS. 13A-D are exemplary schematics of resolving ambiguous pronouns in accordance with an example implementation of FIG. 1.

Turning to FIG. 13A, a schematic 1300 comprising exemplary several GUIs asking the user for to resolve the pronoun ambiguity of in a query in accordance with an example implementation from FIG. 1 is shown. The Ambiguous Query 1301 or "John, the sergeant, called John, the captain, because he was worried" is ambiguous because it is not clear whether "he" is identifying the sergeant or the captain. Accordingly, the Select Pronoun GUI 1306 (please select who is he) enables a user to select who "he" is in the query. For example, clicking on the First Selection 1307 or "John (a sergeant)" makes "he" the pronoun of sergeant Entigen, and not a pronoun of captain John (a different Entigen). As a result, an External Input 397, FIG. 1 allows the system to identify the exact Entigen that "he" is trying to describe. In contrast, by selecting the other option or Second Selection 1308 "John (a captain)" makes "he" the pronoun of the other Entigen or captain John. Significantly, without Identigention by the IEB-DCE System 100, it would be impossible to separate one John from the other John, or more importantly, retrieve valid documents wherein the correct John is involved.

Figure 13B:
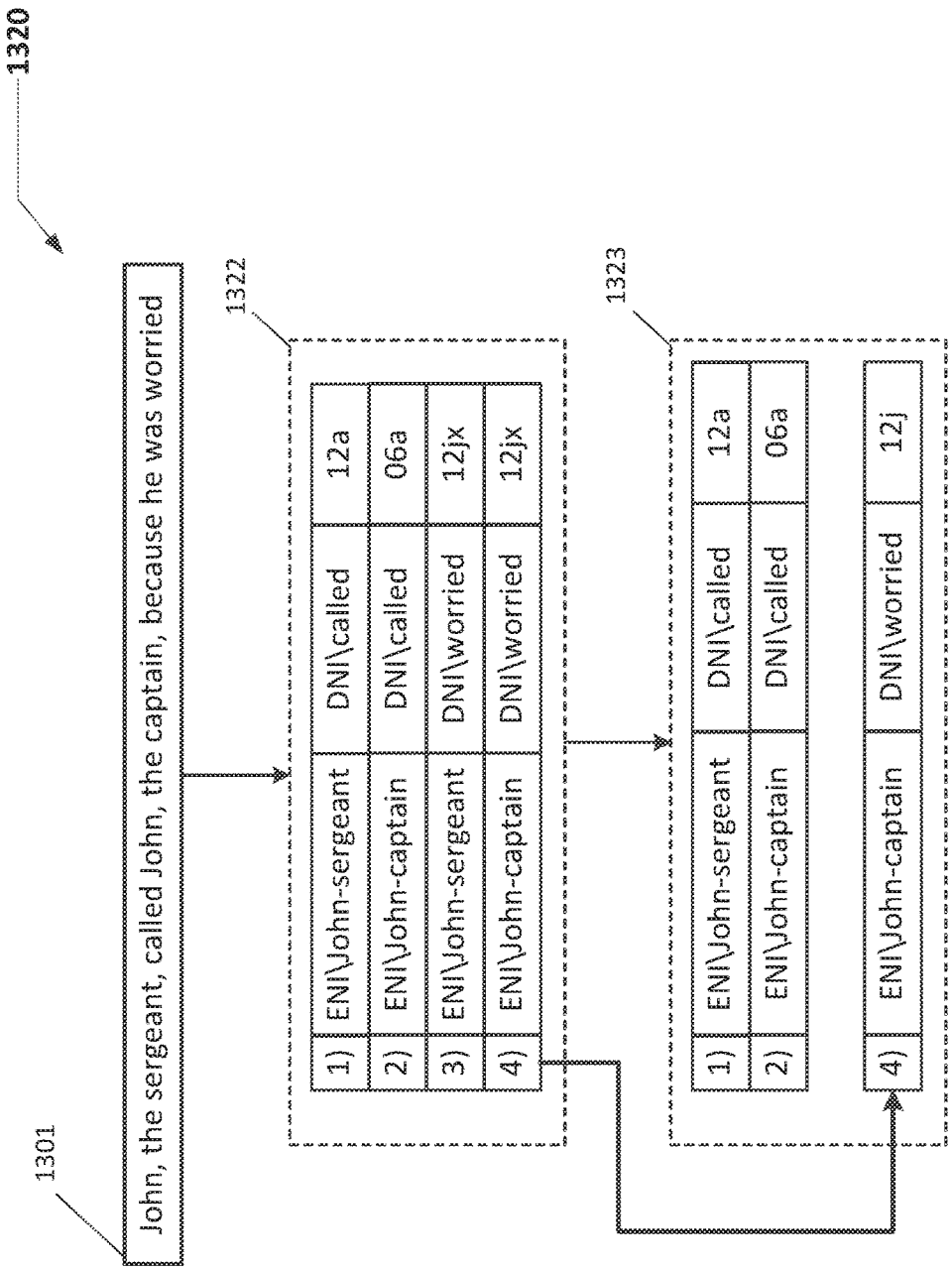

In FIG. 13B, an exemplary schematic 1320 of the processing of an Ambiguous Query 1301 exemplified in FIG. 13A and a user's response in accordance with an exemplary implementation of FIG. 1 is depicted. In this example, a user selected the option that "he" was a pronoun of "John the captain" 1308, FIG. 13A. The Exemplary GUI 1322 depicts four ENCETs (CETs that involve at least one Entigen) that resulted from processing the Query 1301 or "John, the sergeant, called John, the captain, because he was worried" before a user's selection to identify "who (captain or sergeant) is worried". The Pre-Selection CETs GUI 1322 illustrates the third record or ENCET which linguistically is comparable to "sergeant John is worried" along with the fourth record or ENCET which linguistically is comparable to "captain John is worried". Notably, both ENCETs are type "12jx", wherein in this example the ending character "x" is used to identify ENCETs that compete with one another. As result, a single 12jx type ENCETs should remain, thus creating the reason why the IEB-DCE System 100 needs additional information for selecting which 12jx ENCET should remain. Because in this example, a user selected the option that "he" in the sentence is identifying the captain (the user selected the fourth ENCET) the Selected CETs GUI 1323 shows the fourth ENCET which describes that the captain is worried, and omits the third ENCET (the unselected ENCET). Notably, the reaming fourth ENCET in this example was converted from the original 12jx to 12j. Accordingly, the remaining CETs don't comprise character "x" (competing CETs), meaning that may be safely used in the future without creating ambiguity or confusion.

Figure 13C:
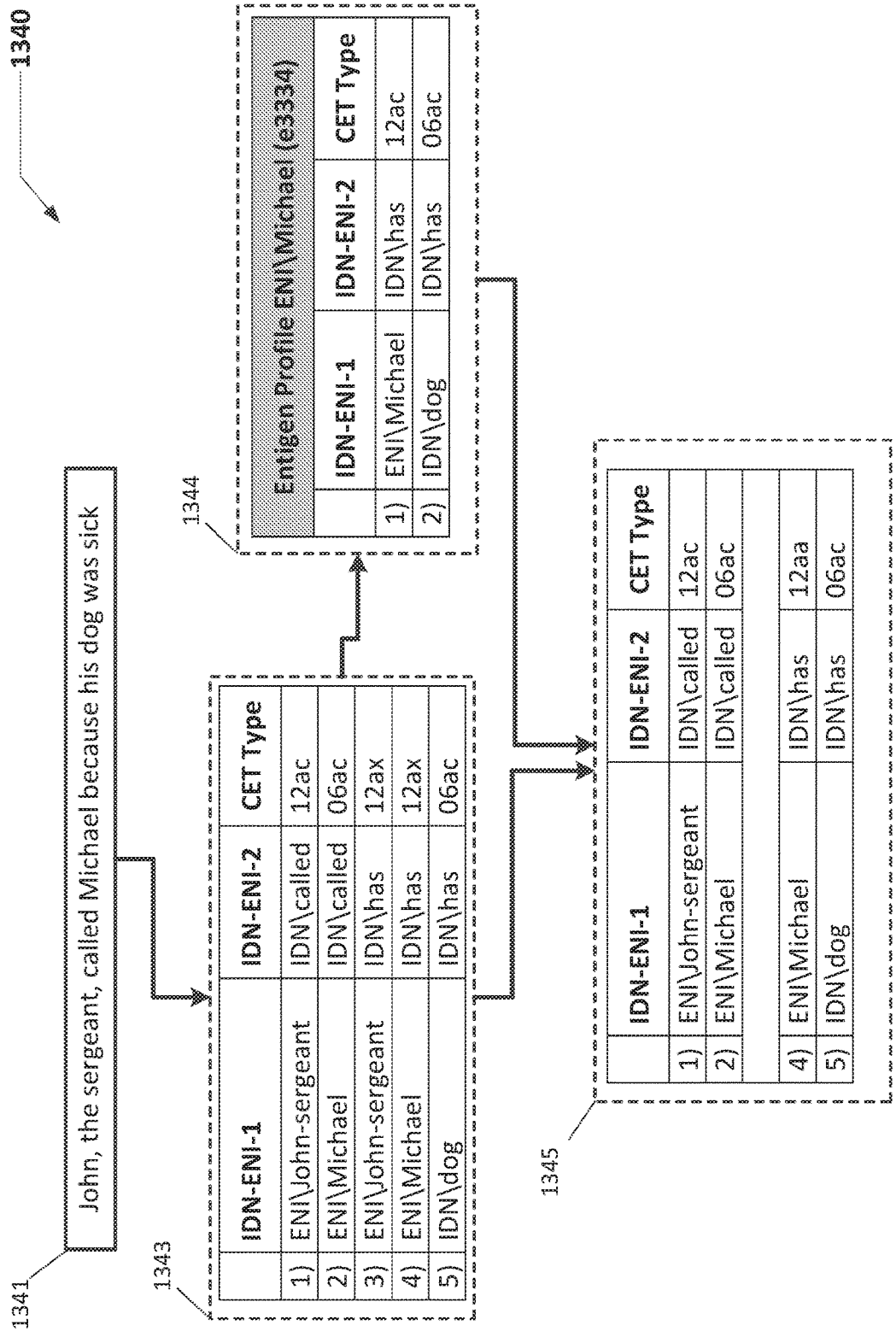

In FIG. 13C, a schematic 1340 comprising several GUIs showing the identification of a pronoun using an Entigen profile in accordance with an exemplary implementation of FIG. 1 is shown. The Sentence 1341 or "John, the sergeant, called Michael because his dog was sick", is ambiguous because it is not clear who owns the dog (John or Michael). Accordingly, the Processed CETs 1343 GUI displays the ENCETs that resulted from processing and identifying the Entigens of the ambiguous sentence. Notably, the third and fourth records show ENCETs which types end in character "x", meaning that only one of these two records or ENCETs should remain. Next, the IEB-DCE System 100 searches within its profiles to discover if one or both Entigens have dogs. As illustrated, only one of the Entigens, actually Michael's Entigen, has a dog 1344, meaning the "he" must be Michael, for it is unknown if John has a dog as well. As a result, the third record or John's ENCET is removed, and only the fourth record or ENCET remains in the Disambiguated GUI 1345 which depicts information from the Tallied Index CETs database 320, FIG. 1 or Entigen database 398, FIG. 1. Notably, the fourth and remaining ENCET in the Disambiguated GUI 134 has experienced a transformation from a 12ax type CET (in the Processed CETs GUI 1343) to a 12aa type ENCET; wherein the last character "a" is used, in this example, to describe ENCETs that are probable or not certain. The reason why this ENCET "12aa" is uncertain it is because it is not verified if John has a dog or not. In other words, finding information that states that "John doesn't have a dog" is completely different than the absence of information that mentions that "John does have a dog."

Figure 13D:
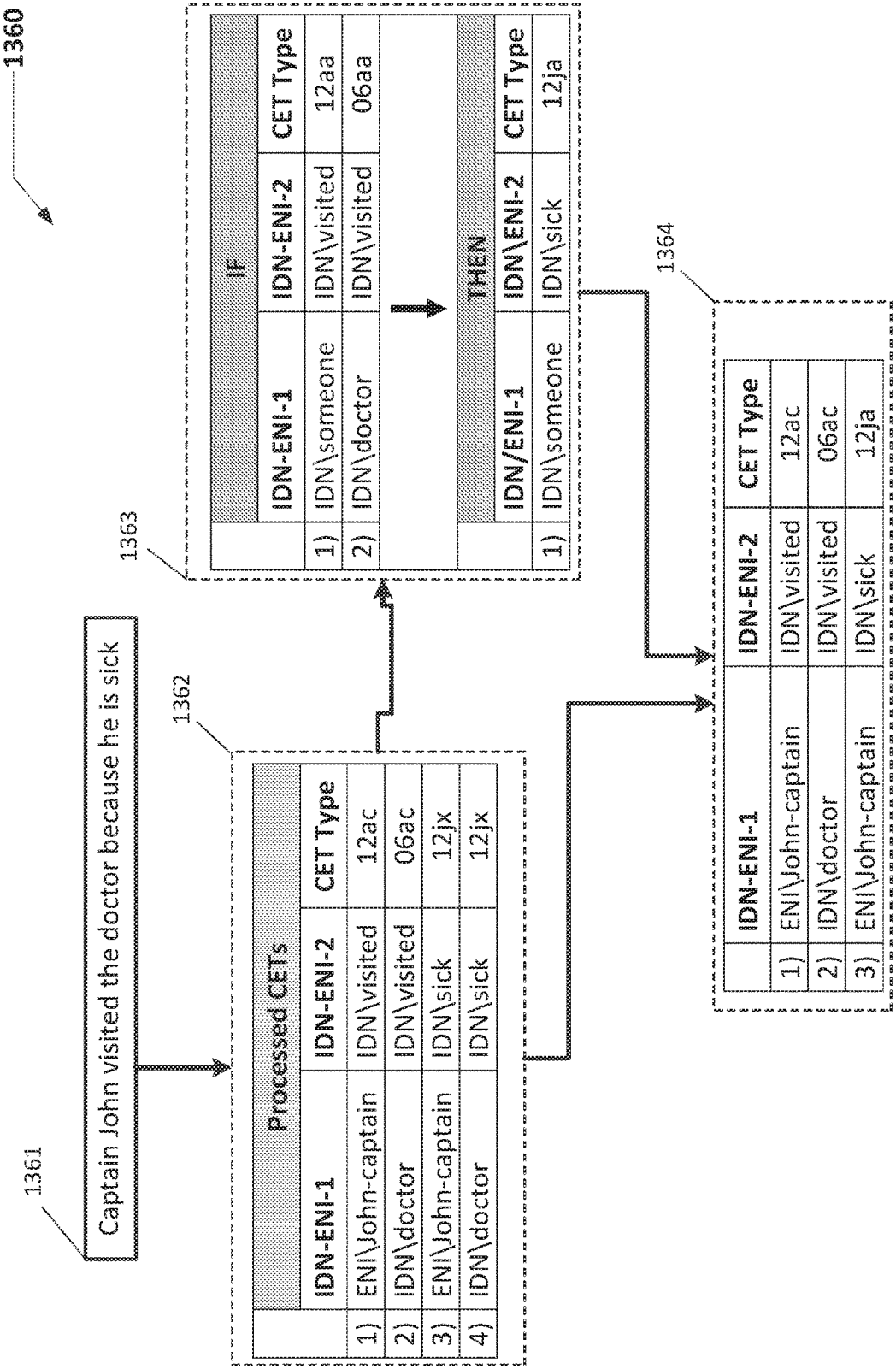

Turning to FIG. 13D, a schematic 1360 comprising several GUIs showing the identification of a pronoun using a Sequence in accordance with an exemplary implementation of FIG. 1 is shown. The Sentence 1361 or "Captain John visited the doctor because he is sick" is uncertain because it is not clear who is "he" disclosing (John or doctor). Accordingly, the Processed CETs 1362 GUI displays the CETs that resulted from processing the Sentence 1361 and the corresponding identified Entigens. Notably, the third and fourth records show CETs whose CET types end in the character "x", meaning that only one of these two records or CETs will remain. Next, the IEB-DCE System 100—searches within the Sequences Database 380, FIG. 1 to discover if there is a Sequence that can identify who "he" is. As illustrated, there is a sequence 1363 that comprises two groups of IDCETs which linguistically are comparable to "if someone visited a doctor, then someone is sick." As a result, because someone's Identigen can also be used to identify John's Entigen, then the Sequence 1363 can be used to identify who the word "he" is trying to identify. Consequentially, in the Sequence Disambiguated GUI 1364, the fourth record from GUI 1362, which linguistically was comparable to "the doctor is sick", has been removed; and only the third record (from GUI 1362) which is comparable to "John is sick" is kept. Notably, the third record experienced a transformation, from a 12jx type ENCET in GUI 1362, to a 12ja type ENCET in GUI 1364; wherein the last character "a" is used in this example to describe ENCETs that are probable or not certain. The reason why this ENCET "12ja" is uncertain is because the last CET (THEN) in the Sequence 1363 is itself type "12ja". In other words, because "Captain John visited the doctor", then probably "Captain John is sick."

Figure 13E:
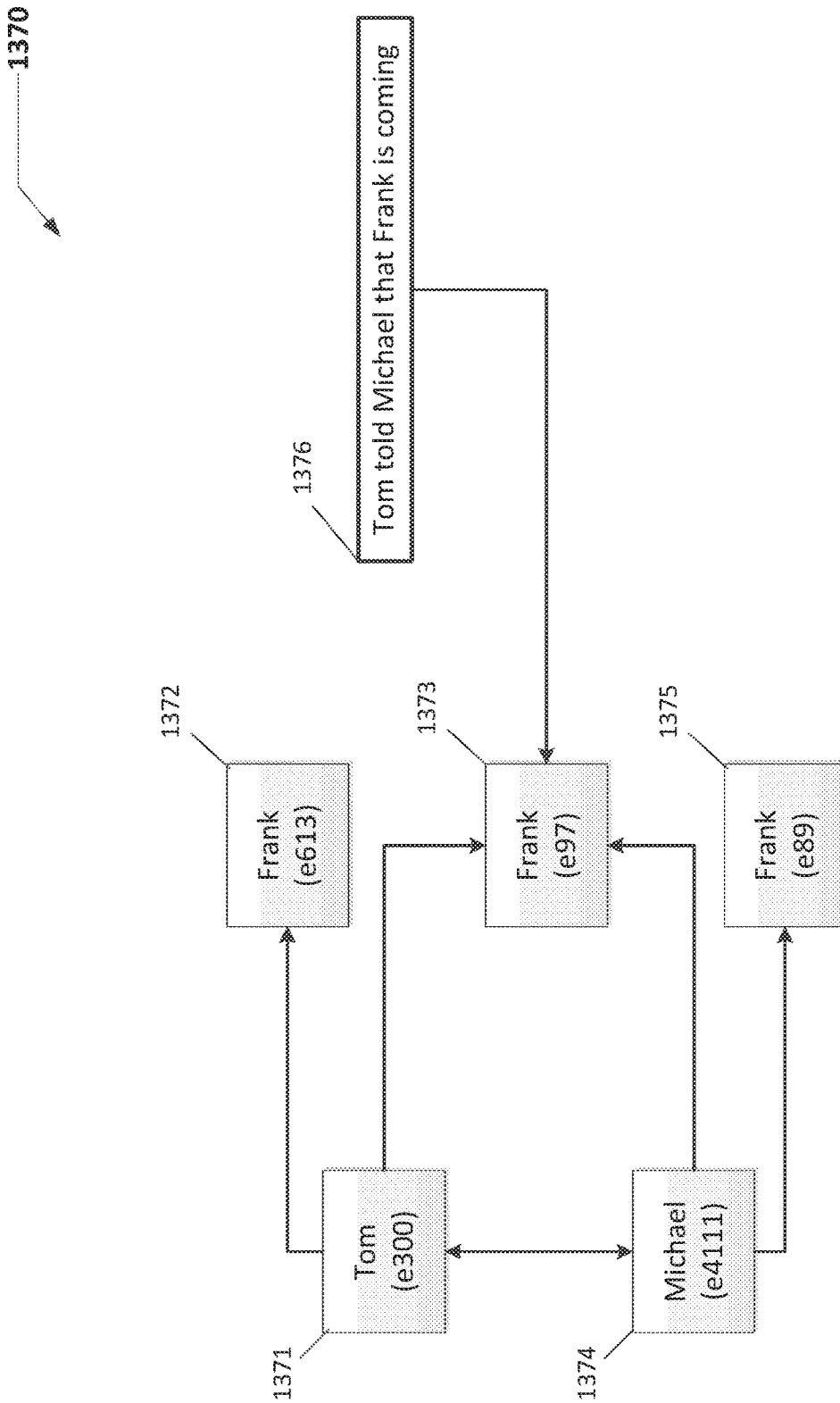
FIG. 13E is an exemplary schematic of several Entigen profiles for identifying a common individual in accordance with an exemplary implementation of FIG. 1.

In FIG. 13E, a schematic 1370 comprising several Entigen Profiles of people which know each other are used for identifying an intended individual (Identigention) in accordance with an exemplary implementation from FIG. 1 is shown. For example, Tom's Entigen Profile 1371 whose Entigen is e300 contains information from or about other Entigens (other people) which is depicted in the form of arrows pointing to the other Entigen Profiles. Like this, Tom 1371 or "e300" knows: Michael 1374 or "e4111", Frank 1372 or "e613" and another Frank 1373 or "e97". In other words, Tom knows Michael and two other people who share the name Frank. In similar fashion, because Michael's Entigen Profile is pointing to Tom's Profile and two Frank Profiles, then Michael knowns Tom and two Frank (e4111 knows e300, e97 and e89). Notably, the name "Frank" ambiguously identifies three different Entigens but there is only one Entigen 1373 or "e97" which is commonly known by both Tom and Michael. In this fashion, if sentence 1376 or "Tom told Michael that Frank is coming" is processed, the IEB-DCE System (100, FIG. 1) can use the information contained in the Entigen Profiles to identify which Frank is Tom (or the sentence) talking about. As a result, the only Frank that Tom and Michael know is Entigen e97, meaning that the sentence 1376 is describing e97 and not the other two people named Frank. Like this, via the Entigen Profiles, the IEB-DCE System can use prior, present, even future context to identify the Entigens intended by Pluratums (words or IDNs capable of equally identifying several unique things or Entigens). Moreover, identifying the interactions between Entigen Profiles allows the IEB-DCE System to isolate the information and context respectively. For example, if John says: "Lisa is smart" does that make Lisa smart? The answer is "Yes" but only to John. And, if Tom then says: "Lisa is not smart" does that make Lisa not smart? "Yes", but only to Tom. In this way, Entigen Profiles allow several forms of identification, based on and attributable to the sources of information. Therefore, Lisa's Entigen (or her profile) can be identified when John mentions a smart girl and when Tom mentions a not smart girl without creating a contradiction for Lisa, John or Tom.

Figure 14:
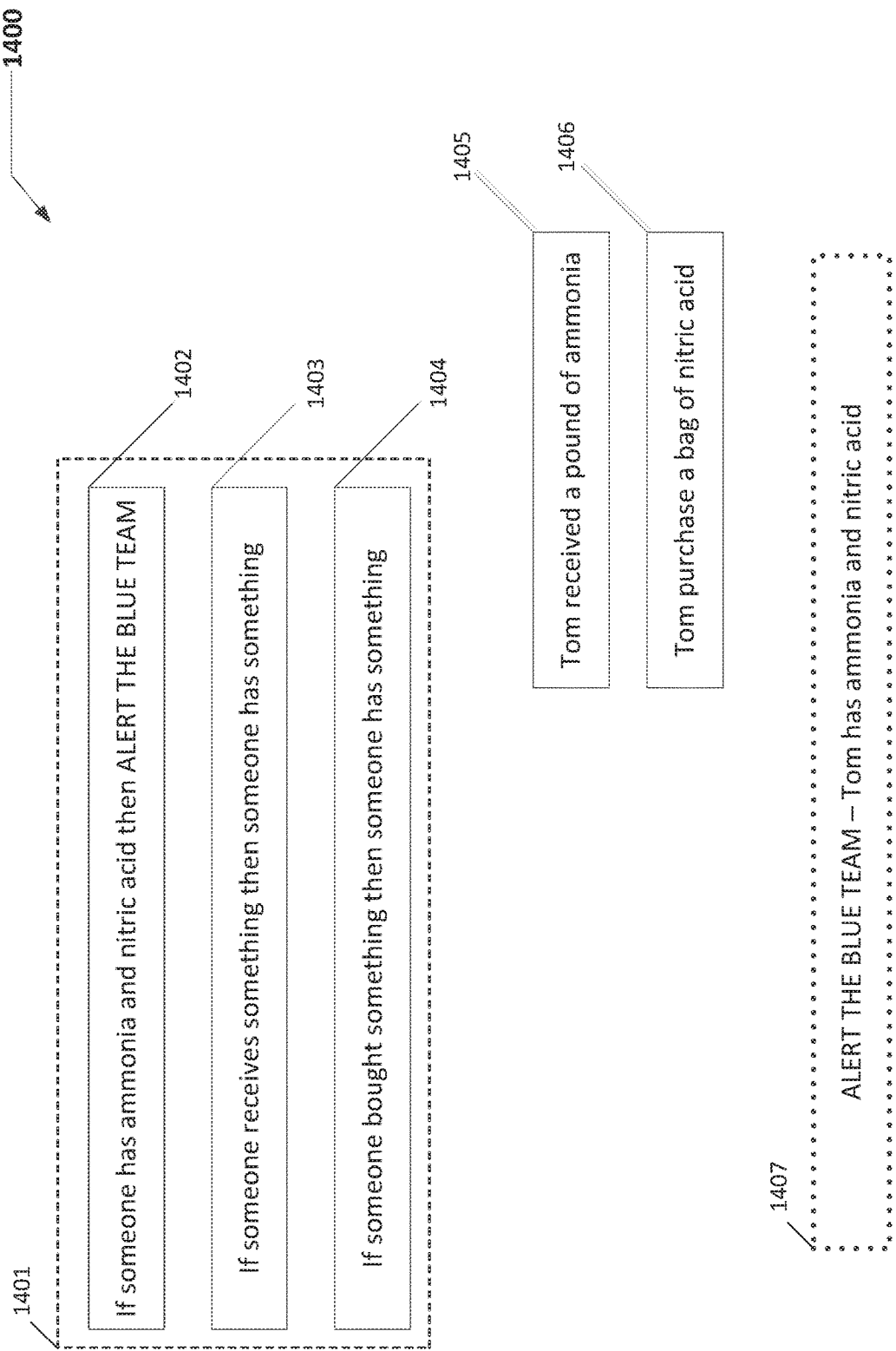
FIG. 14 is an exemplary illustration of several relations between several propositional sentences in accordance in accordance with the example of FIG. 1.

In FIG. 14, an exemplary illustration 1400 of several relations between several sequences in accordance to the present invention shown in FIG. 1 is depicted. One of the major studies in the classical field of Logic is "Sentential Calculus" or "Propositional Logic" which deals with the relationships and conditions that exist between different sentences describing different events. For example, in Propositional Logic the sequence "if Sunday is sunny then we go fishing" is divided into two independent sentential variables (p and q) each representing its corresponding sentence (i.e., p represents: Sunday is sunny; and q represents: we go fishing); and the relationship between sentence p and sentence q is annotated via a sentential connectors or "→" which means "if, then". As a result, "if Sunday is sunny then we go fishing" can be expressed with a formula or "p→q" (it reads if p then q). Although this formula was able to formalize and perhaps simplify the relationship that exists between p and q, the formula actually failed to describe what happens to each of the individuals (Entigens) on each of the p and q sentences. Indeed, if new sentences are introduced, they receive new variables (i.e., "r" and "s"); and if r or s describe any individual (Entigen) also described in p or q, this Entigen is not only treated apart, but most likely, never recognized. As a matter of fact, because sentences are represented by separate variables, Propositional Logic is serving separate sentences, and not the different and unique Entigens that sentences are indeed inherently describing.

However, the Sequences of the proposed application (also called Logical Sequences) do not focus on sentences' representations, but rather on each of the individual elements (Entigens) that sentences inherently describe. Accordingly, only Logical Sequences can extract and exploit each sentence's true purpose—their Entigens. For example, the alert "if someone has ammonia and nitric acid then ALERT THE BLUE TEAM" encompasses a multitude of items and events (a person, the possession of chemicals, ammonia and nitric acid) which could occur in separate instances (i.e., a suspect could purchase ammonia first, and a week purchase more chemicals to create nitric acid). Propositional Logic's sentence p (someone has ammonia and nitric acid) requires for both chemicals to be together, as a whole, not independently. However, Logical Sequences' CETs and their Entigens not only represent each of the chemicals independently, but it can also handle the events independently which may lead to the creation of nitric acid, thus responding to the alert even when the chemicals and the events occur separately. Returning to FIG. 14, the exemplary Sequence Database GUI 1401 has three Sequences such as the First Sequence 1402 or "if someone has ammonia and nitric acid then ALERT THE BLUE TEAM" which is an alert; and two deductions such as the Second Sequence 1403 or "if someone receives something then someone has something"; and the Third Sequence 1404 or "if someone bought something then someone has something". When the First Entry 1405 or "Tom received a pound of Ammonia" is processed by the IEB-DCE System (100, FIG. 1), it involves a deduction which according to the Second Sequence 1403 will generate CETs which are linguistically comparable to "Toms has ammonia". In similar fashion, when the Second Entry 1406 is processed, the Third Sequence 1404 will generate other CETs that are linguistically comparable to "Tom has nitric acid". Accordingly, although both Entries (1405 and 1406) were processed separately, each lead independently to a portion of the alert or First Sequence 1402, meaning that the conditions for the alert have happened, thus leading to the generation of the Alert 1407 or "ALERT THE BLUE TEAM—Tom has ammonia and nitric acid". Notably, regardless of the trusted status of the data being processed by the IEB-DCE System, alerts and alarms may always remain operational.

Figure 15A:
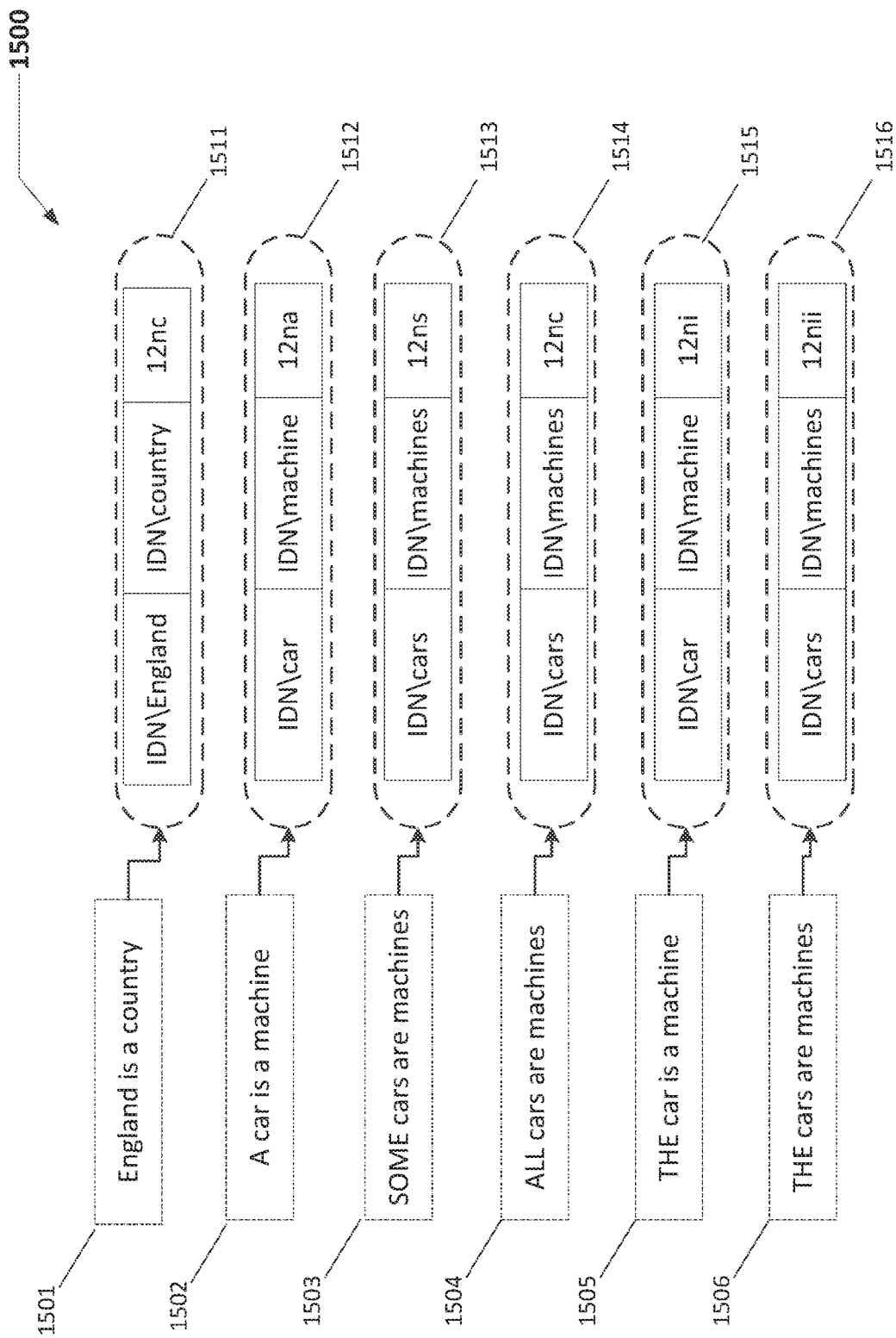
FIG. 15A depicts several schematics of multiple CETs of multiple 12n types corresponding to particular predicates of the subjects of the sentences in accordance with the example of FIG. 1.

In FIGS. 15A to 15E, several schematic examples of several types of CETs, Inferences and Contradictions in accordance with an example implementation shown in FIG. 1 are depicted. Turning to FIG. 15A, several schematics 1500 of multiple IDCETs of several 12n types of their corresponding sentences and predicates are depicted. The First Statement 1501 or "England is a country" results in the First CET 1511 which is type "12nc"; wherein the last character "c" in this example is used to describe CETs that comprises "certainty", or that may be safely used (without making assumptions) to identify its intended Entigen. This type of CET happened because "England" is a Singulatum (in this example, "England" has a single Entigen). Notably, because IDN\England has a single Entigen, using its IDN or ENI in CETs works the same. Returning to FIG. 15A, the Second Statement 1502 or "A car is a machine" results in the Second IDCET 1512 which is of type "12na"; wherein the last character "a" is used to describe CETs that cannot be used without making assumptions. The reason why IDCET 1512 cannot be used without making assumptions is because it involves the Pluratum "car" which is capable of identifying multiple Entigens, including Entigens that are not machines. However, if the Entigen profiles of the many "cars" were similar (they are all machines); then "a car is a machine" could become 12nc or certain. The Third Statement 1503 or "SOME cars are machines" results in the Third IDCET 1513 of type "12ns"; wherein the character "s" is also used to describe CETs that cannot be used without making assumptions to identify its Entigens. In this example, the predicate "SOME" described this lack of certainty in the sentence. However, the Fourth Statement 1504 or "ALL cars are machines" results in the Fourth CET 1514 of type "12nc"; wherein character "c" is used to describe CETs that are "certain" which may be safely used to identify its Entigens. In this example, the predicate "ALL" included the Pluratums "car" in such fashion that all its Entigens are being included in the statement. Accordingly, all Entigen identifiable by "car" can also be identifiable by "machine". The Fifth Statement 1505 or "THE car is a machine" results in the Fifth CET 1515 type "12ni"; wherein character "i" is used to describe CETs that are "relative" which may not be able to identify their Entigens unless circumstances reduce the number of possible Entigens and/or additional information is available. Finally, the Sixth Statement 1506 or "THE cars are machines" results in the Sixth CET 1516 of type "12nii"; wherein the ending characters "ii" is used to describe "relative" CETs that may be used to select multiple Entigens.

Accordingly, in this example, different kinds of 12n CETs such as 12na, 12ns, 12nc, 12ni and 12nii were created to describe the different degrees of certainty or uncertainty that their corresponding sentences and their predicates (i.e., the, a, all, some) described. For example, in the case of one type of relative CET (ending in "i"), when the functional word "THE" combined with its Pluratum in singular form (i.e., the car, the chair, the person), the sentence that was formed tries to identify a specific Entigen. However, the Entigen identification process of a specific Entigen can happen safely (no assumptions or ambiguities) only if the context or environment contains a single Entigen; or if additional information is provided that could help isolate or identify the specific Entigen. An example is when a speaker asks for "the chair". If the room (environment) contains only one chair, then "the chair" safely identifies the Entigen (the only chair). However, if there are several chairs in the room, then "the chair" is uncertain because it fails to describe which specific chair is "the" intending to describe. As a result, when relative CETs are processed, the IEB-DCE System (100, FIG. 1) may optionally generate a question(s) to a user, asking for clarification as to which specific chair (Entigen) is "THE" intending to describe. Notably, if the additional information is provided then the relative CET (i.e., 12ni) may change to a certain CET (i.e., 12nc).

Figure 15B:
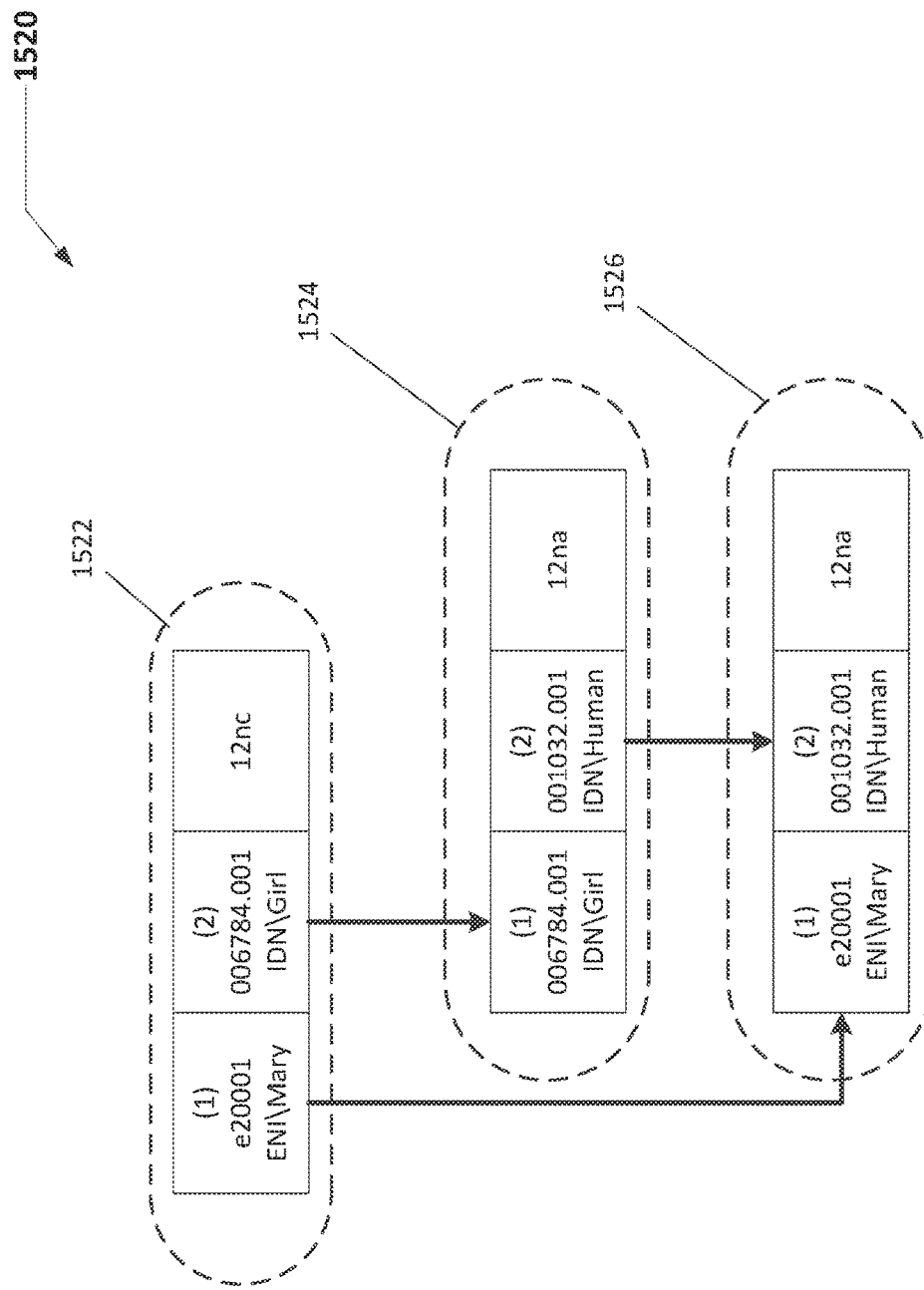
FIG. 15B is an illustration of multiple CETs are depicted to illustrate one kind of inference (type 12n) in accordance with the example of FIG. 1.

In FIG. 15B, an illustration 1520 of multiple CETs 1522, 1524, and 1526 are depicted to illustrate one kind of inference (type 12n) in accordance with the present invention is shown. The First ENCET 1522 is a 12nc type CET comprising the first Entigen e20001 of an individual who is identifiable by the Itenym or name "Mary" and the second IDN of girl or "006784.001"; which results from processing the sentence "Mary is a girl". Notably, "Mary", in this example, is a Singulatum thus capable of identifying only one and unique Entigen or e20001. In addition, notice that this is a "12nc" type, meaning that this is certain CET (ending character "c" signifies certainty). The Second CET 1534 is another 12n type CET, more specifically a 12na type, which resulted from processing the sentence "A girl is a human" which comprises the first IDN\006784.001 of "girl" and the second IDN\001032.001 of the word "human." Notice that this CET is a "12na" type, meaning that it is an uncertain, due to the Pluratum IDNs and the predicates used in its sentence (ending character "a" signifies uncertainty). The third CET 1526 is a conclusion also known as an inference, which in natural language would be the equivalent to "Mary is a human". This Inference CET 1526 is herein referred in more detail as a "Entigen Uncertain Inference" (EU Inference) of the First CET 1522 and the Second CET 1524 because it involved an uncertain CET (Second CET 1524 of type 12na). This EU Inference CET 1526 was generated by the Inference procedure which is: a third or Inference CET type 12na can be formed, if and only if, the second IDN of a first 12nc type CET (IDN\Girl of 1522) is equal to the first IDN of a second CET type 12na (IDN\Girl of 1524); wherein the said third CET is formed comprising the first IDN or Entigen of the first CET (IDN\Mary of 1522) and the second IDN of the second CET (IDN\Human of 1524).

Because in this example the First CET and Second CET did fulfill the necessary conditions to perform the inference, the above Inference CET 1526 was generated, which is itself uncertain (12na). As a result, the Entigen e20001 is now identifiable by the IDNs of "Mary", "girl" and "human" and their combinations. Noteworthy, the identification of the Mary's Entigen (e20001) through IDN\human involves some uncertainty (it is an assumption) because of the 12na type CET; and not until "Mary is a human" is verified (Mary's Entigen makes a CET type "c" with IDN\Human) that identifying e20001 via IDN\Mary can be done with certainty. Like this, deductions could be interpreted as a type of Entiduction. Moreover, other types of inferences comprising other types of CETs, including different degrees of certainty are possible in accordance with the present proposal. For example, if the second sentence is replaced with "All girls are human" (a 12nc type), then the Inference would also be a 12nc (certain) because both CETs shared the same type.

Figure 15C:
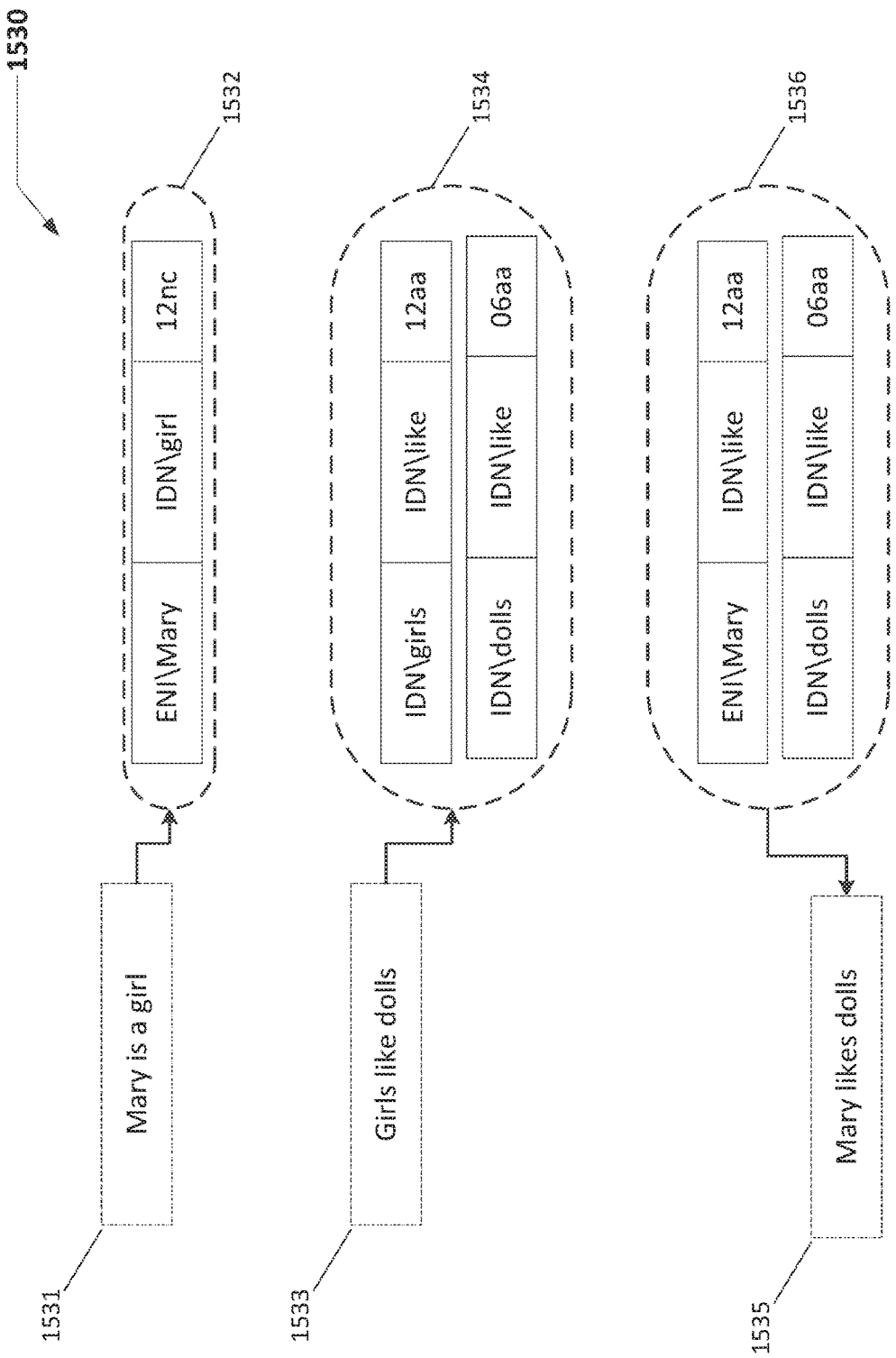
FIG. 15C is another schematic illustration of another type of inference involving an ENCET and an IDCET in accordance with the example of FIG. 1.

In FIG. 15C, another schematic illustration 1530 of another type of inference involving a ENCET and IDCETs in accordance with the present approach of FIG. 1 is depicted. The First Statement 1531 or "Mary is a girl" results in the First ENCET 1532 which groups ENI\Mary, IDN\Girl on a 12nc type CET; wherein "c" means "certain or certainty". Notably, the First ENCET 1532 is a type "c" because it involves Mary's Entigen; wherein "Mary" (Singulatum) identifies a single Entigen. However, the Second Statement 1533 or "girls like dolls" results in its corresponding Second CET 1534 which involves two different IDCETs, which include the IDCETs type 12aa and 06aa; wherein the second "a" in the type describes an "assumption" or that these CETs are "uncertain" and cannot be used without using assumptions. Consequentially, the third or Inference CET 1536 which in natural language would be comparable to "Mary likes dolls" 1535 is of types "12aa" and "06aa", meaning that these Inference ENCETs are also "uncertain" inferences or conclusions. Indeed, that "Mary is a girl" is true, that "girls like dolls" is a partial truth, therefore, that "Mary likes dolls" is an inference that could be partial true as well, until it can be verified. Like this, ENCETs may infer possibilities or uncertainty, which later may be classified as a certain CET or a contradictory CET for the Entigen, depending on different kinds of corrective actions and circumstances.

Figure 15D:
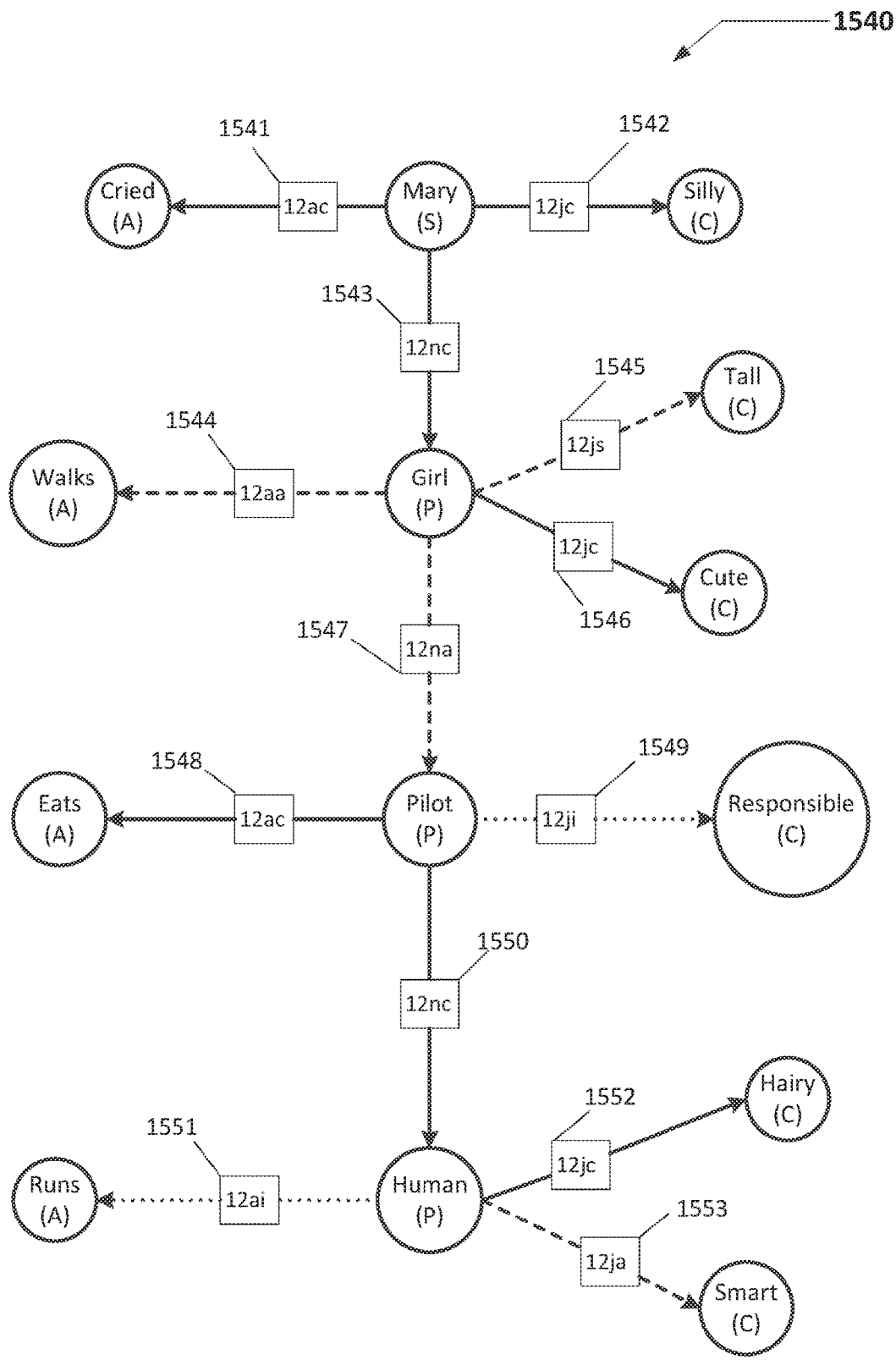
FIG. 15D is an exemplary schematic flowchart and illustration of several certain, Entigens and several types of inferences in accordance with the example of FIG. 1.

In FIG. 15D, an exemplary schematic flowchart illustration 1540 of several CETs with their corresponding degrees of certainty and several types of possible inferences in accordance to an exemplary implementation shown in FIG. 1 is depicted. In order to simplify the disclosure of FIG. 15D, words instead of their corresponding IDNs or Entigens are used. Also, in this exemplary kind of depiction (15D), CETs are illustrated as the combination or grouping of two circles which represent different descriptive identifiers (AIA) including Singulatum Itenyms like "Mary", which are being described by character "(S)"; Pluratum Itenyms like "Girl" which are being described by capital letter "(P)"; Attrenyms like "silly", which are being described by character "(C)"; and Actenyms like "cried", which are being described by character "(A)". Additionally, the different types of arrows are used between circles to illustrate whether the CETs are certain or uncertain. Solid arrows illustrate certain relations (CET types that end in "c"), dashed arrows illustrate uncertain relations (CET types that end in "a") and dotted arrows illustrate relative relations (CET types that end in "i"). In addition, squares are used between each arrow to describe the type of CET that AIAs are making among themselves. Accordingly, the First CET 1541 is of type "12ac" or certain (solid arrow) and involves "Mary" (Singulatum) and "cried" (Actenym) which linguistically corresponds to "Mary cried". The Second CET 1542 or "12jc" is also certain (solid arrow) and occurs between "Mary" (Singulatum) and "silly" (Attrenym) which linguistically corresponds to "Mary is silly". The Third CET 1543 or "12nc" is another certain CET (solid arrow) that happens between "Mary" (Singulatum) and "Girl" (Pluratum) which linguistically corresponds to "Mary is a girl". The Fourth CET 1544 is of type "12aa" or uncertain (dashed arrow) between "Girl" (Pluratum) and "walks" (Actenym) which linguistically corresponds to "girl walks". The Fifth CET 1545 "12js" is another uncertain CET (dashed arrow) between "Girl" (Pluratum) and "tall" (Attrenym) which linguistically corresponds to "some girl is tall". The Sixth CET 1546 or "12jc" is a certain CET (solid arrow) that occurs between "Girl" (Pluratum) and "cute" (Attrenym) which linguistically corresponds to "every girl is cute". The Seventh CET 1547 or "12na" is uncertain (dashed arrow) and happens between "Girl" (Pluratum) and "pilot" (Pluratum) which linguistically corresponds to "a girl is pilot". Similar construction, interpretation and approach is applied to every remaining relation or CET of FIG. 15D. Like this, different types of inferences (certain, uncertain or relative) can be attained when the different types of CETs interact with one another.

For example, an uncertain inference type 12aa, which is linguistically comparable to "Mary walks", can be formed between "Mary" and "walks" when the Third CET 1543 and the Fourth CET 1544 interact. The reason why this inference is uncertain is because "Mary" connects to "walks" through a dashed arrow (uncertain relation or CET 1544) thus making its inference uncertain as well. In this fashion, the types of arrows can quickly describe the certainty, uncertainty and relativity of the inferences that are at hand. Another example of an uncertain inference is if "Mary" interacts with "pilot" to form what is linguistically comparable to "Mary is a pilot" via the Third CET 1543 and the Seventh CET 1547. Mary and pilot form a 12na Inference CET because a dashed arrow (an uncertain relation or Seventh CET 1547) was involved. However, the inference that "Mary" and "cute" form (Third CET 1543 and the Sixth CET 1546 interact), which linguistically is comparable to "Mary is cute", is certain because all arrows are solid (only used certain CETs).

An interesting and complex inference CET type "12ja" occurs when "Mary" interacts with "hairy" which linguistically speaking is comparable to "Mary is hairy". Moving thru the Third CET 1543, the Seventh CET 1547, the Eleventh CET 1550 and the Twelfth CET 1552 two dashed arrows are found, thus making the inference an uncertainty. Notably, in this current example, the only means that "Mary" has to be identified by word "Human" with certainty is if "Mary is a pilot". Like this, if new information arrives which may relate Mary and Human in a non-uncertain fashion (a new solid arrow), then that would make "Mary" clearly and certainly "hairy". Another example is the inference when "Mary" interacts with "runs" (via the Third CET 1543, the Seventh CET 1547, the Tenth CET 1550 and the Eleventh CET 1551) and creates a CET which linguistically is comparable to "Mary runs" which would be a type "12aai" because in this example, all different types of arrows (all types of relations) were used. Linguistically speaking, this is similar to making an inference from the following statements: Mary is a girl, a girl is a pilot, all pilots are humans, the human runs. Notably, an average person would likely make mistakes (assume without caution) when trying to answer the questions: a) Can Mary run? Which as this example show that the IEB-DCE System 100 could answer with absolute precision; and b) Can Mary walk? Which the IEB-DCE System 100 could answer with a degree of uncertainty.

Notably, following the established relations (CETs), allows the IEB-DCE System 100 to form new inferences, thus revealing new CETs (new knowledge) that were never disclosed in the original information or its CETs. As a result, there may be dozens of methods and regulations that are applicable that exceed the permissible length and time of this application. It is clear that in this example, combining the different types of CETs (i.e. 12a, 12n, or 12j) with their different degrees of certainty and possible additional information (i.e., sensorial data and answers to questions) creates additional approaches and methods for identifying the different CETs and their corresponding degrees of certainty without ever departing from the spirit and scope of the present proposal.

Figure 15E:
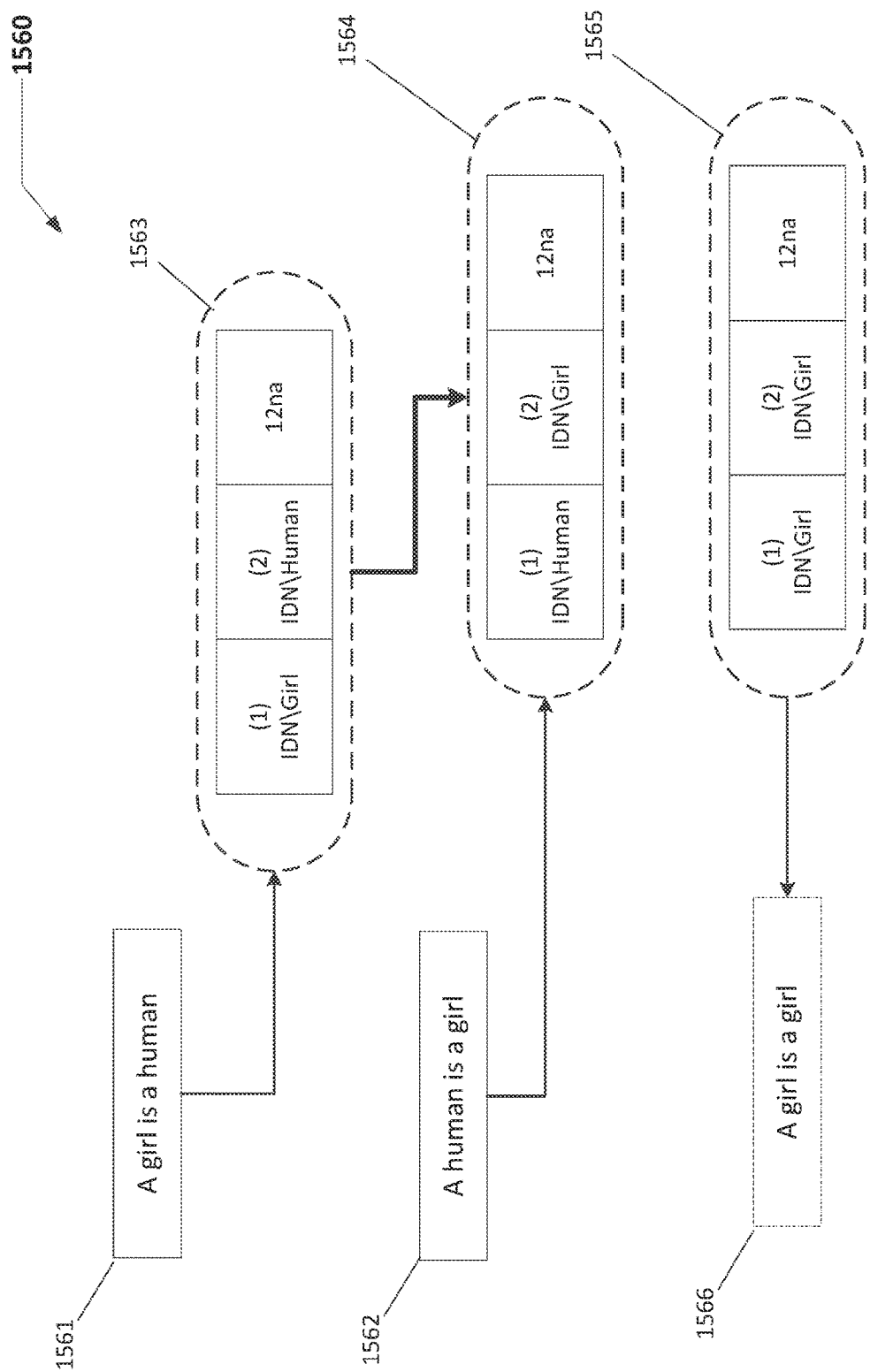
FIG. 15E is an exemplary schematic illustration of a contradiction which is generated when an inference or conclusion type 12n uses an inconsistent statement in accordance with the example of FIG. 1.

Turning to FIG. 15E, an exemplary schematic illustration 1560 of a contradiction which is generated when an inference type 12n uses an inconsistent statement that creates a contradiction in accordance with the proposed approach shown on FIG. 1 is depicted. The sentences "a girl is a human" and "a human is a girl" are clearly contrary to each other, meaning that one of them is wrong (i.e., a lie); which in this example the IEB-DCE System will identify by using an inference. Accordingly, The First Sentence 1561 or "a girl is a human" generates its corresponding First IDCET 1563 and the Second Statement 1562 or "a human is a girl" forms its corresponding Second IDCET 1564. Because the conditions exist to perform an inference (see FIG. 15B for more details), the resulting Inference CET 1565 is formed. As depicted the Inference CET 1565 comprises IDN\girl, IDN\girl is a 12na type CET; which is linguistically comparable to "a girl is a girl" 1566. Noteworthy, even when linguistically the sentence "a girl is a girl" sounds re-affirmative, an inference should never conclude or infer itself. Like this, although both CETs involved in creating the inference were type 12na (uncertain), the resulting inference 1565 is not only uncertain; but it is also a contradiction; because the same Identigen (IDN\girl) is present in the first (1) and second (2) position of the Inference CET 1565.

Figure 15F:
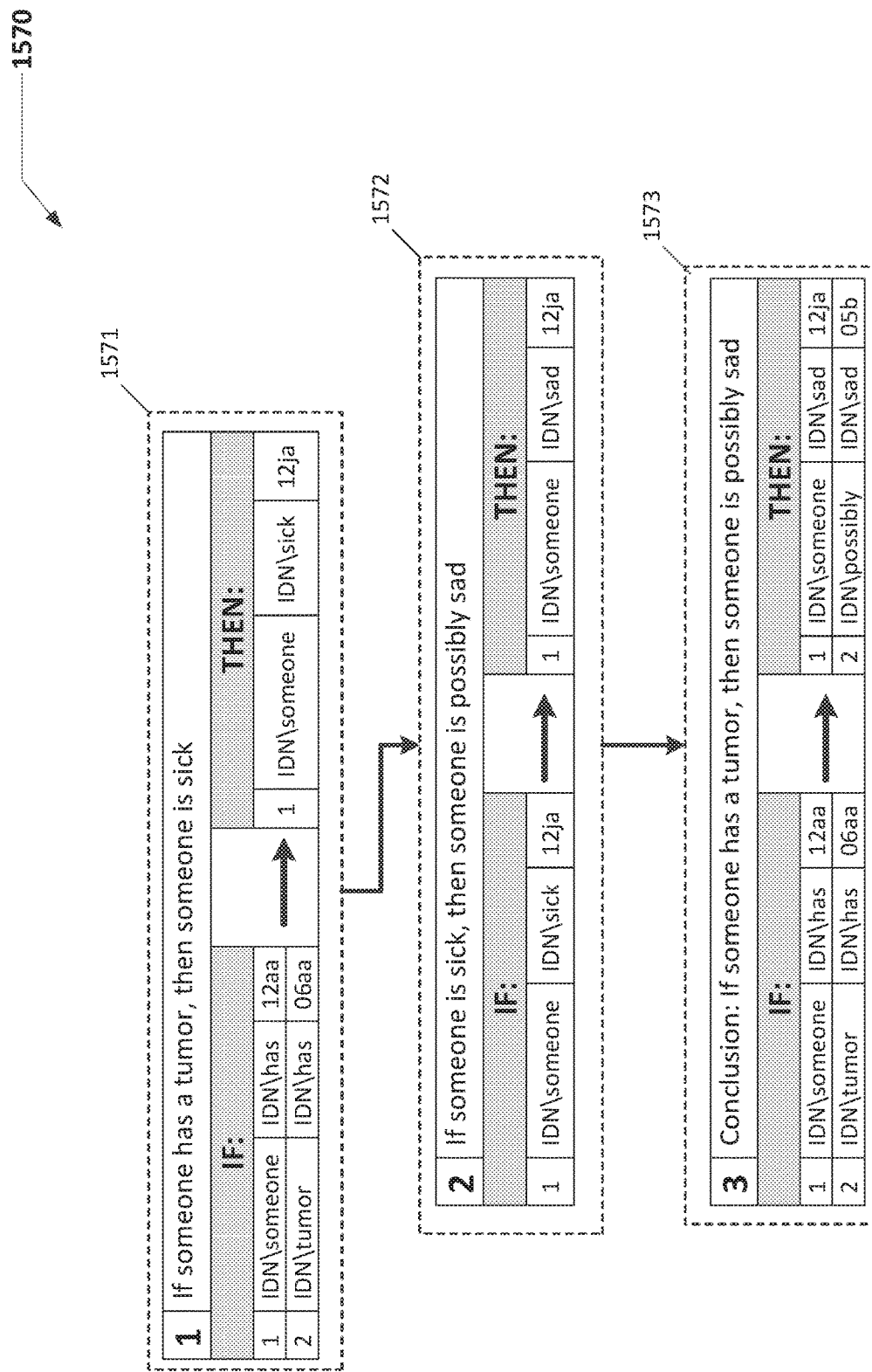
FIG. 15F is an exemplary schematic of several exemplary Sequences and their corresponding inference or conclusion in accordance with the example of FIG. 1.

In FIG. 15F an exemplary schematic 1570 of several exemplary Sequences and their corresponding inference in accordance with an exemplary implementation of FIG. 1 is shown. The First Sequence GUI 1571 or "if someone has a tumor, then someone is sick" depicts, under the IF column, the CETs corresponding to the first part of the sequence (if someone has a tumor) and under the THEN column the CETs that correspond to the second part of the sequence (then one is sick). The Second Sequence GUI 1572 or "if someone is sick, then someone is possibly sad" depicts, under its IF column, the CETs that correspond to the first part of the sequence (if someone is sick) and under its THEN column the CETs that correspond to the second part of the sequence (then someone is probably sad). Notably, the second part of the First Sequence 1571 is the same as the first part of the Second Sequence 1572 which is "if someone is sick". Accordingly, applying a modification of the inference rule used in FIG. 15B, in this FIG. 15F forms a new or Inferred Sequence 1573 which comprises the first part of the First Sequence 1571 and the second part of the Second Sequence 1572. As illustrated, the Inferred Sequence 1573 comprises, under the IF column, the CETs which are linguistically comparable to "if someone has a tumor" and under the THEN column the CETs which linguistically are comparable to "then someone is possibly sad". In this fashion the Inferred Sequence 1573 describes the new knowledge "if someone has a tumor, then someone is possibly sad".

Figure 16A:
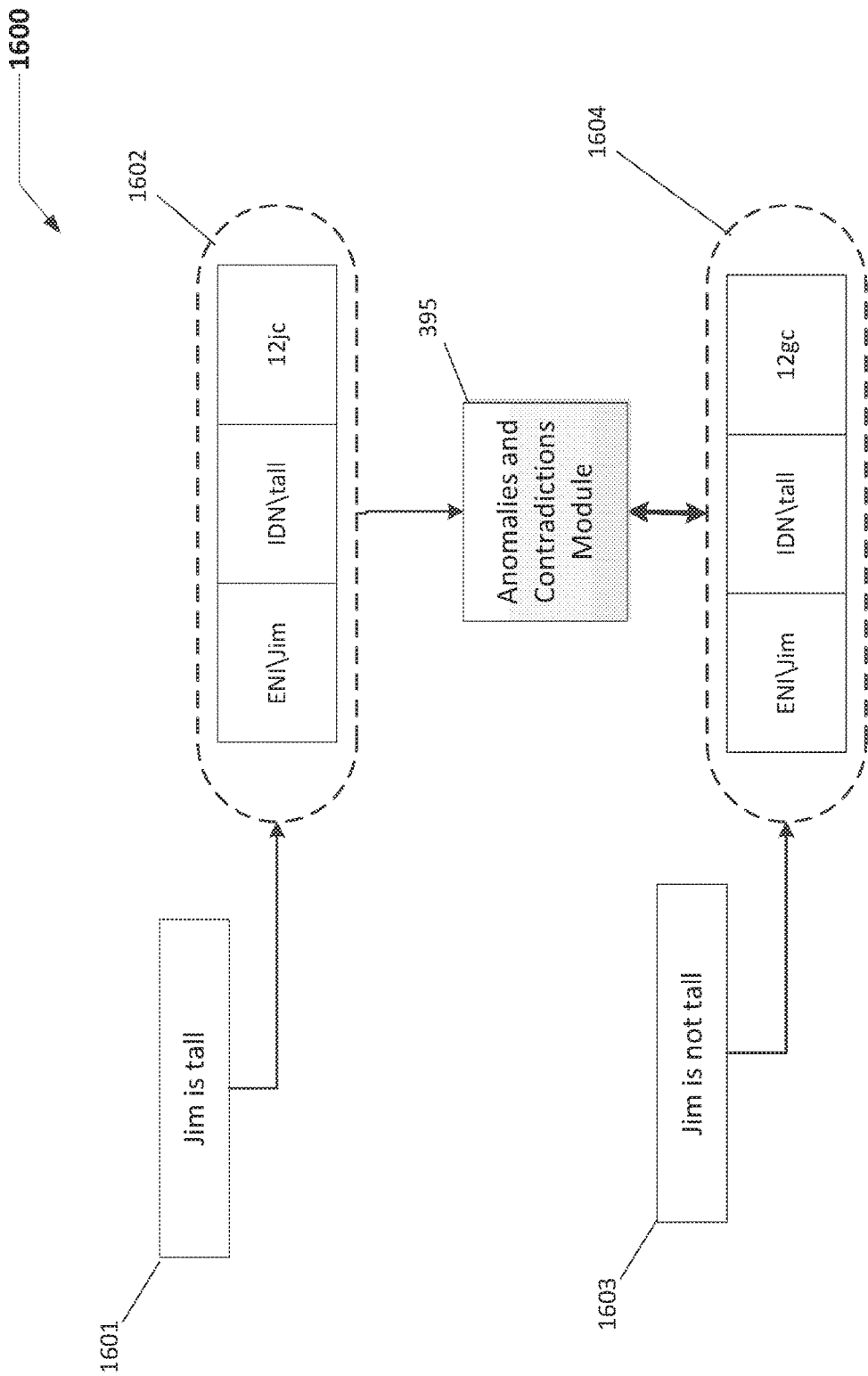
FIG. 16A is an exemplary schematic of sentences negating or contradicting each other in accordance with the example of FIG. 1.

In FIG. 16A an exemplary schematic 1600 of sentences negating each other, their corresponding CETs and the identification of a contradiction in accordance with an example implementation from FIG. 1 is shown. The First Sentence 1601 or "Jim is tall" results in the First CET 1602 which is comprised of Jim's Entigen or "ENI\Jim" (a Singulatum) and the IDN of tall or "IDN\tall" in a CET type 12jc; wherein the character "c", in this example, is used to describe CETs that are certain or that can be used without assumptions. The Second Sentence 1603 or "Jim is not tall" is a negation of the First Sentence 1601. Accordingly, the Second Sentence 1603 forms the Second CET 1604 which comprises "ENI\Jim" (Jim's Entigen) and "IDN\tall" (tall's Entigen) type "12gc"; wherein character "c" describes certainty. Significantly, due to the consistency of Entigens, when a 12jc and 12gc type CETs interact, they will contradict each other, if and only if, both CETs (1602 and 1604) share the same Entigens and/or IDNs which they do (ENI\Jim and IDN\tall). Like this, the IEB-DCE System 100 via the Anomalies and Contradictions Module 395 (AC for short) is able to identify the contradiction between both sentences (1601 and 1603) to optionally implement corrective actions.

Figure 16B:
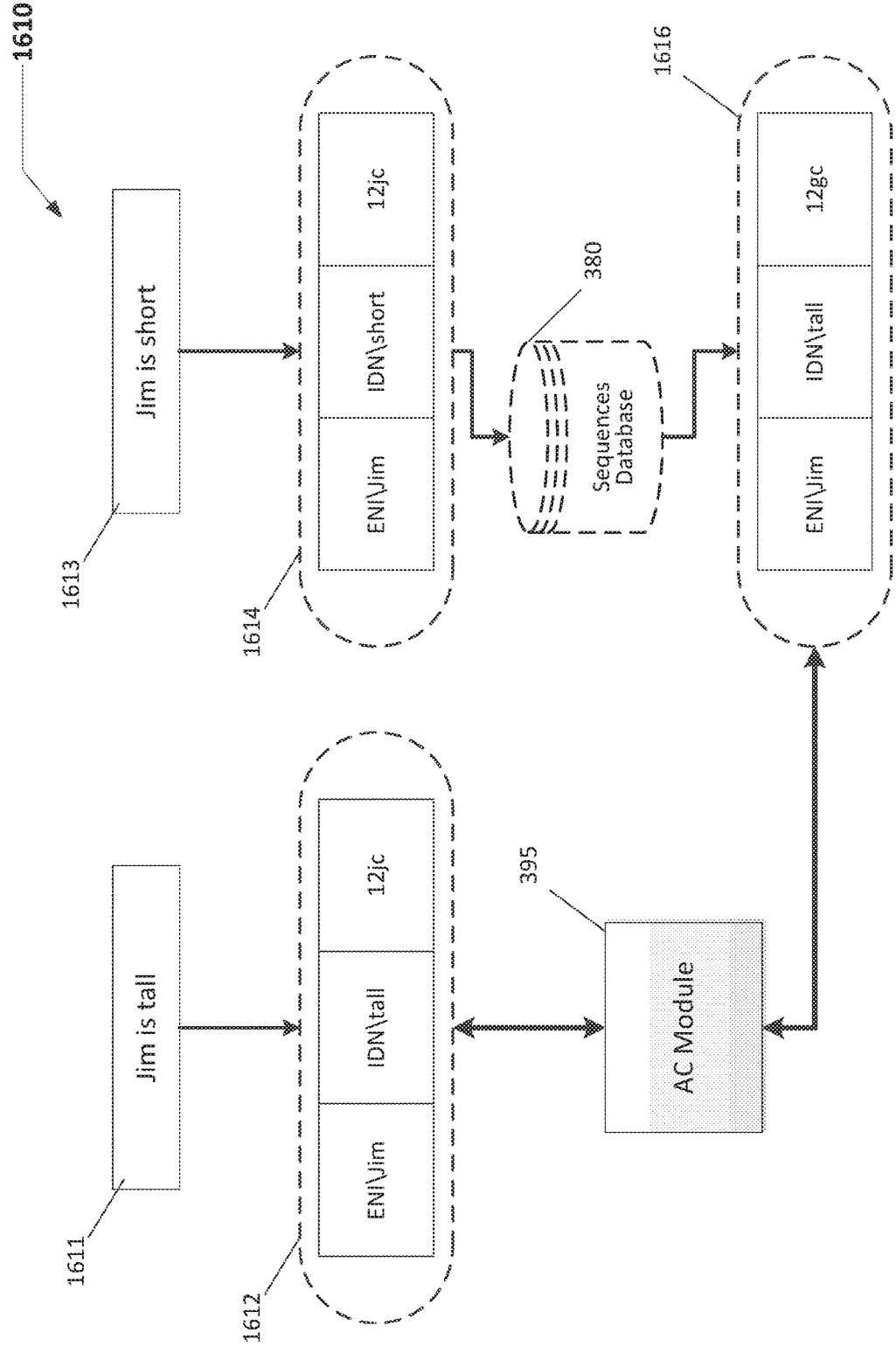
FIG. 16B is an exemplary schematic of sentences comprising antonyms which form a contradiction in accordance with the example of FIG. 1.

In FIG. 16B an exemplary schematic 1610 of several sentences, antonyms and their corresponding CETs which formed a contradiction in accordance with an example implementation from FIG. 1 is shown. The processing of the First Sentence 1611 or "Jim is tall" forms the First ENCET 1612 type 12jc; wherein the character "c", in this example is used to describe information which is certain and thus needs no assumption if used in further processes. In similar fashion, the Second Sentence 1613 or "Jim is short" forms its corresponding ENCET 1614 type 12jc as well. However, the Sequences database 380 comprises antonym information which in this example is applied to the matching Second ENCET 1614, thus resulting in the additional Antonym CET 1616. Next, the AC Module 395 compares CET 1612 with the Antonym CET 1616 and identifies a contradiction, because a 12jc and 12gc contradict each other if they both share the same Entigen. As a result, the First Sentence 1611 and Second Sentence 1613 are contradictory thus resulting on optional procedures including warnings to alert users to resolve the antinomy.

Figure 16C:
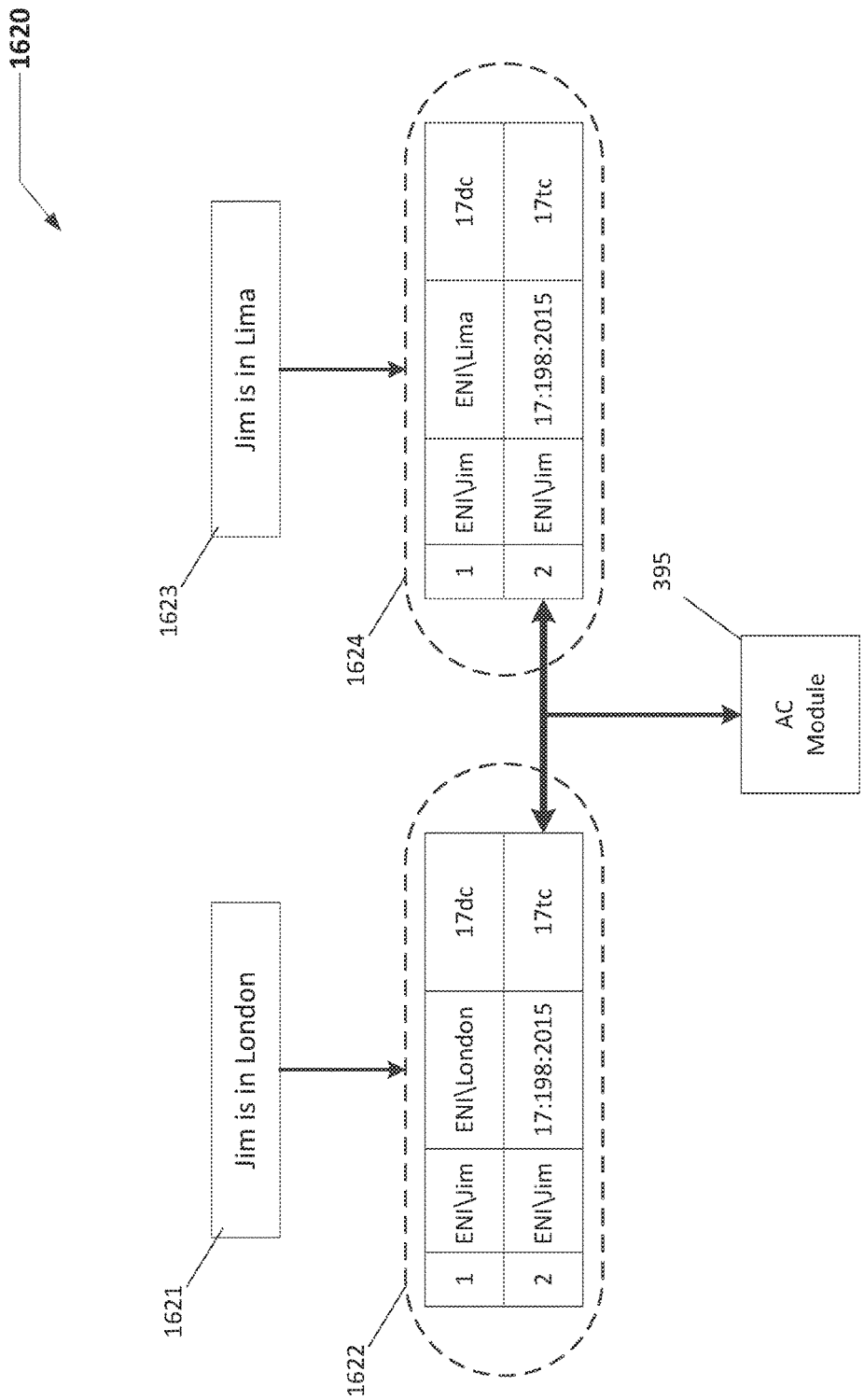
FIG. 16C is an exemplary schematic of several sentences and a contradiction based on time and space in accordance with an exemplary implementation from FIG. 1.

In FIG. 16C a schematic of several sentences, their CETs and a contradiction based on time and space in accordance to an exemplary implementation from FIG. 1 is shown. Because Entigens represent unique items and actions (and some types of attributes), then Entigens can only occupy a single place and/or a single unit of time. For example, an individual person named "Jim" is said to be walking in London (a place) at 5 PM (time) of a particular day; and then, if additional information says that "Jim" is also be walking in Lima (different place) also at 5 PM of the same day; then the word "Jim" can be identifying two different people (two Entigens). Even if the second time was one hour apart, then the possibility is that Jim would have to move from London to Lima (or vice versa) in less than one hour. If this was possible, can it be confirmed? Clearly, there are several methods, additional information, assumptions, probabilities, sequences, inferences, and others that could be used to identify the Entigen or Entigens that the word "Jim" is actually intending to describe. Returning to FIG. 16C, the First Sentence 1621 or "Jim is in London" results in its corresponding CETs 1622 wherein the first and second CETs put ENI\Jim at specific time (5 PM of the 198th day of 2015) on a specific place (city of London). The Second Sentence 1623 or "Jim is in Lima" results in its corresponding CETs 1624 wherein the first and second CETs also place Jim at the same time (5 PM of the $198^{th}$ day of 2015) but in a different place which is thousands of miles away (Lima the capital of Peru). Because the CETs types are the same, the AC Module 395 then identifies the similarity and detects the contradiction that Jim's Entigen is at the same time in two different locations far away, thus determining that two different Jim (two Entigens) are involved in the sentences (1621 and 1623).

Figure 16D:
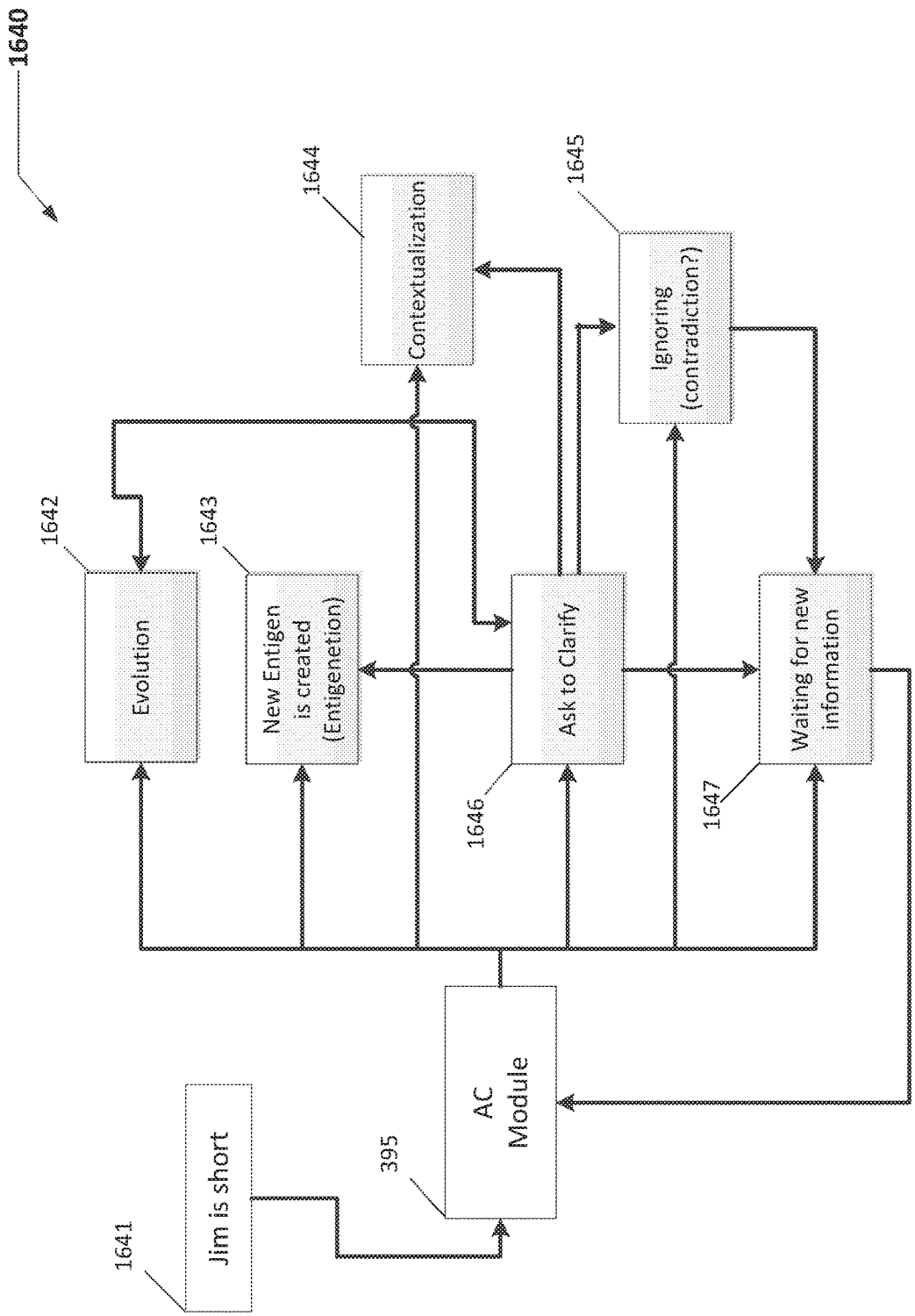
FIG. 16D is an exemplary flow chart of contradictions and potential solutions in accordance with the example of FIG. 1.

In FIG. 16D an exemplary flow chart 1640 for handling contradictions and possible solutions to solve such contradictions in accordance to an exemplary implementation of FIG. 1 is shown. The sentence 1641 or "Jim is short" which was exemplified in FIG. 16B has created a contradiction which was identified by the AC Module 395. As a result, this contradiction can be potentially resolved using one or several "contradiction resolving operations" or "CR operations" for short. The first CR operation is Evolution 1642 which involves using the progress of time as a means for identifying change and thus the reason why there is no contradiction. For example, as people age, their height is reduced to the point that they become short. In this fashion the statement "Jim is short" 50 years later after his $40^{th}$ birthday (Jim is now 90 years old) is likely not a contradiction but an update of Jim's height that may need to be verified. The Second CR operation is Entigenetion 1643 which involves forming a new Entigen to which the contradiction is assigned to, thus eliminating the contradiction. For example, if Jim is tall; but Jim is short is processed, then the contradiction (Jim is short) can be assigned to a new Entigen, meaning that Jim is now a Pluratum that identifies a new individual, thus shifting "Jim is short" from being a contradiction to being a sentence identifying a new Entigen. The second CR operation or Contextualization 1644 involves the process of annotation the contradiction as point of view (i.e., a comment) of the Entigen. For example, if a first Entigen mentions that "Jim is tall" and a second (different) Entigen mentions that "Jim is short", then "tall" and "short" are comments of the first and the second Entigens, and therefore they can coexist without contradicting each other. Noteworthy, important additional information such as time could be used to describe the evolution of Jim's height (Jim was tall, now he is short). The third CR operation is "Waiting for New Information" 1647 which involves waiting for more information to resolve the contradiction. For example, an identified contradiction remains unused until more information arrives which may help resolve if the contradiction occurs because of the need for a new Entigen or is simply contextualization. In essence, "Waiting for new information" is not a full solution but rather a temporary stage. The fourth CR operation is "Ask to Clarify" 1646 which involves the procedures of asking an external input for additional information that could help resolve the contradiction. For example, the contradiction "Jim is short" could be resolved easily simply by asking a person if Jim is a new person. Notably, based on the received external input, the contradiction could then be sent to any other contradiction resolving operation, including restarting the CR operations. For example, if the external input (i.e., a person) says that he doesn't know or cannot verify if this is a new Jim or the sentence is a contradiction, then the contradiction can then be recycled via the "Waiting for New Information" 1647 where the IEB-DCE System 100 waits for different external input. The fifth CR operation is Ignoring 1645 which involves ignoring the information because it is possibly badly written, heard incorrectly, faulty, etc. Notably, this type of operation 1645 is not final for it tries to send the contradiction back into the cycle via operation 1647. Like this, only operations 1643 and 1644 offer a resolution while others intend to recycle the contradiction while hoping to gain additional information.

Figure 16E:
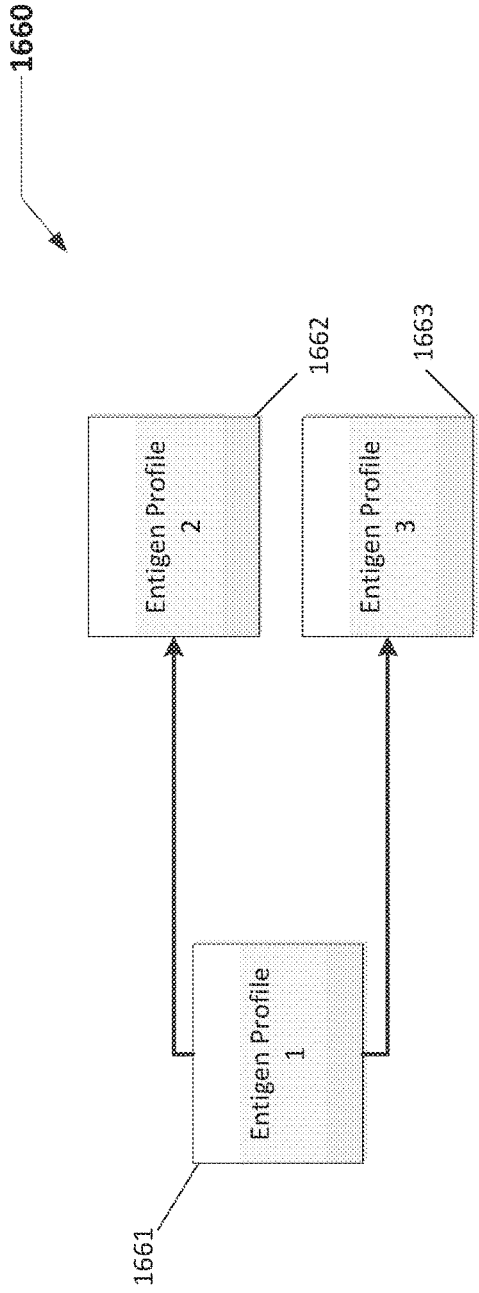
FIGS. 16E-F are flow charts of Entigen Profile operations in accordance with the example of FIG. 1.
Figure 16F:
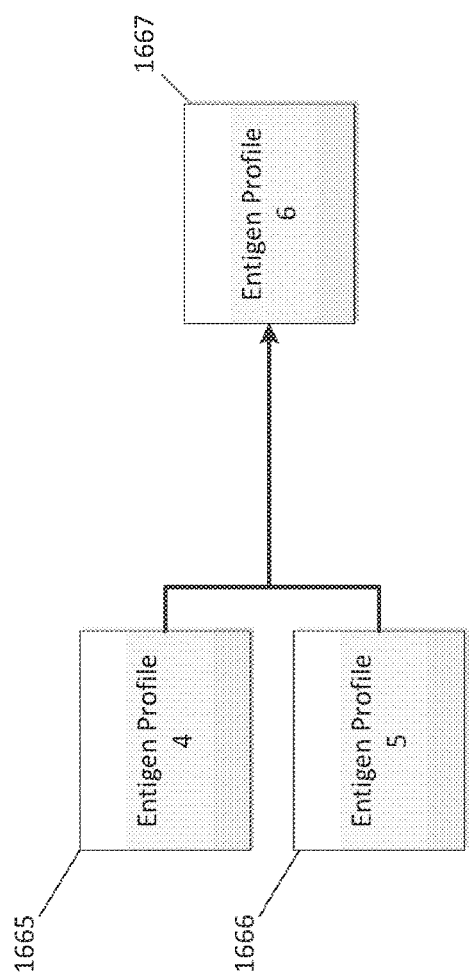

In FIGS. 16E and 16F, flow charts of two Entigen Profile operations in accordance to exemplary application shown in FIG. 1 are depicted. In FIG. 16E the Entigen Profile operation, herein named "Profile Disjunction", is shown which employs a Profile 1661 (or portions thereof) whose information (CETs) are divided into several Entigen Profiles and corresponding new Entigens. For example, if two different identities were mistakenly assigned to the same Entigen, then several types of contradictions will occur and/or continue occurring that affect the Entigen or its Profile. Accordingly, the original Entigen Profile 1661 may be divided thus forming at least two different Entigen Profiles, such as the Second 1662 and Third 1663 Entigen Profiles, thus resolving future contradictions. In FIG. 16F a different Entigen Profile operation, herein named "Profile Junction" is shown which employs several Profiles (or portions thereof) to be joined and thus create (or keep) a single Profile. For example, if two or more Entigens were mistakenly generated to represent a single identity or Entigen, not only one of the Entigens (and its profile) will be false, but more importantly, this false Entigen would be constantly competing with the real one (and its profile). As a result, the competition between Entigen Profiles such as the Fourth 1665 and the Fifth 1666 leads to the identification of false Entigen which may be resolved by fusing, combining or replacing the corresponding Entigen Profiles into a single Entigen Profile 1667 and its Entigen. Like this, the IEB-DCE System 100 can detect when an Entigen Profile may falsely belong to several Entigens or when multiple Profiles may actually belong to a single Entigen.

Figures 17A, 17B:
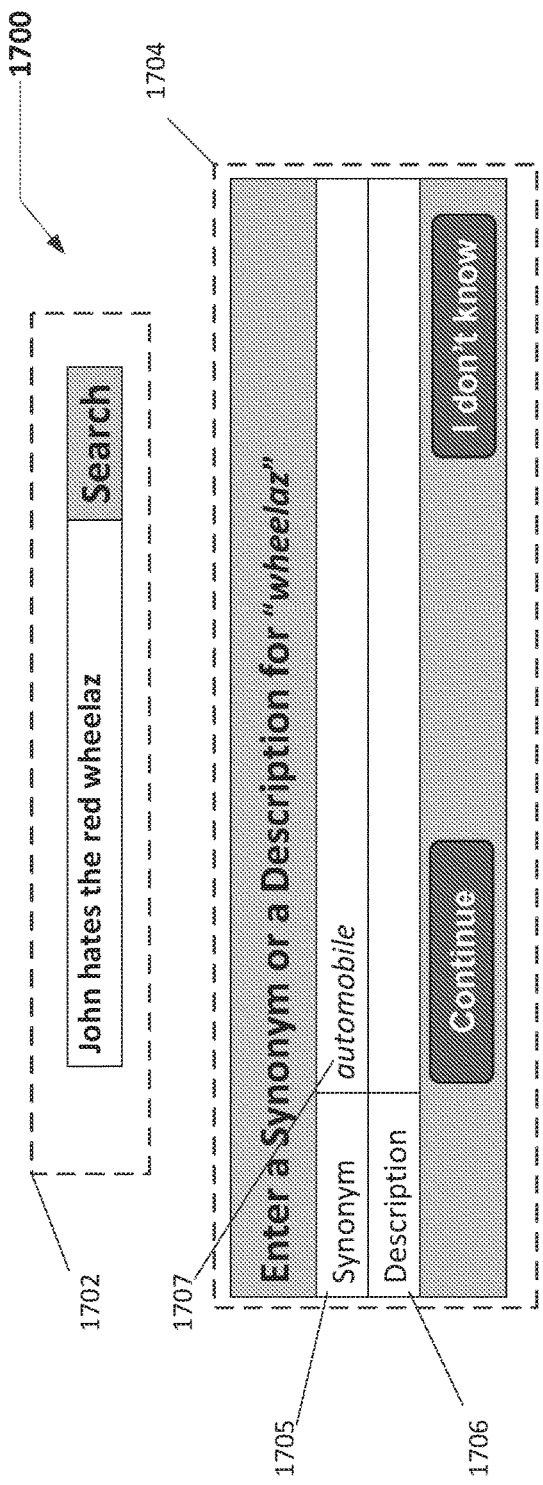
FIG. 17A is an exemplary illustration of processing a query that comprises an unknown word and a user entry in accordance with the example of FIG. 1.
FIG. 17B is an exemplary illustration of new Synonyms to be approved in accordance with the example of FIG. 1.

Turning to FIGS. 17A and 17B, illustrations of examples of discovering and/or learning New Words through Synonyms in a query are depicted in accordance with the example implementation shown in FIG. 1. In FIG. 17A, the Query 1702 or "John hates the red wheelaz" contains the word "wheelaz" which is new because it is not present in the Descriptive Index Dictionary (160, FIG. 1). As a result, the exemplary Enter a Synonym or Description GUI 1704 prompts a user to enter a Synonym 1705 or enter a Description 1706 of the unknown new word "wheelaz." In this example, the user responds by typing a Synonym 1707 or "automobile".

Accordingly, the IEB-DCE System 100 then processes the Query 1702 using the IDN of automobile to find results and thus satisfy the user's query. Additionally, the new word "wheelaz" has been recorded as a synonym of automobile and is waiting to be approved by another external input (i.e., authorized person) or other type of input or assumption process. In FIG. 17B, the "Synonyms to Approve" 1708 table contains the new word "wheelaz" 1709 in the last row. It also displays the Synonym that was used by the user under the Synonym column and the new IDN 000050.060 that "wheelaz" is to be assigned in the Descriptive Index Dictionary 160, FIG. 1 by the IEB-DCE System 100. In addition, the AIA or "ite.1" that the IDN Generator 393, FIG. 1 generated for "wheelaz" is displayed which is an Itenym in accordance to the received external input 397, FIG. 1. In this fashion, when the word "wheelaz" is approved, it would be incorporated into the Descriptive Index Dictionary 160, FIG. 1 so that it may be used directly in future implementations of the IEB-DCE System.

In FIG. 17C an exemplary illustration 1750 of a portion of the Descriptive Index Dictionary 160, FIG. 1 comprising the addition of a new synonym is depicted in accordance to the example implementation shown in FIG. 1 is depicted. The Word 1751 column comprises the words; the Language 1752 column comprises the character "1" meaning American English; the Country 1753 column depicts the character "1" meaning the United States; the IDN 1754 column depicts the IDN corresponding to each word; the AIA 1755 column depicts the type of word or its Identigen; and the Description 1756 column illustrates the definition of each word or IDN. For example, in the second record, the word "automobile" which was annotated as a synonym of the new word "wheelaz" shown in FIG. 17A and FIG. 17B shows its corresponding IDN or "00050.001". In the fifth record, is the recently added new word "wheelaz" along with its newly created IDN or "000050.060". As illustrated, both, automobile and wheelaz, share the same IDN head (000050) but differs in the IDN decimal (0.001 and 060 respectively). Like this, ignoring the IDN's decimal portion makes "automobile" and "wheelaz" practically identical or capable of representing the same Entigen(s).

Figures 18A, 18B:
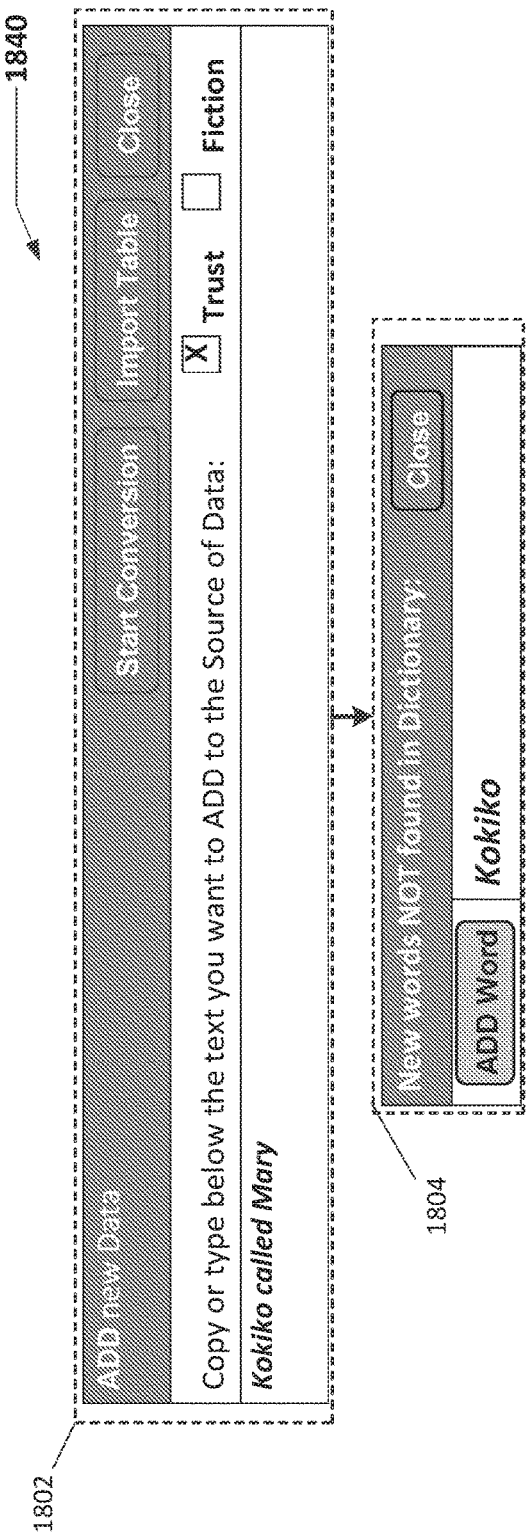

In FIGS. 18A-18C, several exemplary illustrations and GUIs of learning and discovering New Words upon the entry of new data in accordance with the example implementation shown in FIG. 1 are shown. When a new word is encountered, the IEB-DCE System (100, FIG. 1) can make several types of assumptions that may be of a logical nature to discover the AIA and possible meaning of the new word. In FIG. 18A the ADD new Data GUI 1802 displays a sentence with the word "Kokiko" which is considered to be an unrecognized or unknown new word (164, FIG. 1) because "Kokiko" is not present in the current Descriptive Index Dictionary (160, FIG. 1). Unlike the new word "wheelaz" which was discussed in the previous FIGS. 17A and 17B wherein a user enters a synonym for IEB-DCE System to process; in this exemplary method the IEB-DCE System tries to discover at least the AIA for "Kokiko" based on the CETLO Rules Module (220, FIG. 1) and other modules. Notably, although this example illustrates the handling of the new word from the entry of new documents this method can be used in the query or other points of information entry.

Returning to FIG. 18A, accordingly, the IEB-DCE System 100 launches the optional New words NOT found in Dictionary GUI 1804 which alerts the user of the new word "Kokiko". As a result, the IEB-DCE System assumes every possible type of AIA including Actenyms, Itenyms and Attrenyms of every kind, even functional words, thus enabling the IEB-DCE System the possibility of discovering which type of Descriptive Identifier (AIA) would work. For example, if the IDN Generator 393, FIG. 1 assigns "Kokiko" the AIA of Attrenym, and it successfully passes the modules of the IEB-DCE System, such as the CETLO Rules Module (220, FIG. 1) and the Pairing Module 240, FIG. 1, then "Kokiko" could be an Attrenym. Another example, if the IDN Generator 393, FIG. 1 tries an Itenym for "Kokiko" and it also passes the corresponding modules, then "Kokiko" could be an Itenym. In another example, if "Kokiko" is assumed an Actenym, thereby the sentence "Kokiko called Mary" will not pass the CETLO Rules Module 220, FIG. 1 or other procedures such as the Pairing Module 240, FIG. 1; which signifies that "Kokiko" is not an Actenym. Indeed, the English language does not support a sentence structure containing AIAs in this specific order: Actenym Actenym Itenym (action action item). Notably, optional procedures may be implemented in other exemplary implementations of the proposed approach for performing searches outside the system to find the meaning of "Kokiko" or reduce the number or assumptions. In the example of FIG. 18B, the IEB-DCE System 100 discovers several positive AIA matches for "Kokiko".

In FIG. 18B, the IEB-DCE System 100, FIG. 1 tried several descriptive identifiers (AIAs) and found that if "Kokiko" is assumed to be an Itenym or an Attrenym, then "Kokiko" passes the Pairing Module 240, FIG. 1, CETLO Rules Module 220, FIG. 1 and other procedures. As a result, in the context of the sentence "Kokiko called Mary", the word "Kokiko" can be a Attrenym of the action "called" or an Itenym doing the action "called". Indeed, English language supports both structures of: "Itenym Actenym Itenym" and "Attrenym Actenym Itenym" for a transitive action like "called". Accordingly, the Please Select a Meaning GUI 1805 is generated which gives an External Input 397, FIG. 1 such as a user the option to choose the appropriate word type for "Kokiko." Notably, in this example, the IEB-DCE-system asks for additional information because the IEB-DCE System also determined that "Kokiko" can be a Singulatum (identifies one Entigen) or a Pluratum (identifies many Entigens). For example, selecting the top first Option 1806 or "Kokiko describes a unique item (Singulatum)" makes Kokiko a Singulatum Itenym like Antarctica which points to one Entigen. Selecting the second Option 1807 or "Kokiko identifies one or more items (Pluratum)" makes "Kokiko" an Pluratum Itenym like country which points to many Entigens. Finally, selecting the last Option 1808 or "Kokiko is a characteristic of an action (Attrenym)" makes Kokiko a Attrenym which is capable of modifying actions. The Optional New Meaning 1809 button allows the user to override the possible AIA designations that the IEB-DCE System 100 discovered for Kokiko Notably, there are several GUIs and entry methods that allow a user to select the type word and many additional procedures available for checking, trusting or distrusting, the user's selection or entry (i.e., the user's entry generated a contradiction). In other implementations of the present proposed approach, identifying the descriptive makeup of a new word may be a preliminary process such as searching the Internet or other outside sources for a meaning or usage of the new word. Notably, combining the procedures disclosed in FIGS. 17A, 17B, 17C, 18A and the present 18B improves the chances for an autonomous or semi-autonomous system to find the correct meaning for new words in the event that the new word is itself a polysemous word (a word with several different grammatical identifications or meanings). Notably, if the new word "Kokiko" would have only generated a single successful AIA, the IEB-DCE System 100 can simply create a corresponding Identigen and possible Entigen or started a verification protocol to verify the generated AIA.

Turning to FIG. 18C, an exemplary GUI 1840 displaying recently created words on the Descriptive Index Dictionary 160, FIG. 1 in accordance with the present invention shown in FIG. 1 is depicted. As illustrated, the GUI 1840 comprises several columns such as the Number 1842 column displays the record number; the Word 1843 column displays the recently added words; the Language 1844 column displays a character describing the type of language; the Country 1845 column displays another character describing the country of the word; the IDN column 1846 displays the corresponding and recently create word's Identigen; the AIA column 1847 depicts the word's corresponding AIA; the Description column 1848 depicts the word's AIA description as well as a designation whether the word is a Singulatum or a Pluratum; and finally the ENI column 1849 displays the word's Entigen. In this fashion, record number "34" shows the word "Kokiko", next is Kokiko's language identifier or "1" which is this example means English, its country's identifier or "1" which in this example means USA, Kokiko's Identigen or "999478.000", Kokiko's AIA or "ite.1" meaning an Itenym and Singulatum, Kokiko's description or "A new Itenym (Singulatum)" and finally Kokiko's intended only Entigen or "e47389". Another example is the next record number "35" which is the word "pato" (duck in Spanish) which language identifier is "2" meaning Spanish, which country identifier is "2" meaning Costa Rica, pato's corresponding Identigen or "116937.000", pato's AIA or "ite.2", its description or "A new Itenym (Pluratum)" and "n/a" meaning that no Entigen has being assigned to "pato".

Figure 19A:
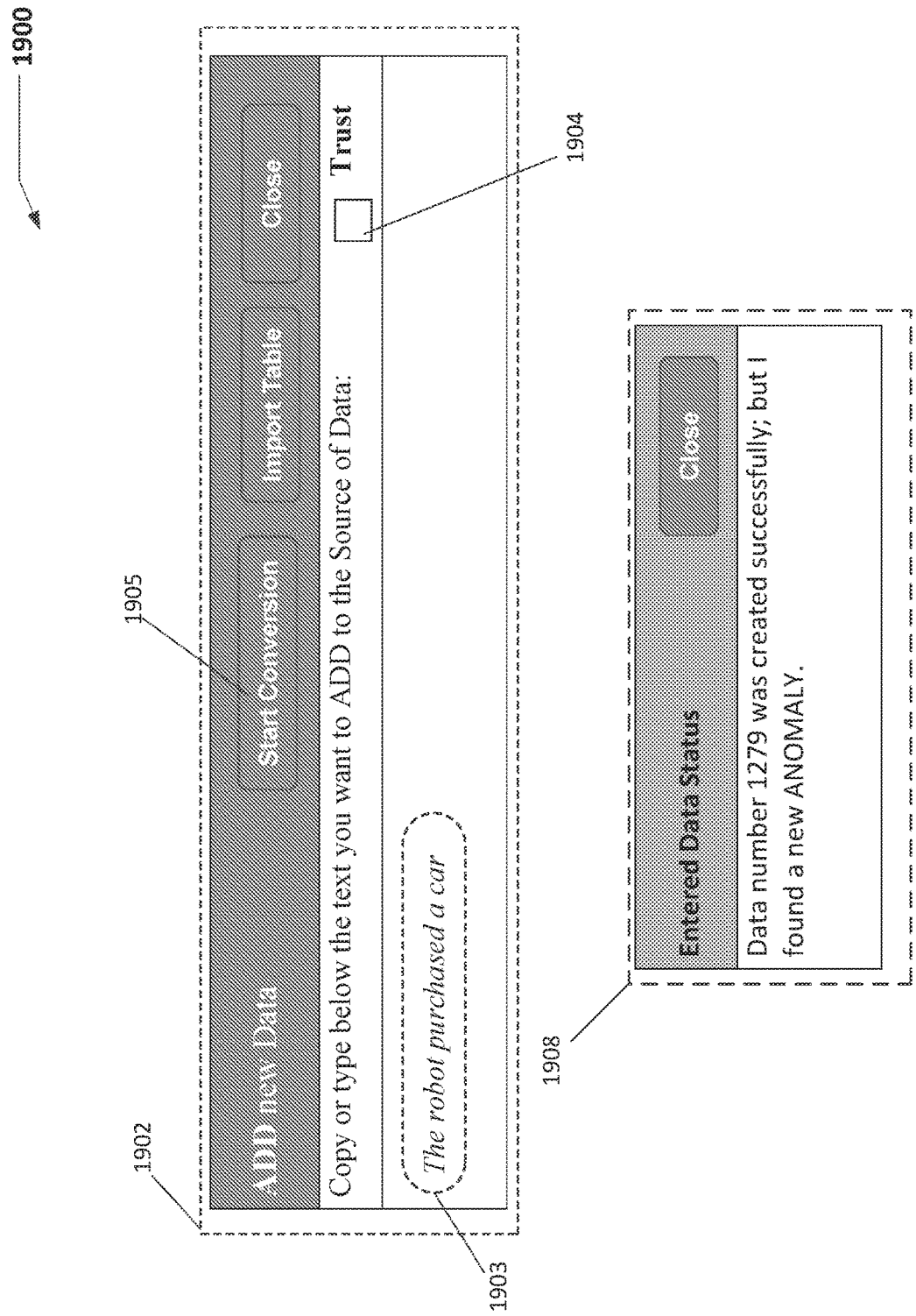
FIG. 19A is an illustration that depicts the identification of Anomalies in accordance with the example of FIG. 1.

In FIG. 19A, an illustration 1900 of a couple of GUIs for identifying Anomalies in accordance with an example implementation shown in FIG. 1 is depicted. An Anomaly is referred herein as data that is not normal to an Entigen or IDN. As a result, detecting an anomaly first starts by detecting whether the data is new (not normal yet), while at the same time, identifying whether this new data is indeed normal or not (abnormal). For example, "the cat texted Lisa" is anomalous to the average English speaker because "texting" is an operation that is exclusive to humans, not animals. Returning to FIG. 19A, when the Sentence 1903 or "the robot purchased a car" is annotated in the ADD new Data GUI 1902, the user "unchecks" the Trust Option 1904 so the data being entered can be analyzed for anomalies. Once the Start Conversion Button 1905 is selected, the CETs corresponding to the Sentence 1903 are formed and the IEB-DCE System 100 determines that these CETs are new. In this example the Sentence 1903 formed CETs that were not found in any of the databases of the IEB-DCE System, such as the Tallied Indexed CETs Database (310, FIG. 1), the Entigen Database 398, FIG. 1 or any other database including inferences, contradictions, anomalies or other CETs. As a result, the Entered Data Status GUI 1908 displays the message "Data number 1279 was created successfully; but I found a new ANOMALY" that informs a user that the entry of the Sentence 1903 was successful; but that this sentence also generated a "New Anomaly" within the IEB-DCE System 100. Essentially, the IEB-DCE System 100 is warning a user that the recently entered sentence introduces new knowledge, and if this new knowledge (CETs) is normal or not. In this fashion, the IEB-DCE System begins learning what is normal and what is not (similar to a human child who learns by asking). In other words, the IEB-DCE System 100 is forming an understanding of the world based on the data it processes or ingests. Noteworthy, the entering of new data can also be achieved via an "uploading folder" where users simply upload the data to be processed, which the IEB-DCE System 100 opens and processes without any further user or exterior input 393, FIG. 1 required.

Figure 19B:
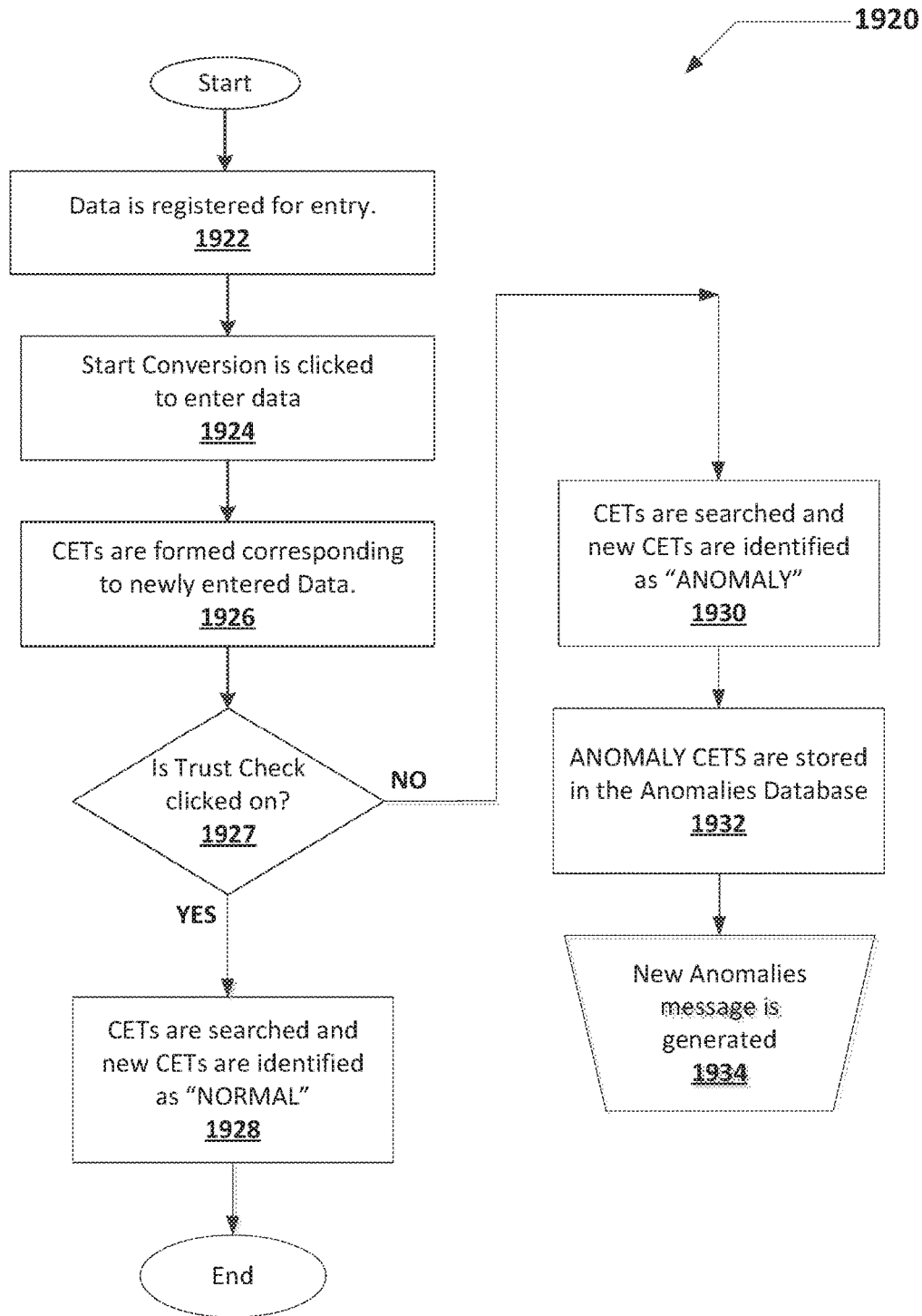
FIG. 19B is an exemplary flow chart for identifying whether new entered data comprises anomalies in accordance with the example of FIG. 1.

Turning to FIG. 19B, a flowchart of exemplary steps involved in identifying whether entered data comprises anomalies is depicted in accordance with the example implementation shown in FIG. 1. The data to be processed is registered with the IEB-DCE system 100, FIG. 1 in step 1922. The conversion of the data is started in step 1924. CETs are formed corresponding to newly entered data 1926. If the "Trust Check" is on (enabled) in step 1927, then the CETs are searched and new CETs are identified as "NORMAL" in step 1928 and no anomalies found. If the "Trust Check" is off (disabled) in step 1927, the formed CETs are searched in the different available databases and new CETs are identified as "ANOMALY" in step 1930. Next, ANOMALY CETs are stored in the Anomalies Database 390 of FIG. 1 in step 1932. A new Anomalies message is then generated in step 1934 and displayed to a user.

In FIGS. 19C and 19D, schematic 1950 of two exemplary GUIs for verifying or selecting the type of Anomalies reviewing the status of the selected anomaly in accordance with an example implementation of FIG. 1 are depicted. In FIG. Turning to FIG. 19C, the Select Anomaly Type GUI 1951 depicts a sentence or "The robot purchased a car" (under the Anomaly column) that the IEB-DCE 100 found to be anomalous, along with its page number or "1228" which the IEB-DCE System 100 assigned for further identification. In addition, there are several buttons or options for selecting the type of anomaly this is. For example, clicking the "Once" 1952 button identifies the anomaly as a single event or that its occurrence happened only once; clicking the "Trusted" 1953 button identifies the anomaly as being normal information (i.e., dogs bark); clicking the "Fiction" 1954 button identifies the anomaly as fictitious and therefore allowable in the context of its nature (i.e., the ugly duckling cried); clicking the "Untrusted" 1955 button identifies the anomaly as being a true anomaly, meaning that other procedures or protocols may follow to handle or resolve such true anomaly; and clicking the "Auto" 1956 button gives the responsibility of selecting the type of anomaly to the IEB-DCE System 100. In FIG. 19D an Anomaly Status GUI 1957 displays the selections that were made for three exemplary anomalies. For example, the first record or "the robot purchased a car" which was originated when a document or Page Number "1228" was identified as fictitious as depicted by character "1" under the Fiction 1962 column. The second record or "Tom lives in Arizona" was identified as trustworthy as exemplified by character "1" on the Trusted 1961 column. Finally, the third record or "fufu kissed Lisa" is also fictitious as described by character "1" on the Fiction 192 column.

Figure 19E:
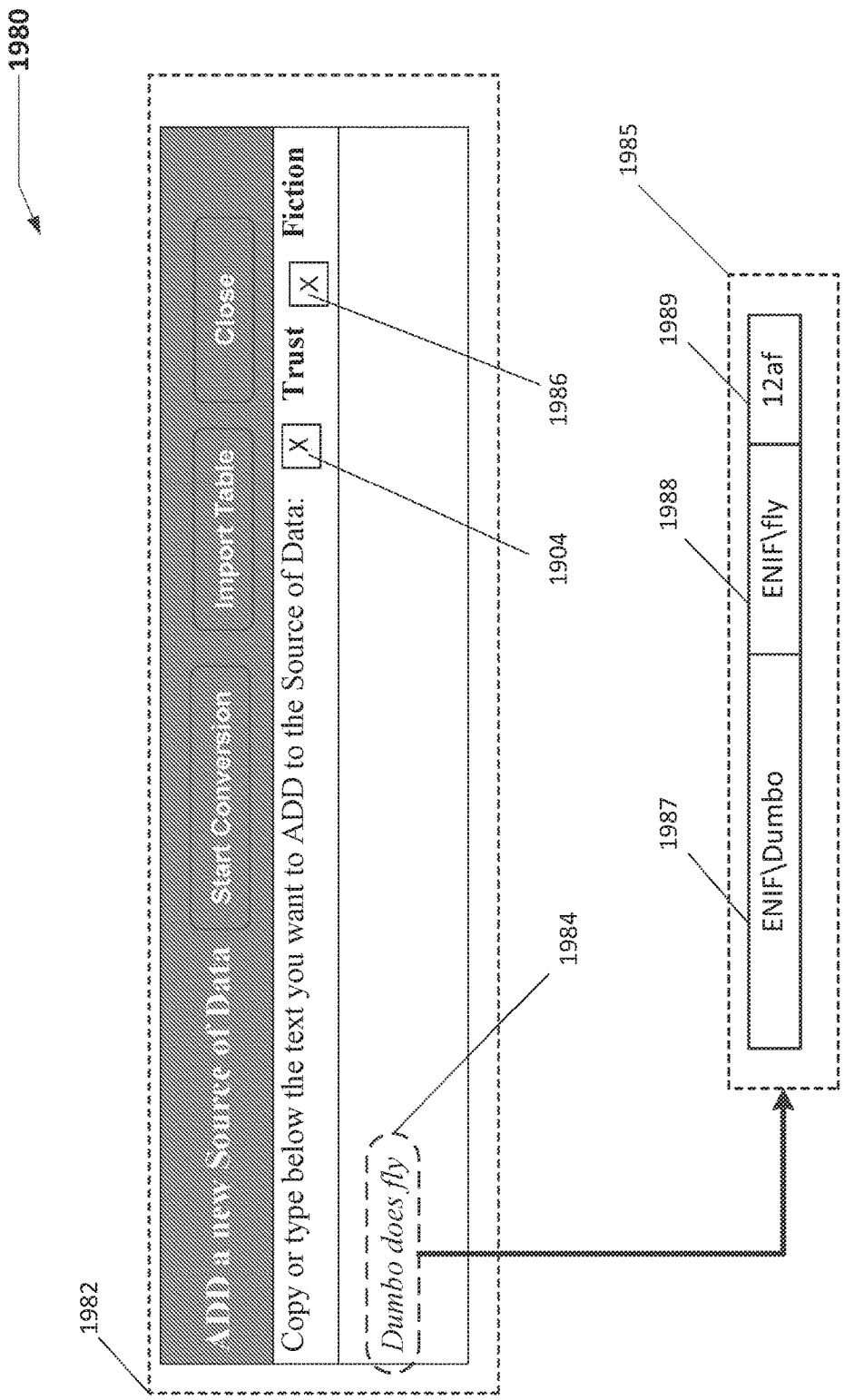
FIG. 19E is an exemplary illustration for entering fictitious information in accordance with the example of FIG. 1.
Figure 19F:
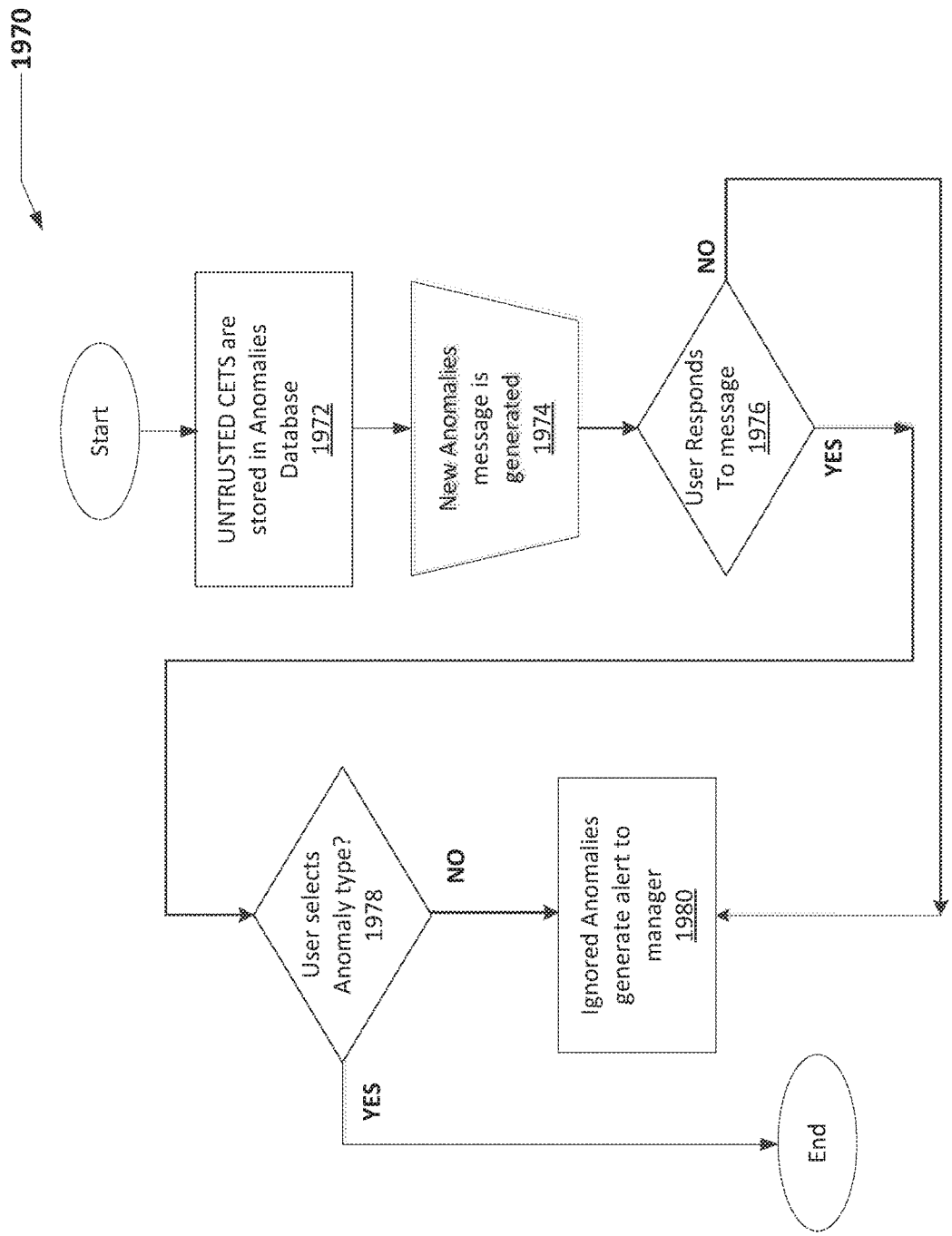
FIG. 19F is an exemplary block diagram for a user for entering the type anomalies in accordance with the example of FIG. 1.

In FIG. 19E, an illustration 1980 of an exemplary GUI for entering a document that comprises a fictitious character and its Entigen (an Entigen of a fictitious action, item or attribute) in accordance with the example implementation of FIG. 1 is depicted. Because every action, item, even attribute can have its unique Entigen, the IEB-DCE System 100 is freed from the limitations and inevitable contradictions of categories. As a result, any fictitious character, like those found in children's books, not only may have its own Entigen, but what this Entigen experiences and what constitutes "being normal" for this Entigen, it may only belong to this Entigen and no one else. Like this, the Entigen of fictitious characters, introduced herein as fictitious Entigen, may have its own normality and thereby abnormality without ever affecting or modifying the integrity of other Entigens, IDNs or words within the system. For example, in the children's book "Dumbo", the elephants of the story can talk, laugh, criticize, and do other things that normal elephants simply can't do. As a matter of fact, the fictitious elephants in the book can't fly except for Dumbo. Therefore, the elephants of the book experience a different fictional normality that Dumbo does; and all these fictional "normalities" can be properly and consistently addressed only through their corresponding fictitious Entigen. Accordingly, combining the Trust and the Fiction characteristics for new information, the IEB-DCE System 100 has the capacity for handling fictitious normality and abnormality.

Returning to FIG. 19E, The Add New Source of Data GUI 1982 depicts the Entry Sentence 1984 or "Dumbo does fly" which is to be processed by the IEB-DCE System 100. In addition, the "Trust" 1904 option is clicked on (it is activated) meaning that any new knowledge or CETs would be trusted or made normal or these CETs will not form anomalies. Moreover, the "Fiction" 1986 option is also clicked on (it is activated) meaning that the Entigens in the CETs are fictitious and thereby form their own normality (Trust option is activated) with the other Entigens or the things they experience. This is important, because any future data that talks about "Dumbo" with the "Trust" 1904 option not activated (not clicked) would allow the IEB-DCE System 100 to potentially identify an anomaly or contradiction that could happen to "Dumbo" or other entities (their Entigens) of the book. As a result, when the Entry Sentence 1904 is processed, the IEB-DCE System 100 forms the ENCET 1985 which comprises the first fictitious Entigen 1987 or "ENIF\Dumbo", the second fictitious Entigen 1988 or "ENIF\fly", wherein both Entigens make an ENCET type "12af." Notably, to differentiate a realistic Entigen (Entigens that represent real things) from a fictitious Entigen, this example makes use of the Character "F" at the end of "ENI" (ENIF). In addition, this ENCET also encompasses an Entigen for the action of flying to differentiate it from other flying events or Entigens. Additionally, in this example, the character "f" is added at the end of the type of the ENCET (12af) to differentiate from other CETs and to identify that this ENCET comprises fictional knowledge. Notably, fictional CETs could still experience inferences, sequences and other operations of real CETs and their Entigens.

In FIG. 19D, a flowchart of the steps to respond to anomalies 1970 is depicted in accordance to the example implementation shown in FIG. 1 is depicted. Untrusted CETs are stored in the Anomalies Database 390, FIG. 1 in step 1972. A new anomalies message is generated in step 1974 and displayed to a user. The user responds to the message in step 1976 in order to resolve the anomaly. The user may respond in step 1976 by ignoring anomalies generated alert in step 1980 or selecting anomaly type in step 1978 to identify the meaning or type of the anomaly.

Figure 20A:
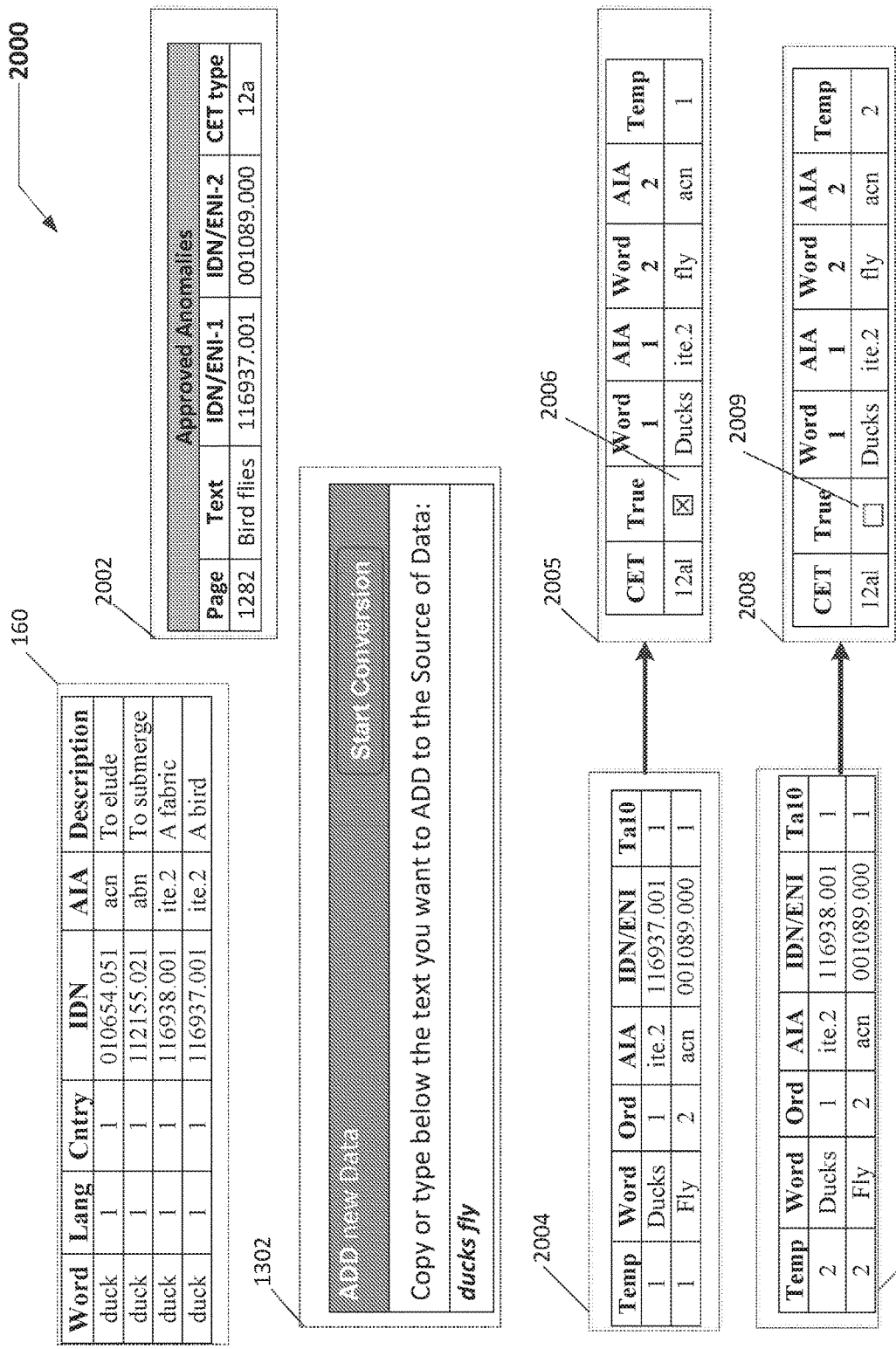
FIG. 20A is an exemplary illustration for disambiguating or selecting the meaning of words using anomalies in accordance with the example of FIG. 1.

In FIG. 20A, an illustration 2000 for disambiguating or selecting the meaning of words using anomalies in accordance with an exemplary implementation of FIG. 1 is shown. The Descriptive Index Dictionary 160 contains several meanings (several IDNs) for the word "duck" which include two Actenyms (eluding and submerging) and two Itenyms (fabric and bird). The Approved Anomalies GUI 2002 shows that the sentence "bird flies" and its corresponding approved IDCET which contains the IDN of the bird or "116937.001" and the IDN of flies or "001089.000." Because this IDCET was approved, it will not be considered anomalous if it repeats in the future (it is a normal CET). In the ADD new Data GUI 1302 is the sentence "ducks fly"; so when it is processed, several permutations involving each of the different IDNs or Entigens are created. In the current example, only two permutations are shown such as the First Meaning Permutation 2004 which contains the IDN of a bird, and the Second Meaning Permutation 2005 which involves the IDN of fabric. The other permutations where "duck" identifies two possible actions were not included because they do not pass the CETLO Rules Module 220, FIG. 1, the Pairing Module 240, FIG. 1 or others.

Returning to FIG. 20A, the First Meaning Permutation 2004 creates the First CET 2005 which displays in its True 2006 column the character "X", meaning that this CET was found as depicted in the Approved Anomalies 2002 to be true, meaning that it is a normal CET. However, the Second Meaning Permutation 2007 created the Second CET 2008 which doesn't display any characters in its "True" 2009 column, meaning that this CET, comprising the IDN of the fabric creates an anomaly because it cannot be found as depicted by the Approved Anomalies 2002 (a fabric doesn't fly). As a result, when the first CET 2005 competes with the second CET 2008, the first CET 2005 is selected, because unlike the second CET 2008, it creates no anomalies. Like this, the IEB-DCE System 100 can disambiguate IDNs by making use of anomalies. Significantly, if several permutations using several meanings (IDNs) or Entigens don't create anomalies, then the IEB-DCE System 100 may select the correct answer by asking a user. For example, the sentence "Mary is hot" requires more than anomalies to disambiguate because both meanings of "hot" (temperature and anger) can be grouped with "Mary" and both corresponding CETs occur without creating anomalies (Mary can be angry and Mary can be warm). Notably, normal CETs from other sentences could aid selecting which IDN or meaning of "hot" is correct in this example.

Figure 20B:
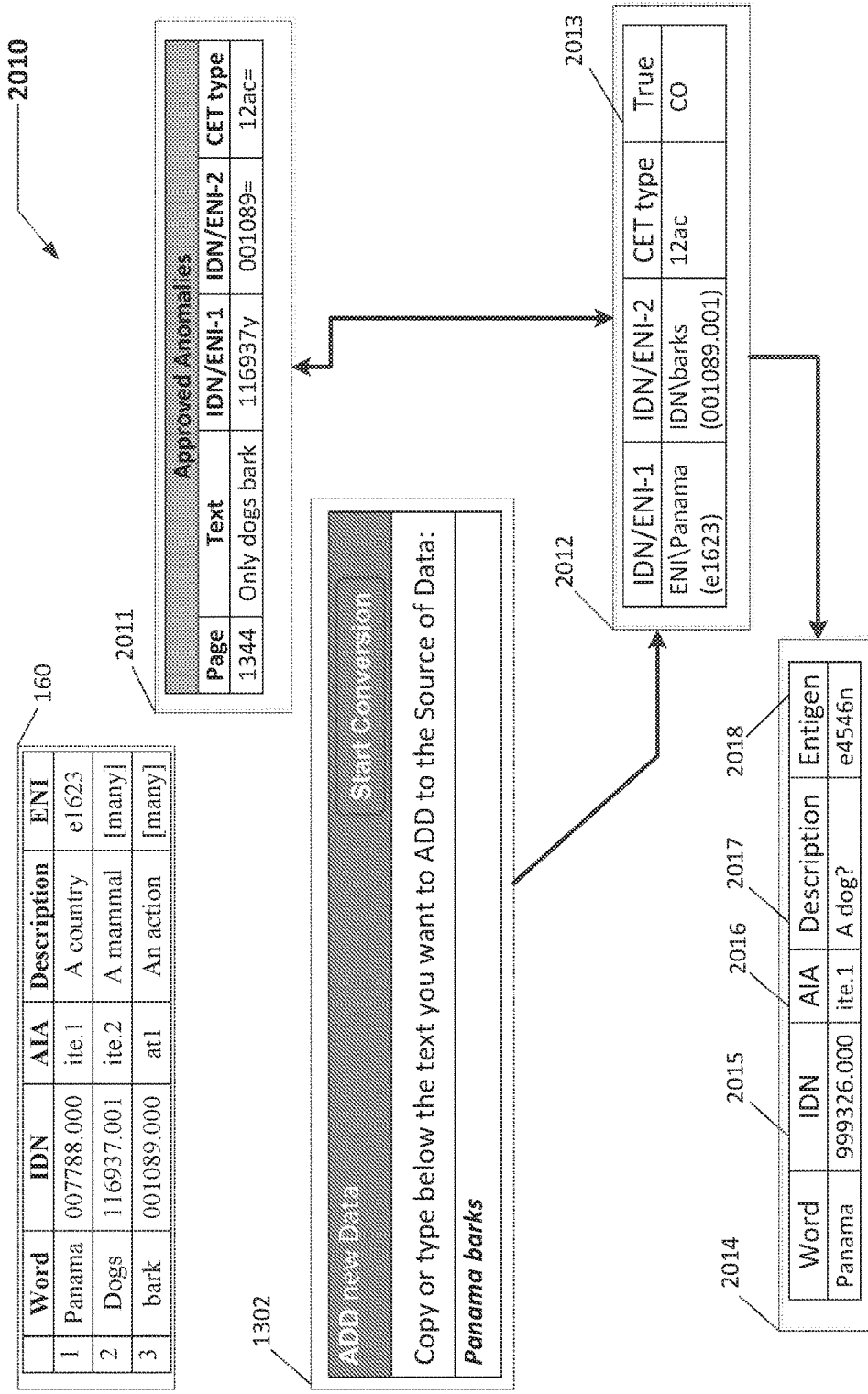
FIG. 20B is an illustration for forming a new Entigen and new IDN using approved anomalies (normal knowledge) and contradictions in accordance with the example of FIG. 1.

In FIG. 20B, an illustration 2010 for forming a new Entigen and new IDN using approved anomalies (normal knowledge) and contradictions in accordance with an exemplary implementation of FIG. 1 is shown. The Descriptive Index Dictionary 160 displays three words including the first record or "Panama" its IDN or "007788.000"; its AIA or "ite.1" (Singulatum); its description or "a country"; and its corresponding Entigen or "e1623". The second record is "dogs"; its IDN or "116937.001"; its AIA or "ite.2" (Pluratum) which is a mammal that identifies many Entigens or "[many]". The third record is "bark"; its IDN or "001089.000"; its AIA or "at1" (an action) which also identifies many Entigens. The Approved Anomalies GUI 2011 shows the sentence "only dogs bark" that was previously approved (normal) which resulted in what is herein referred as a "Template CET" that comprises the Identigens or "116937y" (head IDN\dogs) and "001089=" (head IDN\bark) of type "12ac=". Template CETs, as their name suggests, may be used as templates or presets for other CETs, meaning that the elements of other CETs need to relate the elements of the Template CET. In this fashion, any other CET that is also a type 12ac using the head of IDN\bark should involve another IDN capable of identifying an Entigen of a "dog" (because only dogs bark, then any other barking element must be a dog as well). Notably, the Template CET in this example uses the character "=" at the elements' end to illustrate which elements in the CET remain constant, and uses the character "y" at the element's end to illustrate which element needs to fulfill the condition, or as depicted in this example, of being dog (i.e. IDN\Collie, IDN\San Bernard, IDN\Mutt, and IDN\Fido are all Identigens of Entigens that can be identified by IDN\dogs).

Returning to FIG. 20B, the ADD new Data GUI 1302 displays the sentence "Panama barks", which, when processed by the IEB-DCE System 100 forms ENCET 2012 comprising Panama's Entigen or "ENI\Panama" (e1623) and "IDN\barks" (001089.001) type "12ac". Accordingly, when ENCET 2012 is compared to the Template CET 2011, it can be observed that the "CET types" in both CETs are equal (12ac), and their second IDNs or "001089"

(IDN\barks) are similar too. As a result, the Template CET requires that e1623 (ENI\Panama) be a dog or be identifiable by the head of IDN\dog (116937). However, in this example e1623 is only identifiable as a country (IDN\country), not by IDN\dog. Consequentially, the True column 2013 displays "CO" which means that a contradiction has occurred. As a result, the Entity Module (399, FIG. 1) and/or the IDN Generator (399, FIG. 1) of the IEB-DCE System 100 generates a New Record 2014 for "Panama" which contains its newly generated Identigen or "999326.000" (under the IDN 2015 column), its newly generated AIA or "ite.1" (under the AIA 2016 column), its newly generated Description "a dog?" (under the Description 2017 column), and its newly generated Entigen or "e4546n" (under the Entigen 2018 column). Notably, the Entigen displays the additional ending "n" which is used for identifying Entigens that were created by a contradiction and may need further verification. Notably, there are several protocols and conditions that may be utilized to enable or automate the creation of new Entigens or IDNs, including those procedures used for verification. For example, identifying whether a word, or its IDN, is a Singulatum or Pluratum in some implementations is achieved simply by searching if the IDN (or word) identifies one or several Entigens or finding out if the word has a plural form.

Figure 20C:
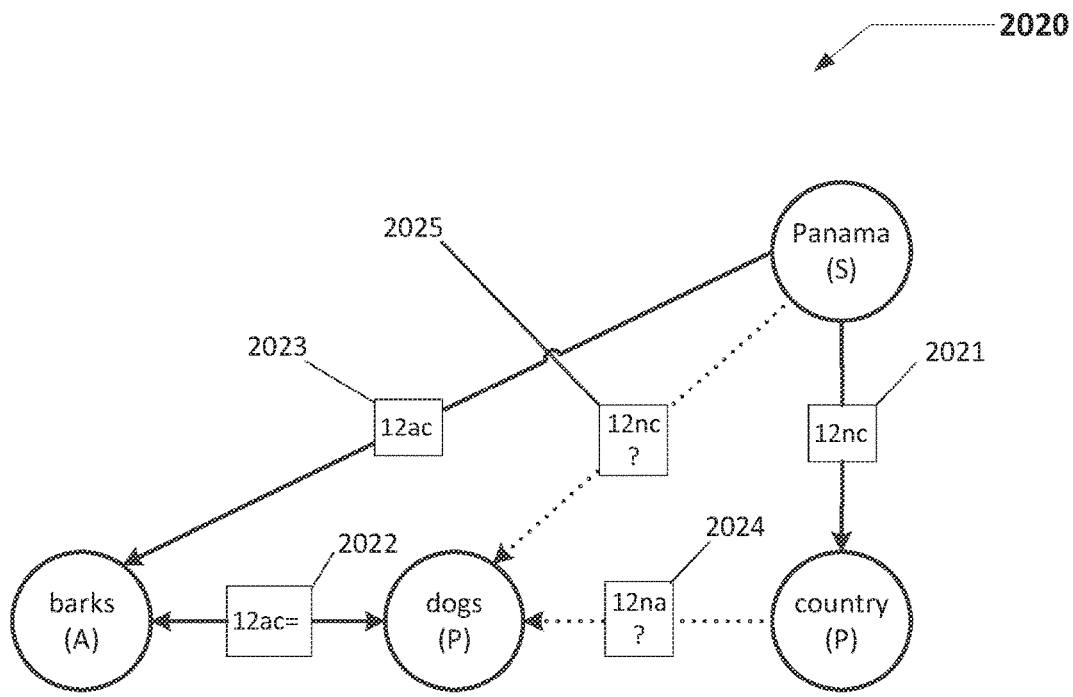
FIGS. 20C-D are exemplary schematic diagrams of a contradiction and the creation of a new Identigen, Entigen and CETs to resolve the contradiction in accordance with an example implementation of the proposed approach.
Figure 20D:
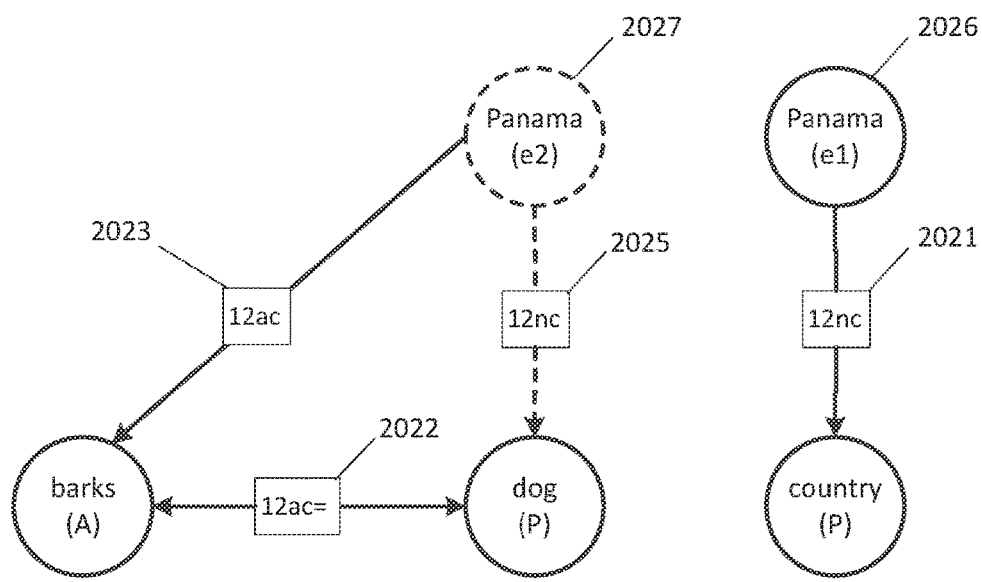

Turning to FIGS. 20C and 20D, schematic diagrams of a contradiction and the creation of a new Identigen, Entigen and/or CETs to resolve the contradiction shown in FIG. 20B in accordance with an example implementation of FIG. 1 are depicted. In order to simplify the disclosure of FIG. 20C and FIG. 20D, words instead of their corresponding IDNs or Entigens are being depicted. Also, like in the depiction of 15D, CETs are illustrated as the combination (grouping) of two circles, which represent different Descriptive Identifiers (Itenyms and Actenyms), and vectors or arrows to connect them. Additionally, different types of arrows are used to illustrate the different types of CETs.

In FIG. 20C, the first original statement or "Panama is a country" is illustrated as the combination of "Panama" (Singulatum or S), "Country" (Pluratum or P) and the First Original Vector 2021 (solid arrow) which is of type "12nc", meaning that "Panama" and "country" form a certain CET. The second original sentence or "only dogs bark" is illustrated as the combination of "dogs" (Pluratum or P), "bark" (Actenym or A) and the Second Original Vector 2022 (solid double-sided arrow) which is a type "12ac=", meaning that "dogs" and "bark" form a Template CET, meaning that this CET requires that any IDN or Entigen that forms a CET type 12a with the IDN of bark, must fulfill the condition of being identifiable by the IDN of dog (see FIG. 12B). Returning to FIG. 20C, the third original sentence or "Panama barks" is illustrated as the combination of "Panama", "bark" and the Third Original Vector 2023 (solid arrow) which is of type 12ac, meaning that is certain that the Entigen or Singulatum of Panama is "barking."

As a result, the First Conclusion Vector 2025 (dashed arrow) can be formed which linguistically speaking is comparable to "Panama is a dog" because of the second and third original sentences stated that "Panama barks" and "only dogs bark" (if only dogs bark and Panama barks, then Panama is a dog). In fact, the First Conclusion Vector 2025 is a certain CET type 12nc which together with another certain CET depicted by the First Original Vector 2021 may form another vector or the Second Conclusion Vector 2024 which linguistically speaking is comparable to "a country is a dog". However, if a country is a dog, (a place is an animal) it will lead the IEB-DCE System 100 to generate a number of inferences and corresponding contradictions to those inferences in regards to other CETs where countries and dogs are involved. In other words, what countries have and what countries do is fundamentally different from what dogs have and what dogs do. In fact, there are several types of CETs and their inferences which can be used to identify absolute inconsistencies like "a dog is a country", resulting in the fact that a dog could never be a country. In fact, the above shows that not even synonyms can't be "within" themselves, which would represent another anti-statement for the Russell paradox.

Returning to FIG. 20C, as a result, the second Conclusion 2024 is a contradiction, which leads to the possibility that the First Conclusion 2025 be a contradiction as well; but this is not allowed, because the First Conclusion Vector is a type "c" (12nc) meaning that it belongs to a certain CET. In summary, there is a CET that led to contradictions (2021) and another CET which as a type "c" is likely another contradiction (2025). As a result, the IEB-DCE System 100 will create a new entity (Entigenetion) to try to resolve the current inconsistencies formed in the next exemplary figure.

In FIG. 20D, the IEB-DCE System 100 has created a new Entigen which is also identifiable via the word "Panama". This means that "Panama" which once was a Singulatum (a word identifying a unique entity) has now become a Pluratum (a word capable of identifying two or more unique Entigens). As a result, a New Entigen 2027 or "(e2)" which is identifiable via the Pluratum "Panama" is formed, and the old Entigen 2026 or "(e1)" which was identifiable via the Pluratum "Panama" remains. Accordingly, the first original statement or "Panama is a country" is illustrated as the combination of "Panama" which identifies a first Entigen 2026, "Country" (Pluratum or P) and the First Original Vector 2021 (solid arrow) which continues to be a type 12nc, meaning that "Panama" 2026 (first Entigen e1) and "country" form a CET type certain. The second original sentence or "only dogs bark" continues to be illustrated as the combination of "dogs" (Pluratum), "bark" (Actenym) and the Second Original Vector 2022 (solid double-sided arrow) which is a type 12ac=, meaning that "dogs" and "bark" still continue to form a Template CET. However, the third original sentence, in this FIG. 20D, or "Panama barks" is now being illustrated as the combination of "Panama" 2027 (Entigen e2), "bark" (Actenym) and the Third Original Vector 2023 (solid arrow) which continues to be of type 12ac, meaning that it is certain that the newly introduce Entigen e2, which is also identifiable via the Pluratum Panama, is "barking". As a result, only one conclusion which is depicted by the New Inference Vector 2025 (dashed arrow) can be formed which linguistically speaking is comparable to "Panama is a dog" because of the second and third original sentences stated that "Panama" does bark; and "only dogs bark" (if only dogs bark and Panama barks, then Panama must be a dog). Accordingly, because the new Entigen e2 2027 was introduced, none of the possible certain inferences (type c) lead to contradictions.

Figure 21:
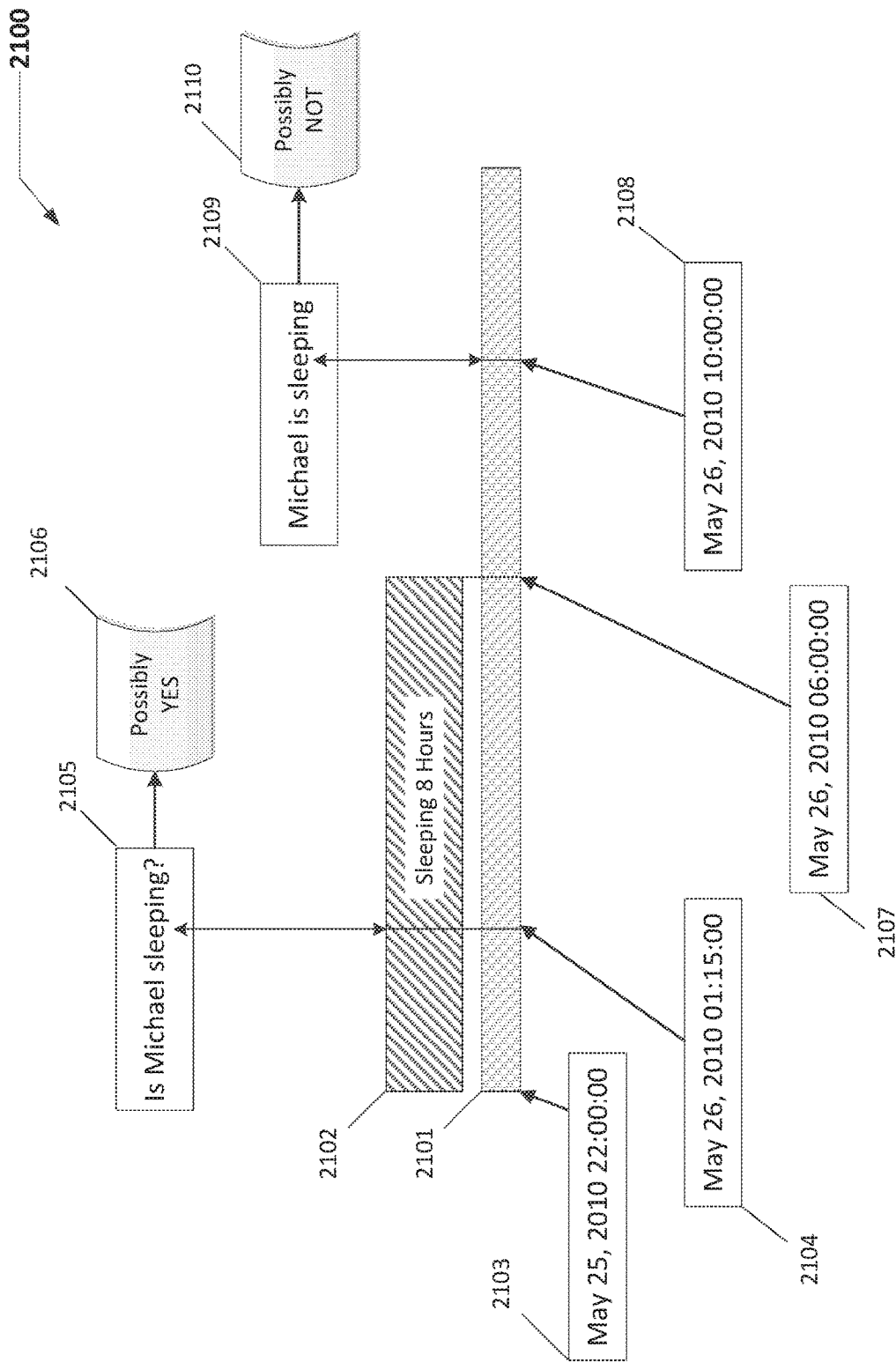
FIG. 21 is an exemplary schematic diagram of an event's time lapse and questions regarding the event's time in accordance with the example of FIG. 1.

In FIG. 21, a schematic diagram 2100 of an event's time lapse and timely questions regarding this event in accordance with an example implementation of FIG. 1 is depicted. Because in the proposed approach Entigens are distinctive elements then each Entigen's own existence may be used as representation or presence of time within the IEB-DCE System 100. Like this, the time lapse that each Entigen experiences is herein referred as "Entigen Time" or ETime for short. As actions have their own Entigen Times and they combine (make CETs) with items, this gives items an additional means for experiencing time as well. For example, if an action such as jumping occurs or exists in a time lapse which averages 5 seconds, then any item that is jumping is also experiencing a time lapse of 5 seconds. As a matter of fact, the action of "being alive" is what is normally associated with items; but being alive, like any other action has a finite Entigen Time or time lapse. This is significant point, because it implies that items which are not experiencing actions (making CETs), including being alive, then these items themselves would be eternal and thus no longer experience the passage of time. Indeed, this is the case for many items that have ceased to exist. Although the Entigen that represents the item still exists within the IEB-DCE System 100, the fact that the item's Entigen is no longer doing anything, means that the Entigen (or its item) still exists, but all of its prior actions, including life, simply belong to the past. A family pet (i.e., a goldfish) may serve as a good example to begin understanding item's Entigen Time. When the pet is first introduced to a family, an Entigen would be created to represent the pet; and as the pet experiences life, the time lapse of action of being alive (being alive ETime) describes the time lapse of the pet or its Entigen. Then, when the pet passes away, the pet's action of being alive (the action's ETime) is no longer progressing or continuing, meaning that the pet has died. However, the Entigen that represents the pet is still present (the pet's Entigen still exists), meaning that the memory of the pet has not gone away. The family may talk about the pet in the future without altering the pet's Entigen and may be able to describe it in the present without bringing the pet back to life. Even events and actions which time lapses have expired (i.e., last year's birthday or last week's speech) doesn't mean that they never occurred or experienced their own Entigen Times. In fact, the relationship between item's ETime and action's ETime is so fused that measuring item's ETime without an action's ETime is practically not possible. This is the reason why item's ETime uses repetitive actions, like a quartz crystal, or a constant motion, like the arms of a clock, to annotate the item's time lapse.

Additionally, because the IEB-DCE System 100 may also have its own Entigen and thereby its own ETime, more specifically referred herein as System Entigen Time, the IEB-DCE 100 System itself may experience the time lapse of actions it performs, annotate when it learns things, when it forms Entigens, when it deletes Entigens, etc. Like this, the IEB-DCE System may gain the capacity to interpret its own time in context with other Entigen Times.

Notably, although the Entigen Time of actions and events may be used as a means for experiencing the passage of time, the actual accurate measuring and registering of time is the result of marked and ordered information. For example, while a pulsating quartz crystal may be used to experience the passage of time; registering the exact moment when something begins or ends requires an ordered or measurable input like that from a clock (seconds, minutes and hours are clearly marked). Indeed, animals can experience the passage of time; but to register the exact time when something begins or ends requires a marked input like a particular hour, minute and second on a clock. Like this, a system may incorporate many sources for interpreting and finally registering (in reference to other actions) exact instances and lapses of time.

Returning to FIG. 21, the System Entigen Time 2101 of the IEB-DCE System 100 is depicted as an area (a rectangle). The Entigen Time of the action "sleeping" 2102 is depicted as another rectangular area; which time lapse extends approximately eight hours long, because in this example, the average sleeping time lapse for a person is about eight hours. The First Time Tag 2103 or "May 25 of 2010 at 10 PM" indicates the instance when the Time Module 388, FIG. 1 registered the beginning of the sleeping's ETime. Then, a First Question 2105 or "Is Michael sleeping?" is processed by the IEB-DCE System 100 at the moment of the Second Time Tag 2104 or "May 26 of 2010 at 1:15 AM" which is the next day early in the morning. As illustrated, this second question came approximately 3 hours into the continuation of sleeping's ETime. Accordingly, the IEB-DCE System 100 answers with a First Answer 2106 or "Possibly yes" simply because without a confirmation, it is only possible that Michael may still be sleeping. The Third Time Tag 2107 or "May 26, 2010 06:00:00 AM" is illustrating the moment when sleeping's ETime supposedly ends (8 hours into the sleeping's time lapse, sleeping should end). Next, four hours later, at the moment of the Fourth Time Tag 2108 or "May 26 of 2010 at 10 AM" a Second Question 2109 or "Is Michael sleeping?" is processed again to which the IEB-DCE System 100 now answers with a Second Answer 2110 or "Possibly Not", simply because the Entigen Time of sleeping should already have expired. Also, the Second Answer 2110 involved the word "possibly" because without confirmation there is no certainty that Michael is no longer sleeping. Although the Entigen of the IEB-DCE System 100 and its ETime are similar to other Entigens and their ETimes, in this example, the information of the IEB-DCE System 100 is depicted in the Self Database 2699, FIG. 1.

Figure 22A:
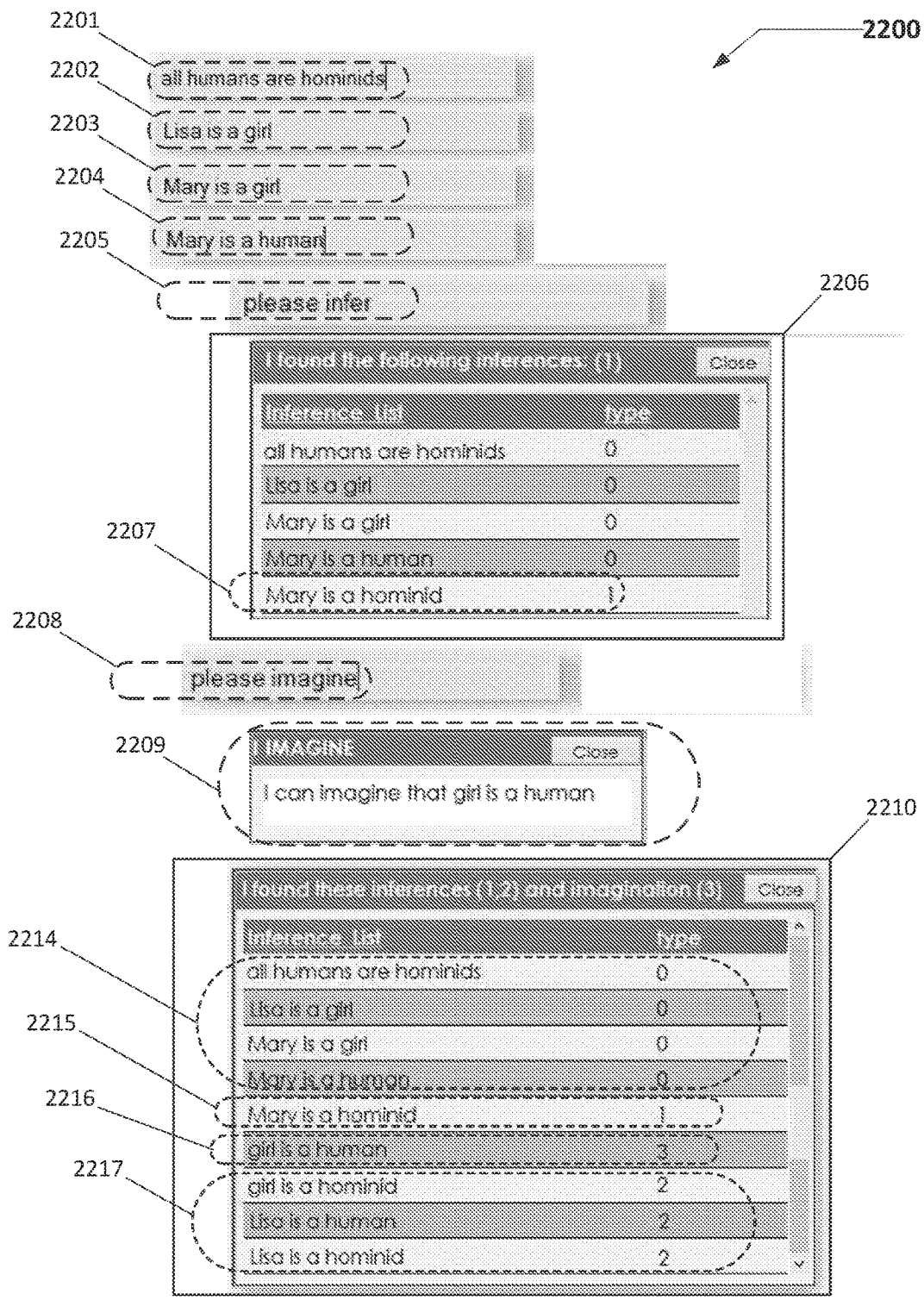
FIG. 22A is an exemplary illustration of several entered sentences, an inference and a logical prediction (also called an abduction in accordance with the example of FIG. 1.

Turning to FIG. 22A, an exemplary illustration 2200 comprising several entered sentences, an inference and a logical prediction (also called an abduction in formal logic) in accordance with the example implementation of FIG. 1 is depicted. The First Statement 2201 or "all humans are hominids" is processed by the IEB-DCE System 100. The Second Statement 2202 or "Lisa is a girl" is processed next. Next, the Third Statement 2203 or "Mary is a girl" is processed. Finally, the Fourth Statement 2204 or "Mary is a human" is processed last. Notably, in this particular example, inferences and logical predictions occur upon an external request. Like this, a user then requests the IEB-DCE 100 to infer by typing the First Request 2205 or "please infer". Consequentially, because the conditions to make inferences exist, the IEB-DCE System creates the corresponding inferences which are displayed in the Inferences Results GUI 2206 which comprises a First Inference 2207 or "Mary is a hominid" based on the previous processed statements. Next, a user enters a Second Request 2208 or "please imagine" so the IEB-DCE System 100 may form any abductions (logical predictions) that may be possible. Noteworthy, in this example, the terms "imagine" and "imagination" are used as synonyms of abductions or logical predictions.

As a result, the IEB-DCE System 100 creates the First Abduction 2209 or "I can imagine that a girl is a human" which generates more logical inferences (more knowledge) that do not create contradictions on current knowledge. As a result, the Inferences and Logical Prediction GUI 2210 displays all the original statements 2214, the Inference 2215 of the original statements, the Logical Prediction (abduction) 2216 and finally the Additional Predictive Inferences 2217 which involve three newer statements such as "a girl is a hominid, Lisa is a human and Lisa is a hominid." Significantly, if in the future, the IEB-DCE System 100 is able to find or prove any or all the Additional Predictive Inferences 2217, then the IEB-DCE System 100 are able to verify the consistency or validity of the original four statements (2201, 2202, 2103 and 2204). Notably, the above shows that only inferences, not original or taught statements, are true, and that only logical predictions can surpass the current knowledge and inference state of the system.

Figure 22B:
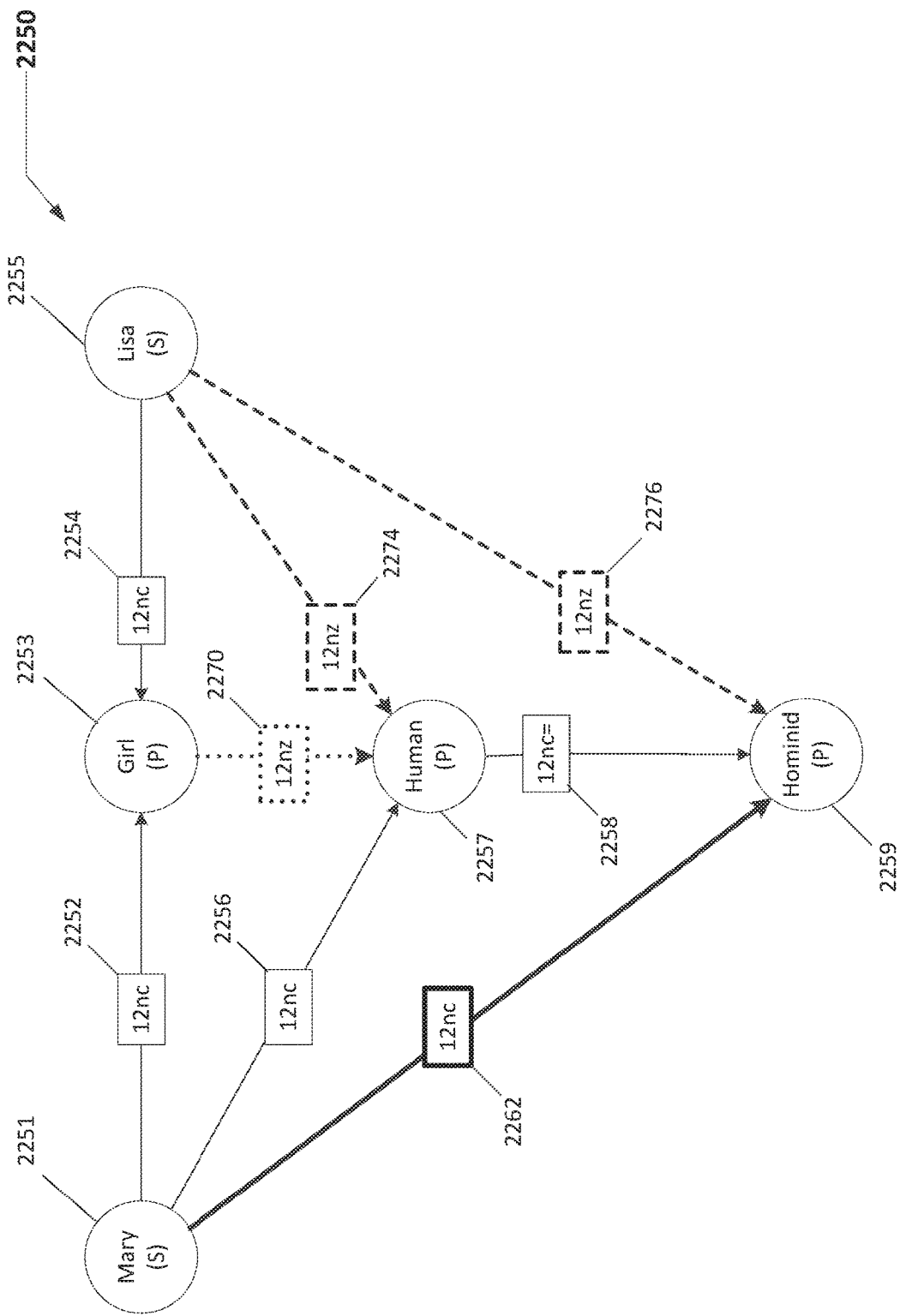
FIG. 22B is an exemplary vector graph of four CETs in response to several processed sentences in accordance with the example of FIG. 1.

In FIG. 22B a vector graph 2250 of four CETs in response to the four processed sentences exemplified in FIG. 22A in accordance with the present implementation of the shown on FIG. 1 is depicted. In order to simplify the disclosure of FIG. 22B, words instead of their corresponding IDNs or Entigens are used, and the characters "(S)" and "(P)" are depicted to identify Singulatums and Pluratums respectively. Also, similar to the depiction of 15D, in FIG. 22B CETs are illustrated as the combination (grouping) of two circles which represent different Itenyms, such as Singulatums (Lisa and Mary) or Pluratums (girl, human and hominid) and the vector/arrow that connects them. Additionally, different types of vectors are used to illustrate whether the CET corresponds to an original statement (light solid arrow), inference (bold solid arrow), abduction (light dotted arrow), or additional inferences due to abduction (dashed arrow). Accordingly, a first original statement or "Mary is a girl" 2203, FIG. 22A is illustrated as the combination of Mary 2251, Girl 2253 and the First Vector 2252 which is of type "12nc" meaning that is a certain CET because its statement unambiguously identifies its intended Entigen.

The second original statement or "Lisa is a girl" (2202, FIG. 22A) is illustrated as the combination of Lisa 2255, Girl 2253 and its Second Vector 2254 which is type "12nc" meaning that it is a certain CET because it unambiguously identifies its intended Entigen. The third original statement or "Mary is a human" (2204, FIG. 22A) is illustrated as the combination of Mary 2251, Human 2257 and the Third Vector 2256 which is also of type "12nc" meaning that it is also capable of unambiguously identifying its intended Entigen. The final original statement or "all humans are hominids" 2201, FIG. 22A is illustrated as the combination of Human 2257, Hominid 2259 and the Fourth Vector 2258 which is of CET type "12nc=" meaning that this CET is not only certain, but it can be used as a Template CET (see FIG. 20B) because the predicate "all" modified the Pluratum "human" on the statement, and therefore all Entigens which are identifiable by the word "human". The inference of the previous four original statements or "Mary is a hominid" 2207 FIG. 22A is illustrated in this figure as the combination of Mary 2251, Hominid 2259 and the Original Inference Vector 2262 which can be formed in accordance to the inference conditions of the IEB-DCE System 100. Notably, the Original Inference Vector 2262 is certain (ends in character c) because it is the result of two certain vectors (2256 and 2258).

In addition, between Girl 2253 and Human 2257 the Abduction Vector 2270 type "12nz" is formed which linguistically is comparable to "If a girl is a human" (2209, FIG. 22A). Notably, character "z" is used in this example to describe abduction (logical prediction) or inferences based on abductions. Accordingly, the Abduction Vector 2270 (i.e., if a girl is a human) allows three additional inferences such as the first abduction-based inference 2274, the second abduction-based inference 2276 and the third abduction-based inference (vectors 2270 and 2258); which linguistically are comparable to "Lisa is human" and "Lisa is a hominid" and "a girl is a hominid" respectively. Notably, vectors that are depicted as solid light arrows (2252, 2254, 2256 and 2258) are the result of original statements, the bold solid arrow (2262) is an inference from original statements, the dotted arrow (2270) is an abduction (Logical Prediction); and the dashed arrows (2274 and 2276) are the additional logical predictive inferences, including a vector of the combination of vectors 2270 and 2258. Significantly, not identifying if a word is a Singulatum or Pluratum, the certainty of a CET (i.e. 12nc and 12nz) would be unknown; meaning that inferences too would be unknown which inevitable would lead to inconsistencies and undetectable contradictions.

Figure 23C:
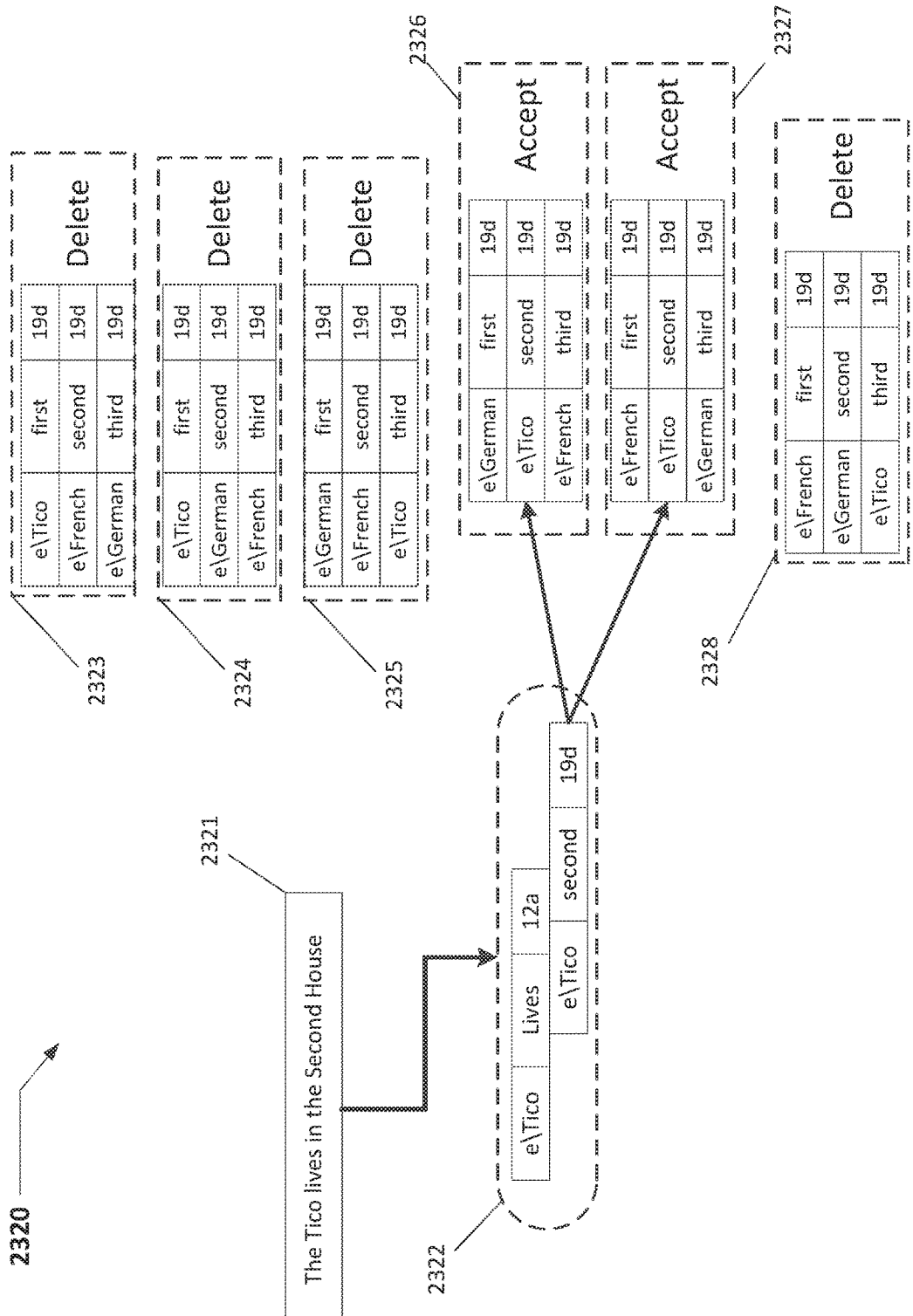
FIG. 23C-F are exemplary illustrations of clues and their corresponding Clue CETs that the clues generated among the predictive logical permutations in accordance with the example of FIG. 1.

Turning to FIG. 23A, an illustration 2300 of an example of the IEB-DCE System 100 performing a logical prediction like that required to solve a variation of the Einstein Puzzle (Zebra Puzzle) implementing permutations and Entigens in accordance with an exemplary implementation of FIG. 1 is depicted. The Exemplary Logic Puzzle 2300 has been simplified from its original version (The Einstein Puzzle) to aid in the understanding of the example implementation of the IEB-DCE System 100 solving this type of logical puzzles. In this simpler puzzle, there are three different homes, three different individuals from different nationalities and three different animals in each house. The purpose of this puzzle is to answer: In which house does the bird live? A number of clues are given to infer the location of the bird. Significantly, because words are divided into descriptive identifiers instead of grammatical identifiers, the IEB-DCE System 100 is able to solve more complex versions of the Einstein Puzzle, including puzzles that use Pluratums or words which potentially identify a plurality of individual items (Entigens), which the puzzle, in its current status, does not use or address. To aid the illustration of FIG. 23A to FIG. 23E, the format "e\word" is used to depict the Entigen instead of the actual Entigens. For example, to depict the Entigen that the word bird is identifying, "e\bird" is depicted instead of the actual Entigen. Notably, in this example of the puzzle, clue (B) doesn't describe the specific person (Tico, French or German) but rather a more general statement such as "the European has a dog"; wherein the word "European" is capable of identifying at least two of the three entities or individuals (the French or the German).

In FIG. 23B, an illustration 2310 of the permutations that the IEB-DCE System 100 has created for the houses, individuals and animals of the Puzzle in accordance with the implementation of FIG. 1 is depicted. For example, the individual nationalities (Tico, French and German) and the homes (First, Second and Third) create six different combinations or permutations 2312; and the Animals (bird, cat and dog) and homes (First, Second and Third) create six other permutations 2313.

Turning to FIG. 23C, an illustration 2320 of the First Clue Sentence 2321 and its corresponding First Clue ENCETs 2322 that the first clue generated in accordance with the present implementation of FIG. 1 is shown. As Illustrated, the second CET or [(e\Tico)-(second):19d] in the First Clue ENCETs 2322 comprises the Entigen that Tico identifies and the word Second (or its IDN) meaning that the Tico is in the second house. Because the First Clue Sentence 2321 mentions that the Tico is in the Second House, then other permutations that have the Tico in a different house, are removed from further analysis (these other permutations have the Tico and other homes in CETs 19d). As a result, the First Nationality Permutation 2323, the Second Nationality Permutation 2324, the Third Nationality Permutation 2325, and the Sixth Nationality Permutation 2328 are removed from further analysis (in these permutations the Tico is not in the second house), and only the Fourth Nationality Permutation 2326 and the Fifth Nationality Permutation 2327 survive (in these permutations the Tico is in the second house as required by the clue).

Figure 23D:
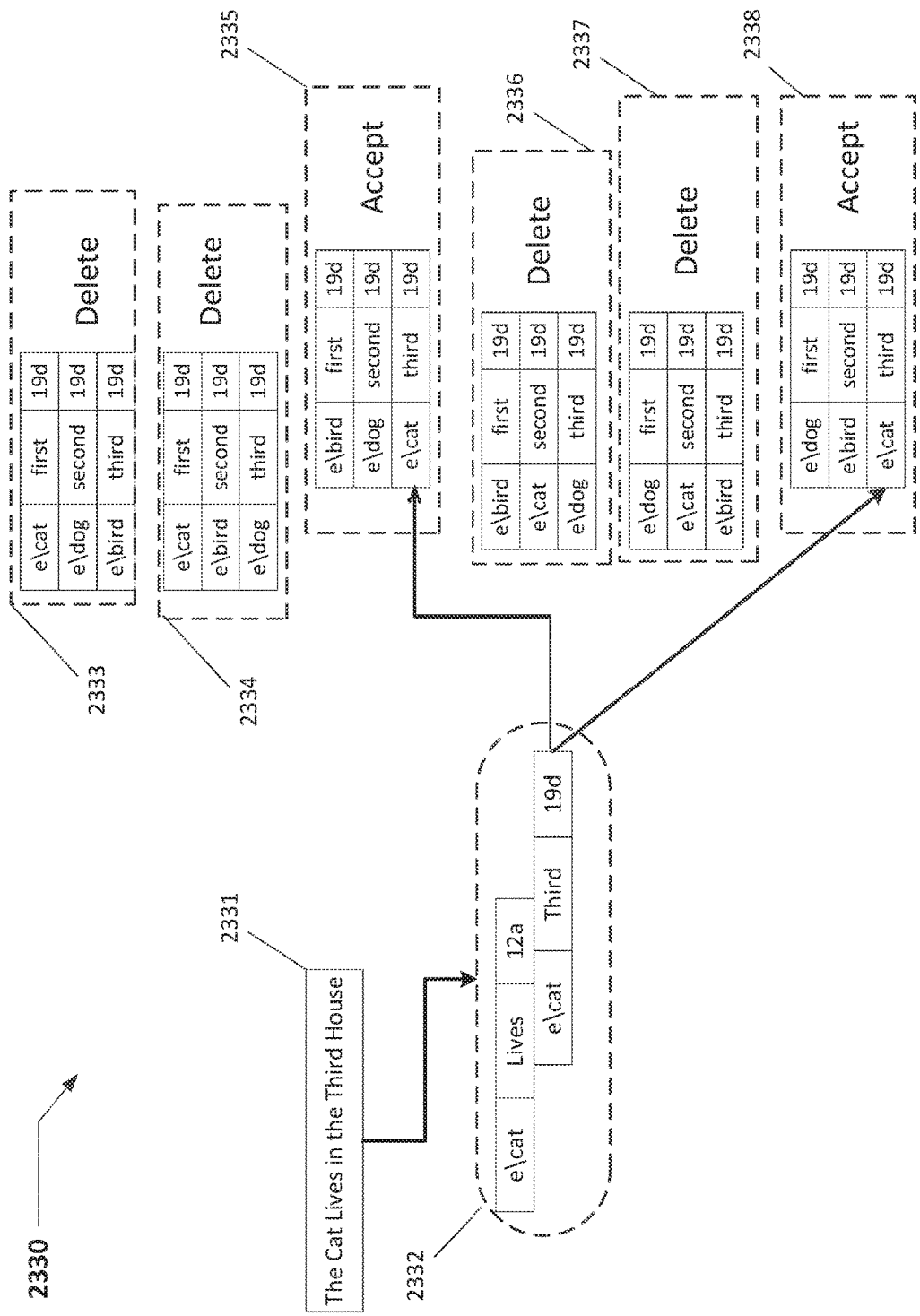

In FIG. 23D, an illustration 2330 of the Second Clue Sentence 2331 of the puzzle and its corresponding Second Clue CETs 2332 that the second clue generated in accordance with the implementation of FIG. 1 is shown. As Illustrated, the second ENCET or [(e\cat)-(third):19d] in the Second Clue CETs 2332 which is linguistically comparable to "the cat is in the third house". Because this Second Clue Sentence 2331 of the puzzle mentions that "the cat has to be in the third house", then any other permutations that do not show the cat in the third house are removed from further analysis. As a result, the First Animal Permutation 2333, the Second Animal Permutation 2334, the Fourth Animal Permutation 2336 and the Fifth Animal Permutation 2337 are removed (in these permutations the cat is not in the third house); and only the Third Animal Permutation 2335 and the Sixth Animal Permutation 2338 remain because in these permutations the cat is in the third house.

Figure 23E:
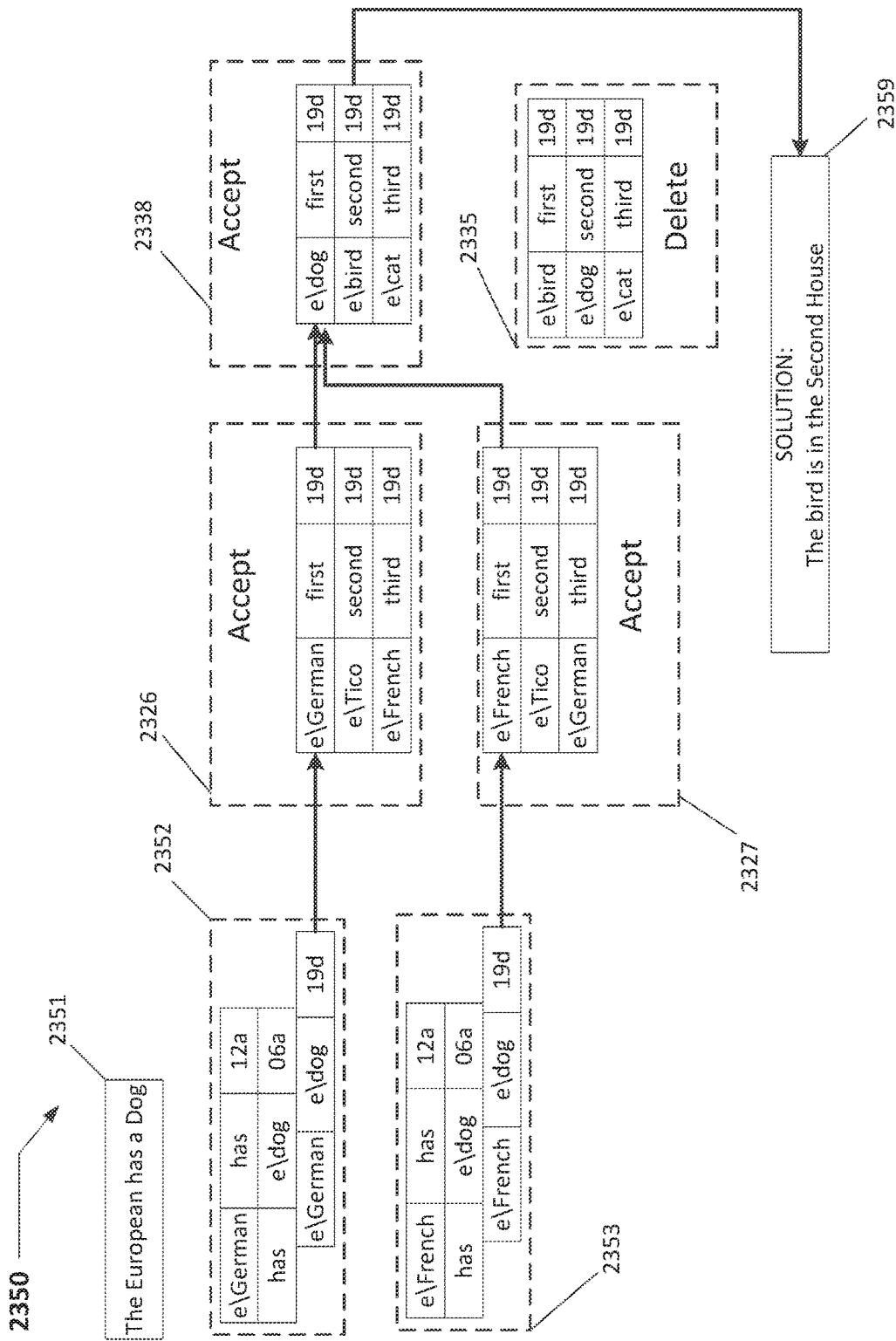

Turning to FIG. 23E, an illustration 2350 of the Third Clue Sentence 2351 of the puzzle and its corresponding two groups of CETs such as the First European ENCETs 2352 and the Second European ENCETs 2353 in accordance with the implementation of FIG. 1 is shown. Notably, because the Third Clue Sentence 2382 (the European has a dog) involves the Pluratum "European", it identifies two individuals (two Entigens) of the puzzle (the German and the French), thus resulting in two different groups of ENCETs (2352 and 2353). Accordingly, each of these groups of ENCETs (2352 and 2353) is a clue on its own; meaning that each has to be matched or found within the possible remaining permutations. As Illustrated, the Third ENCET or [(e\German)-(e\dog):19d] in the First European ENCETs 2352 indicates that the German and the dog have to be in the same home, which only occurs when the Fourth Nationality Permutation 2326 and Sixth Animal Permutation 2338 intersect (both permutations have the German and the dog in the same place respectively). As a result, these two permutations are selected. In the same fashion, the third ENCET or [(e\French)-(e\dog):19d] in the Second European CETs 2353 indicates that the French and the dog have to be in the same home; which only occurs when the Fifth Nationality Permutation 2327 and the Sixth Animal Permutation 2338 intersect (both permutations show the French and the dog in the same house respectively). As a result, these two permutations are selected, meaning that the Sixth Animal Permutation 2338 is selected again. However, the Third Animal Permutation 2335 was not selected, meaning that this permutation is removed from further analysis. As a result, only one animal permutation or the Sixth Animal Permutation 2338 remains, which shows the exact location where the Entigen called "bird" is, or where it lives, thus solving the puzzle (in which house does the bird live?) and displaying the Answer 2359 or "The bird lives in the Second House".

Figure 23F:
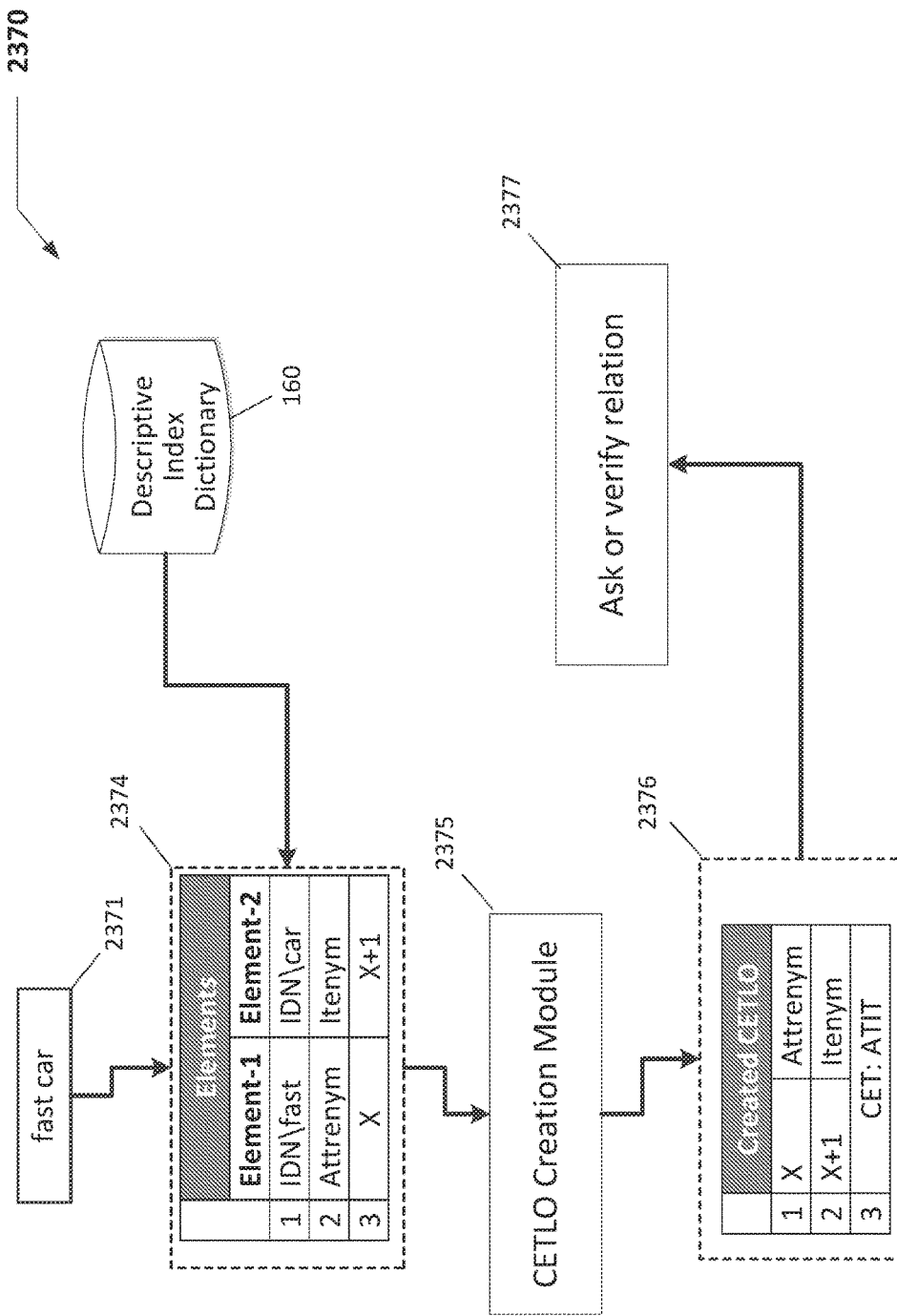

In FIG. 23F, an exemplary schematic 2370 of several GUIs, Databases and modules creating a CETLO Rule in accordance with exemplary implementation of FIG. 1 is shown. Because the proposed approach makes sets (CETs) of elements (i.e., words, IDNs, ENIs) based of their type and their position within the string (i.e., sentence, phrase). place in the sentence), if the string is properly constructed, then CETLO Rules can be extracted/created by the IEB-DCE System 100 that could assemble similar sentences. For example, in English, which reads from left to right, the attribute can be placed before its item (i.e., fast car), meaning that a CETLO Rule can group both elements into a CET. Moreover, if a phrase such as "fast car" is correctly constructed, then a CELO Rule can be extracted and created by the IEB-DCE System to autonomously processed kind of phrase. Returning to FIG. 23F, the phrase 2371 or "fast car" is deconstructed and its elements shown in the Elements GUI 2374. In this example, the Descriptive Index Dictionary 160 provided the type of words or IDNs of "fast" and "car". As illustrated by the Elements GUI 2374 shows two columns called "Element-1" and "Element-2" which depict, in the first record, the words' IDNs, in the second record below, the type of word they are, and on the third record below, the position of the element or word's IDN with respect to each other in the form of a variable (X and X+1). Next, the CETLO Creation Module 2605, which in this example is part of the CETLO Rules Module (220, FIG. 1), will use the information and parameters depicted in the Elements GUI 2374 to construct a CETLO Rule that may be stored in the CETLO Rules Database (396, FIG. 1) or other temporary or permanent means of information storage. Accordingly, the Created CETLO GUI 2376 depicts in its two columns the conditions that the recently created rule follows. For example, in the Created CETLO GUI 2376 the first record shows the position of the first element or "X" and in the second column "Attrenym". In the second record the variable "X+1" is depicted next to "Itenym". Finally, the third record shows the type of CET that the rule is capable of forming. In this fashion, this created CETLO Rule forms a CET type "ATIT" if the first element is an Attrenym and the next elements is an Itenym. Notably, the CET Type in this example is reflective of the types of elements and the order in which they were found in the string or phrase; wherein "AT" stands for Attrenym and "IT" stands for Itenym. The Ask or Verify Module 2377 is also shown which may be used for asking an external input (i.e., a person, another IEB-DCE System) to verify if the findings by the modules of the IEB-DCE system 100 are correct, or for applying the recently created rule to future data and check if any contradictions or anomalies begin to occur.

Noteworthy, other parameters and information, including different elements may be used for discriminating or identifying the conditions for forming a CET or establishing a relation between the elements. For example, the hypernyms or categorical IDNs of the Entigen may be used as part of the CET forming rules; while in the case of actions, the tense or time of the action may be used; and functional words or their IDNs may be implemented as an element of the rule, etc.

Figure 24:
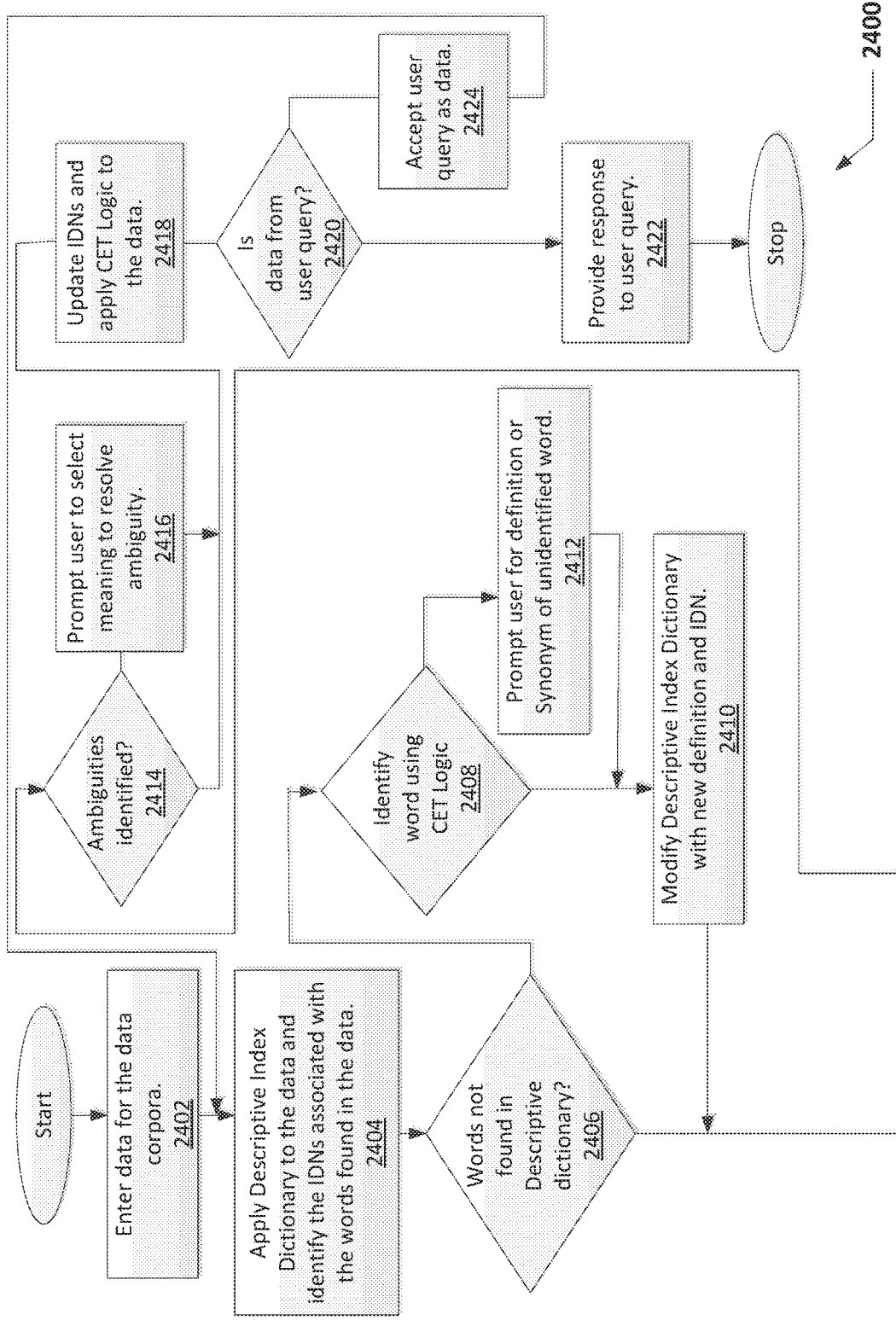
FIG. 24 is an exemplary illustration of a flow diagram of the operation of the IEB-DCE System in accordance with the example of FIG. 1.

Turning to FIG. 24, an illustration 2400 of a flow diagram of the operation of the IEB-DCE System in accordance with the implementation of FIG. 1 is depicted. Data is entered for the data corpora in step 2402. Data may be entered as text document or table data is accessed by the IEB-DCE System 100 and stored in the data corpora 110. The Conceptualization Module 150 applies the Descriptive Index Dictionary 160 to the data corpora 110 in step 2404. If words are not found in the conceptual diction 160 in step 2406, then CETLO Rules Module may be applied to attempt to identify the word in step 2408. If identified in step 2408, it is added to the Descriptive Index Dictionary along with an associated IDN 2410, otherwise a user may be prompted by the IEB-DCE System 100 to provide a definition or a synonym for the word in step 2412. If an ambiguity is identified in step 2414, a user may be prompted to resolve the ambiguity in step 2416. The processing of the data then proceeds and the IDNs are updated in step 2418 in view of the input from the user in step 2416. If the data being process is from a user query and the data corpora has been previously processed in step 2420, then the response to the user query is provided in 2422. Otherwise in step 2420 the data corpora is processed and the IEB-DCE System 100 is ready for a user query that is entered in step 2224. The processing of the data corpora occurs as described in FIGS. 1-25.

Figure 25:
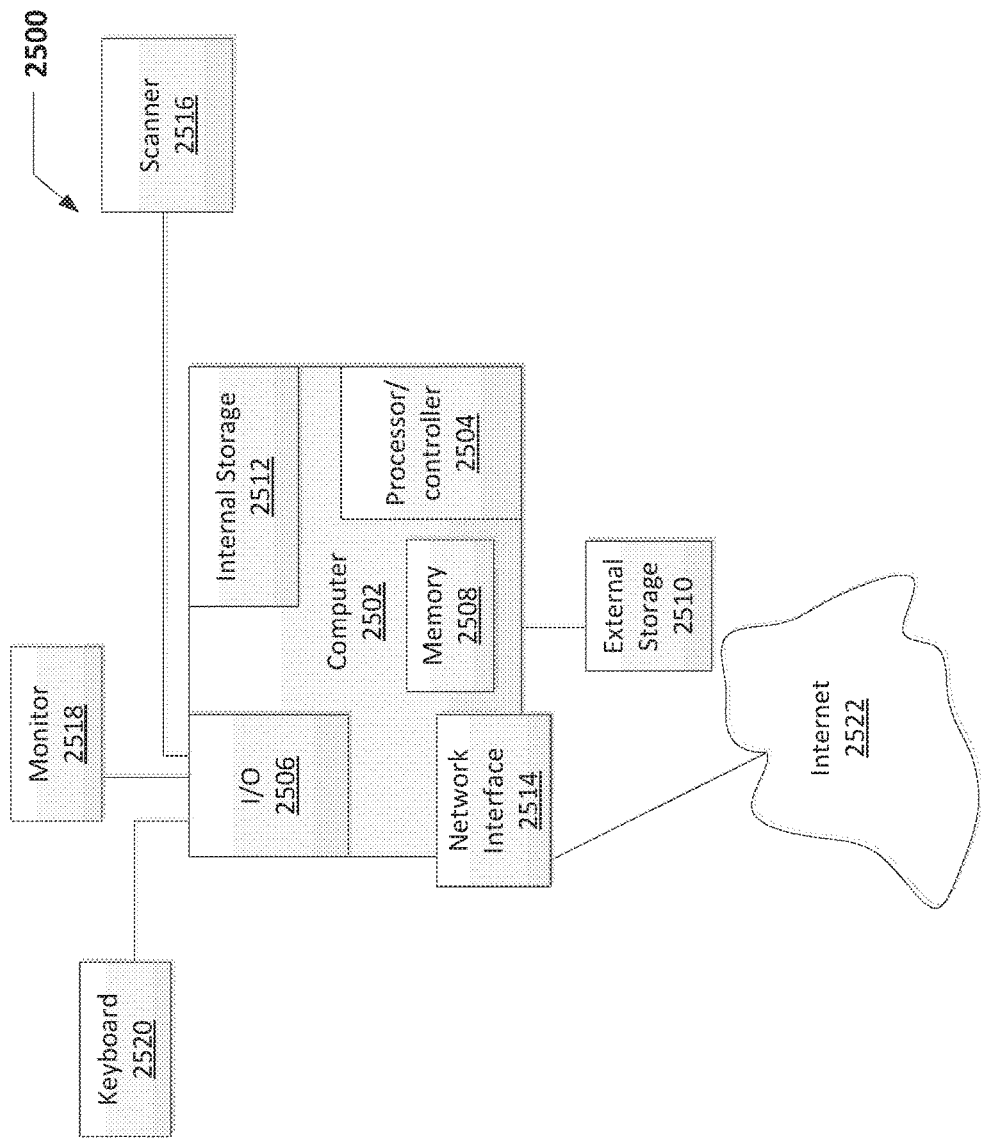
FIG. 25 is a diagram of a computer having a processor that executes a plurality of instructions for the IEB-DCE System in accordance with the example of FIG. 1.

In FIG. 25, a diagram 2500 of a computer 2502 having a processor 2504 that executes a plurality of instructions for the IEB-DCE System 100 in accordance with the present implementation of the invention is illustrated. The computer 2502 may be a general purpose computer such as a laptop or desktop computer, minicomputer, mainframe, smart device such as cellular telephone or tablet to give but a few examples. It may have one or more processors or controller 2504 that may be a microprocessor, digital signal processor, embedded controller, reduced instruction set controller (RISC), microcontroller, digital state machine, analog circuits configured to function as a state machine, or a combination of digital circuits and analog circuits functioning as a state machine, to give but a few examples. The processor/controller 2504 may be in signal communication over one or more buses with memory input/output I/O interfaces 2506, memory 2508, external storage devices 2510, internal storage 2512, and a network interface 2514. The memory 2508 may be partitioned into data memory and program memory. The memory may be RAM, SDRAM, PROMs, EEPROMs, or other type of digital memory. The disk storage 2512 may be permanent or removable solid state or traditional hard disk drives, optical disks, removable disks, or SD type memory chips. The I/O 2506 may be a plurality of interfaces that include VGA, HDMI, audio, universal serial bus, SCSI, serial and/or parallel interface, to give but a few examples. The I/O 2506 may connect the computer 2502 with a keyboard 2520, monitor 2518, image scanner 2516, and camera (not shown). The computer 2502 may also be connected to external storage 2510, such as the disk storage devices listed above, but connected external to the computer 2502. The external storage 2510 includes "cloud" connections across the internet to storage for the computer. A network interface 2514 may connect to one or more local or wide area networks including the internet.

The data corpora 110-130, FIG. 1 may be stored in one or more databases or data stores on internal or external data storage, such as data stores 2512 and 2510. In other implementations, the data corpora 110-130 may be stored remotely in a local network, wide area network, or even a distributed network. The modules of FIG. 1 may be stored in application memory located in memory 2508. Data corpora may also be entered or otherwise created by accessing content on the "World Wide Web" or scanning text data that is converted into digital text via object character recognition (OCR). Additionally, CETLO Rules Module 220, FIG. 1 may also be stored in any memory including the application memory 2508 and Network Interface 2514. In other implementations, the CETLO Rules Database 396 and the CETLO Rules Module 220 may be remotely stored and accessed. Such access of remote CETLO Rules Module 220 and CETLO Rules 396 may be protected and require authentication and valid licenses.

The descriptive index dictionary 160 may similarly be stored locally in internal or external disk storage 2516, 2510 or be located in a network, such as internet 2522. The descriptive index dictionary 160 may require authentication and a valid license to be accesses in some implementations. During execution of the instructions by processor/controller 2504 for the IEB-DCE System 100, additional data structures or data stores may be created, modified, and/or removed. These additional data structures may reside in memory 2508, disk storage 2512, and/or external storage 2510.

Numerous advantages over known grammatical approaches are achieved by using descriptive identifiers (AIA) groups rather than grammatical groupings. First, AIA identifiers describe the object while grammar identifiers describe how the word is used in a sentence. For example, the word "talking" grammatically speaking is divided into a noun, verb and adjective (depending on how "talking is used in the sentence); however, when using AIA, "talking" is always describing an action which is an Actenym. Another example is the word "human" which grammar divides into noun and an adjective; however, if AIA are used, human is always a word that identifies an item (Itenym). Another example is the word "fast" which grammar divides into adverb and adjective, but when using AIA, "fast" is always an attribute (Attrenym). This also results in the FEA groups having smaller dictionaries, faster operations, and fewer indexes.

Second, AIA can handle sentences that are not grammatically perfect, are not well constructed or are difficult to understand. Human speakers are flexible as are AIA. Textual, spoken, colloquial, conversational (auditory) and other inputs are likely to be informal. This departure from the current practice of parsing phrases grammatically makes the AIA ontology far more precise in extracting meaning from information.

Third, AIA permit self-learning as described by the proposed approach; while grammatical approaches do not. This allows machines to learn the names of things through optical and auditory observation as well as textual input. After we develop the visual interpretation section (VIRNs) the machine will be able to observe things in its environment. These observations and knowledge can then be transferred, shared or verified. For example, observing a new item leads to its name (Itenym); observing to a new attribute of an item leads directly to the name of the attribute (Attrenym); and observing a new action leads directly to the action's name (Actenym). However, grammatically speaking, identifying the POS of a newly observed things, leads to a series of probabilities. For example, observing a new attribute implies, grammatically speaking, the creation of an adjective, maybe an adverb, and maybe a noun. Like this, grammar encourages possibilities, false hypothesis, complexity and therefore probable inconsistencies.

Fourth, AIA permit untrained human assistance, and grammar does not. For example, if the machine needs a description for unknown word, humans can easily answer via AIA instead of grammar. AIA are inherently to what it is observed, which makes them easy to understand. However, grammar identifications are rigid and require formal human training to identify. In addition, grammatical identifications only identify how the new word is being used in the particular instant and sentence where is found. More importantly, POS cannot describe every instance how the new word is used and yet fails to identify what the new word is actually describing, which AIAs do.

Fifth, AIA allows the system to create its own CETLO Rules. If a CETL Logic rule doesn't exist, the system can create a CET and write the CETL Logic rule that assembled the CET for future verification. This is possible only with AIA because only AIAs are not ambiguous.

Sixth, unlike grammar, AIA simplified the detection and learning of Logical Sequences or the relationships that exist between actions (also known as cause and effect). For example, the relationship that exists between actions, such as buying and spending, can be blurred by grammar, because it classifies actions as nouns, verbs or adjectives which can be confused with the nouns and adjectives of other words in the sentences. However, to AIA, actions are always actions, meaning that they distinctive and non-ambiguous, which allows the system to precisely detect them and therefore relate them. In prior AI approaches, the constraints of grammar and language processing algorithms prevent the technology from understanding how meanings and objects relate, which humans do intuitively in context. This non-obvious departure from current approaches is both more robust and much more reflective of how humans encode, communicate and relate meanings. This approach works, while current AI approaches do not understand the meaning of words and therefore fail to conceptually represent human communications and knowledge.

Seventh, "Entigens" as consistently identified by AIAs, allow the technology to differentiate and handle phrases like: "humans", versus "a human" versus "the human", versus "this human", etc. Like this, a system can differentiate between a collection, any member of the collection and a specific member from the collection. This is a critical point which has not yet been identified in predicate logic; implying that the current status of predicate logic is that it is incomplete.

Eighth, AIA allow the system to differentiate between car1 and car2 and car3. Although all the items can be recalled by the word "car", each item (or object) is unique and discreet. While Identigens can unambiguously represent the concept behind the words: car, automobile, motorcar and other synonyms; Entigens can differentiate between each car. This means that AIA move the system from a conceptual level to a deeper level, that is, the unique entity or Entigen level.

Ninth, AIA naturally incorporate the identification of Singulatums. A Singulatum is a word(s) that identifies a single item or its Entigen in the system's universe (like Earth—there is only one planet called Earth). Other words that do not identify a particular Entigen are called Pluratums or classes, like the word planet that although it is in singular form, it is not a Singulatum, because there are many planets (several unique Entigens) that "planet" can identify.

Tenth, Itenyms and Actenyms lead to their Entigens which allow for contextual Entigen disambiguation. In human communication, the conveyance of "David" is likely individually specific to a known person among the interlocutors. For example, a first, second and third person know each other. Also, the first and second person know one David (first David); and the second and third person know a different David (second David). Like this, if the first and second person mentions "David", they are clearly identifying the first David. But if the second and third person mentions "David", then they are clearly talking about the second David. However, the name David does not resolve to a singular Entigen without the added (unobvious) ability to observe and use the context of the communication (i.e., to know who knows who). Enabling this contextual differentiation between individuals is a non-obvious advance of the proposed approach.

Eleventh, AIA allow the identification of Pluratums (a class word) as substitutes for Singulatums and both for identifying a single intended Entigen in context. For example: Obama (Singulatum) makes peace with Iran. The president (Pluratum) believes that Iran will abandon its nuclear aspirations. In this example, "president" is substituting "Obama."

Twelfth, AIA continuously allow a system to equate or group several divergent descriptions. For example, using AIA and Entigens, a search for; "the first American president disliked becoming a king" equals "George Washington disliked becoming a king." Precise inferences can only happen through Entigens which AIA precisely imply. Accurate anomalies can only happen through Entigens (individual level). Accurate abduction can only happen at the Entigen level. Additionally, false contradictions are eliminated.

Thirteenth, Entigens can experience changes in time and space, which concepts cannot. This is one of the biggest unsolved problems of current AI: can a system understand that presidencies only last 4 years? So, if asked: "who is the elected president?" The system is able to answer understanding the time describing whether the last elected president is still the current president or not? Entigens can retain past, present and future attributions as they occur and change over time.

Fourteenth, Entigens allow Entigen Time which in return allows the IEB-DCE System 100 to comprehend or handle the passage and progression of time.

Fifteenth, only AIAs are consistent with our theory of sets; wherein classes and subclasses don't exist or have a different interpretation. Simply, there are special words (Pluratums) that can be used to identify one or many individual things, especially when the specific name of the object is not known to the speaker (i.e. girl and dog are words that can be used when speakers are unfamiliar with the individuals' specific names—Singulatums). Significantly, only CETs resolve the Russell Paradox, the lie Paradox, and other math and logic paradoxes; but more importantly, eliminates the main problem of ontological inconsistencies. No group can be sufficiently defined so only those members that fulfill the definition remain in the set-group. For example, if one tries to define what makes the class of "pilots" one quickly finds that there are features that do not belong to all pilots. In fact, because classes can be full of exceptions, it means that classes cannot be used to make inferences, and if they are used, then they will create contractions infinitely. However, if the information is driven to the unique or individual level, it is the Entigen, not the class, what encounters contradictions, anomalies, attributes, actions, etc.

Thus, as presented, a dramatic innovation in the study and processing of language has been presented that avoids the pitfalls of grammar. Grammar is not only complex, incomplete, inconsistent but ambiguous. AIA are a natural classification of words, while grammar is an unnatural system of word classes.

It is appreciated by those skilled in the art that where the data files, databases, circuits, components, modules, and/or devices of, or associated with, the above-described IEB-DCE System 100 is described as being in signal communication with each other, signal communication refers to any type of communication and/or connection between the data files, databases, circuits, components, modules, and/or devices that allows a circuit, component, module, and/or device to pass and/or receive signals and/or information from another circuit, component, module, and/or device. The communication and/or connection may be along any signal path between the data files, databases, circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

What is claimed is:

1. A method for execution by a computer, the method comprising:
    obtaining a representation of a portion of a sentence, wherein the portion of the sentence includes a sequence of a plurality of words;
    assigning, for each word of the sequence of the plurality of words, an identigen subset, wherein each identigen subset includes one or more identigens, and wherein each identigen of the one or more identigens has an associated potential meaning of the word;
    determining, in accordance with grouping rules and a knowledge base, at least one entigen grouping, wherein each entigen grouping includes a sequence of a unique plurality of entigens, wherein the sequence of the unique plurality of entigens corresponds to the sequence of the plurality of words, wherein each entigen corresponds to an identigen of a corresponding identigen subset, and wherein each entigen grouping corresponds to a meaning of at least one meaning associated with the portion of the sentence;
    updating the knowledge base utilizing the entigen grouping to produce an updated knowledge base; and
    facilitating, based on the updated knowledge base, subsequent interpretation of a portion of another sentence to produce a meaning associated with the portion of the other sentence.

2. The method of claim 1 further includes accessing a Descriptive Index Dictionary to identify each identigen of the one or more identigens of the identigen subset.

3. The method of claim 2, wherein each identigen includes an associated identifier.

4. The method of claim 1, wherein the assigning the identigen subset includes generating a user prompt to identify a meaning of an unidentified word.

5. The method of claim 4 further includes inserting the unidentified word into the knowledge base along with an associated identigen subset based on information received in response to the user prompt.

6. The method of claim 1, wherein the grouping rules further includes using a position and an identigen type to create the entigen grouping.

7. The method of claim 6, wherein the identigen type includes at least one of an itenym, an actenym, and an attrenyn.

8. The method of claim 7, wherein the identigen type further includes a category of the identigen.

9. The method of claim 1, wherein the assigning the identigen subset includes identifying at least one entigen of an associated entigen grouping.

10. The method of claim 1, wherein the assigning the identigen subset includes mapping the word to the one or more identigens in accordance with an identigen type, wherein the identigen type includes one or more of an itenym, an actenym, and an attrenyn.

11. A computer readable memory comprises:
    a memory element that stores operational instructions that, when executed by a processor of a computer causes the processor to:
        obtain a representation of a portion of a sentence, wherein the portion of the sentence includes a sequence of a plurality of words;
        assign, for each word of the sequence of the plurality of words, an identigen subset, wherein each identigen subset includes one or more identigens, and wherein each identigen of the one or more identigens has an associated potential meaning of the word;
        determine, in accordance with grouping rules and a knowledge base, at least one entigen grouping, wherein each entigen grouping includes a sequence of a unique plurality of entigens, wherein the sequence of the unique plurality of entigens corresponds to the sequence of the plurality of words, wherein each entigen corresponds to an identigen of a corresponding identigen subset, and wherein each entigen grouping corresponds to a meaning of at least one meaning associated with the portion of the sentence;
        update the knowledge base utilizing the entigen grouping to produce an updated knowledge base; and
        facilitate, based on the updated knowledge base, subsequent interpretation of a portion of another sentence to produce a meaning associated with the portion of the other sentence.

12. The computer readable memory of claim 11, wherein the memory element further stores operational instructions that when executed by the processor causes the processor to access a Descriptive Index Dictionary to identify each identigen of the one or more identigens of the identigen subset.

13. The computer readable memory of claim 12, wherein each identigen includes an associated identifier.

14. The computer readable memory of claim 11, wherein the memory element further stores operational instructions that, when executed by the processor, causes the processor to assign the identigen subset by generating a user prompt to identify a meaning of an unidentified word.

15. The computer readable memory of claim 14, wherein the memory element further stores operational instructions that, when executed by the processor, causes the processor to insert the unidentified word into the knowledge base along with an associated identigen subset based on information received in response to the user prompt.

16. The computer readable memory of claim 11, wherein the grouping rules further includes using a position and an identigen type to create the entigen grouping.

17. The computer readable memory of claim 16, wherein the identigen type includes at least one of an itenym, an actenym, and an attrenyn.

18. The computer readable memory of claim 17, wherein the identigen type further includes a category of the identigen.

19. The computer readable memory of claim 11, wherein the memory element further stores operational instructions that, when executed by the processor, causes the processor to assign the identigen subset includes identifying at least one entigen of an associated entigen grouping.

20. The computer readable memory of claim 11, wherein the assigning the identigen subset includes mapping the word to the one or more identigens in accordance with an identigen type, wherein the identigen type includes one or more of an itenym, an actenym, and an attrenyn.

* * * * *